United States Patent [19]

Kawai et al.

[11] Patent Number: 5,673,422
[45] Date of Patent: Sep. 30, 1997

[54] SEMICONDUCTOR INTEGRATED CIRCUIT FOR PROCESSING IMAGE DATA

[75] Inventors: Hiroyuki Kawai; Yoshitsugu Inoue; Hisashi Nakamura, all of Hyogo, Japan

[73] Assignee: Mitsubishi Denki Kabushiki Kaisha, Tokyo, Japan

[21] Appl. No.: 376,618

[22] Filed: Jan. 23, 1995

[30] Foreign Application Priority Data

Jan. 21, 1994 [JP] Japan .................................. 6-005275
Jul. 22, 1994 [JP] Japan .................................. 6-171047

[51] Int. Cl.$^6$ ...................................... G06F 15/76
[52] U.S. Cl. ...................... 395/519; 395/511; 345/201
[58] Field of Search ........................ 395/122, 131, 395/162–164, 501, 519, 507, 511, 508; 364/736, 754, 768; 382/162, 302–305, 307; 345/185–187, 189, 201

[56] References Cited

U.S. PATENT DOCUMENTS

| 4,718,091 | 1/1988 | Kobayashi et al. | 382/162 |
| 5,185,856 | 2/1993 | Alcorn et al. | 395/164 |
| 5,465,224 | 11/1995 | Guttag et al. | 364/716 |
| 5,517,603 | 5/1996 | Kelley et al. | 395/122 |

FOREIGN PATENT DOCUMENTS 0 447 229 A2  9/1991  European Pat. Off. ........ G06F 15/72

OTHER PUBLICATIONS

"Graphics Processing with the 88110 Risc Microprocessor", Julie Shipnes, IEEE 1992, pp. 169–174.

Primary Examiner—Kee M. Tung
Attorney, Agent, or Firm—Lowe, Price, LeBlanc & Becker

[57] ABSTRACT

A frame buffer memory includes a main memory of a DRAM, a cache memory of a SRAM, a first transfer bus for transferring data of 256 bits, for example, between the main memory and the cache memory, a pixel processing unit for carrying out a predetermined operational process according to data provided from the cache memory and externally applied data, a compare unit for comparing the data provided from the cache memory with externally applied data, a transfer bus for transferring data from the cache memory to the pixel processing unit and the compare unit, a transfer bus for transferring resultant data from the pixel processing unit to the cache memory, and a serial access memory for storing data read out from the main memory and providing the stored data serially to an outside world. According to the structure, an α-blend process, a raster operation, a Z compare process and the like required for graphics can be carried out at high speed with flexibility.

40 Claims, 38 Drawing Sheets

| A:0 | B:0 | A:1 | B:1 |
|-----|-----|-----|-----|
| C:0 | D:0 | C:1 | D:1 |
| A:8 | B:8 | A:9 | B:9 |
| C:8 | D:8 | C:9 | D:9 |

RENDERING TIME

A : ACCESS PAGE
P : PRECHARGE BANK

| A:0 | B:0 | C:0 | D:0 |
|---|---|---|---|
| A:4 | B:4 | C:4 | D:4 |
| A:8 | B:8 | C:8 | D:8 |
| A:12 | B:12 | C:12 | D:12 |

A : ACCESS PAGE
P : PRECHARGE BANK

SEMICONDUCTOR INTEGRATED CIRCUIT FOR PROCESSING IMAGE DATA

BACKGROUND OF THE INVENTION

1. Field of the Invention

The present invention relates to an image processing circuit, a semiconductor integrated circuit device including such an image processing circuit, an image storage processing system using such a semiconductor integrated circuit device, and a testing method for such a semiconductor integrated circuit device. More particularly, the present invention relates to a frame buffer memory with an image processing function used in a work station, a personal computer or the like.

2. Description of the Background Art

FIG. 40 is a block diagram showing the entire structure of a conventional three dimensional/two dimensional graphics processing system.

Referring to FIG. 40, this graphics processing system includes a pixel processing unit 1, a pixel cache memory 2, and sixteen frame buffer memories.

Pixel processing unit 1 carries out a predetermined operation process according to 1 pixel of data from pixel cache memory 2 and 1 pixel of data subjected to a geometry process such as coordinate calculation from a work station or the like. Image processing unit 1 is used in, for example, an LSI that can operate at high speed.

Pixel cache memory 2 stores pixel data provided from pixel processing unit 1 or frame buffer memory 3. The memory capacity is not so great, and is used in a SRAM (Static Random Access Memory) that can be accessed at high speed.

The sixteen frame buffer memories 3 store pixel data of at least 1 screen displayed on a CRT. Since a CRT generally used in work stations has a great number of pixels, a DRAM (Dynamic Random Access Memory) that has a low cost per bit and large memory capacity is mainly used for this frame buffer memory 3.

FIG. 41 is a block diagram showing the entire structure of a DRAM used as frame buffer memory 3.

Referring to FIG. 41, a DRAM 3 includes four memory cell arrays 4, a row decoder 5, four sense amplifiers 6, a column decoder 7, and a controller 8.

Each memory cell array 4 includes (512×512) memory cells arranged in a matrix of 512 rows and 512 columns. One memory cell array 4 has a memory capacity of 256K bits since each memory cell stores 1 bit of data.

Row decoder 5 responds to an internal row address of 9 bits from controller 8 to select one row in each memory cell array 4. Each sense amplifier 6 amplifies data readout from one row of memory cells selected by row decoder 5. Column decoder 7 responds to an internal column address from controller 8 to select and output as output data Dout four of the (4×512) bits of data amplified by the four sense amplifiers 6 in a reading mode, and to write externally applied 4 bits of input data Din into memory cell array 4 via sense amplifier 6. In column decoder 7, a reading operation and a writing operation is switched in response to an externally applied read/write signal R/W.

Controller 8 responds to an externally applied 9-bit external address, a row address strobe signal/RAS and a column address strobe signal/CAS to generate an internal row address of 9 bits and an internal column address of 9 bits.

The operation of this graphics processing system will be described hereinafter.

In frame buffer memory 3, image data of a screen currently displayed on a CRT is stored. Data is transferred from each frame buffer memory 3 to pixel cache memory 2 one pixel at a time. Therefore, data of 16 pixels are transferred at one time from the sixteen frame buffer memories 3 to pixel cache memory 2.

In pixel processing unit 1, one pixel of data provided from pixel cache memory 2 and one pixel of data provided from, for example, a work station, are processed. The processed data is written back into pixel cache memory 2.

The data applied from pixel cache memory 2 is the data currently displayed on the CRT, and the data from a work station is that to be next displayed on the CRT. In other words, the data written back into pixel cache memory 2 is generated based upon old data and new data, which will next be displayed on the CRT.

The data written back into pixel cache memory 2 is written into frame buffer 3 16 pixels at a time.

The data read out from frame buffer memory 3 is converted into an analog signal and then provided to the CRT. A screen is displayed on the CRT according to the analog signal.

The reason why 16 chips of a DRAM is used as frame buffer memory 3 will be described in detail hereinafter.

In recent work stations, a CRT having a high resolution of (1280×1024) pixels, for example, is used. Therefore, a DRAM that is economical per 1 bit and that has a great memory capacity is used for frame buffer 3. Since as many as 60 screens are displayed in one second in such a CRT, it is necessary to access a DRAM in 12.7 sec $\{=1/(1280\times 1024\times 60)\}$.

However, the access time of a commercially available DRAM is approximately 200 nsec. Therefore, an interleave system is employed in which a plurality of data are read out at one time by accessing a plurality of DRAMs in parallel, and processing every data by multiplexing the readout data. This is why a plurality of DRAMs are used in frame buffer memory 3.

Since a great number of frame buffer memory 3 are used in the above-described graphics processing system, there was a problem that the interconnection on a board was increased to result in a greater size of the board. This problem was the cause of increasing the cost of a graphics processing system.

In the DRAM shown in FIG. 41, 4×512 bits of data are read or written at one time when one row of each memory cell array 4 is selected by row decoder 5. However, a DRAM has a limited number of input/output pins in order to improve the versatility thereof. Therefore, 4 bits of data are selected from the 4×512 bits of data by column decoder 7.

If a great number of input/output pins are provided in a DRAM to allow data of 4×512 bits to be read out at one time, it will not be necessary to provide DRAMs in parallel as shown in FIG. 40.

In such a case, it is necessary to provide many long interconnections on the board. This yields the problem that power consumption is increased since the input/output buffers of the DRAM charge/discharge the parasitic capacitance of those interconnections. The provision of a great number of input/output buffers will induce the problem that the size of the DRAM is increased. In view of the foregoing, a DRAM including many input/output pins is not manufactured at the current stage.

For image processing unit 1, a general DSP (Digital Signal Processor) called TMS32020 (a product of Texas Instruments) for example, is used. Although this general DSP incorporates many functions, it cannot efficiently execute logic operation between pixel data such as a raster operation which is widely used in graphics processing. It is necessary to process R (Red signal), G (Green signal) and B (Blue signal) forming a pixel (generally each signal is data of 8 bits) in graphics processing. Because the above-mentioned TMS32020 cannot process at one time the three data of R, G and B (normally 24 bits), an attempt is made to reduce the time required for processing by packaging three TMS 32030 in parallel.

However, since the interconnections on a board have a great parasitic capacitance, data transfer between the chips via such interconnections on a board is more time consuming than that via internal interconnections of an LSI. This is a bottleneck in improving the data processing throughput of the entire system.

The time t required for processing one pixel is expressed by the following equation $$t = t_{proc} + t_{ac1} + T_{ac2} + 2t_{trau}$$

where $t_{proc}$ is the data processing time in pixel processing unit 1 and pixel cache memory 2, $t_{ac1}$ is the access time for reading out data from frame buffer memory 3, $t_{ac2}$ is the access time for writing data into frame buffer memory 3, and $t_{trau}$ is the delay time when data is transferred via an interconnection on a board.

In accordance with the improvement of recent semiconductor integrated circuit device technology, the trend is towards a smaller $t_{proc}$. The values of $t_{ac1}$, $t_{ac2}$, and $t_{rau}$ are also reduced, though the rate thereof is modest in comparison with that of $t_{proc}$.

This means that the processing time t cannot be reduced as long as data transfer on the board is not speeded regardless of how speedily the operation of a LSI used as the image processing unit is. In other words, the processing speed is rate-determined by the data transfer on the board.

There was also a problem that such a conventional graphics processing system required a great time for testing since it is not designed to easily test whether such a system is operating normally or not.

SUMMARY OF THE INVENTION

An object of the present invention is to provide a circuit that can carry out graphics processing more speedily, and a semiconductor integrated circuit device including this circuit.

Another object of the present invention is to provide a graphics processing circuit of small size, and a semiconductor integrated circuit device including this circuit.

A further object of the present invention is to provide a graphic processing circuit of low power consumption, and a semiconductor integrated circuit device including this circuit.

Still another object of the present invention is to provide a graphic processing circuit that can carry out an α-blend process, and a semiconductor integrated circuit device including this circuit.

A still further object of the present invention is to provide a graphics processing circuit that can maintain data of a previous screen when a blending process is not desired to be applied on data of a new screen with data of the previous screen, and a semiconductor integrated circuit device including this circuit.

Yet a further object of the present invention is to provide a graphic processing circuit that can carry out a raster operation, and a semiconductor integrated circuit device including this circuit.

Yet another object of the present invention is to provide a graphic processing circuit that can carry out a Z compare process, and a semiconductor integrated circuit device including this circuit.

Yet a still further object of the present invention is to provide a graphic processing circuit that can carry out flexibly a plurality of types of graphic processes, and a semiconductor integrated circuit device including this process circuit.

An additional object of the present invention is to provide a graphic processing circuit of a simple structure with a low number of components, and a semiconductor integrated circuit device including this circuit.

Another object of the present invention is to facilitate modification and extension of the feature in a graphic processing circuit and to reduce the designing time period thereof.

A further object of the present invention is to provide a graphic processing circuit that can easily and accurately carry out testing, and a semiconductor integrated circuit device including this circuit.

A semiconductor integrated circuit device according to an aspect of the present invention includes a semiconductor substrate, a data input terminal, first and second memories, first to fourth transfer buses, and an image processing circuit. Image data is externally applied to the data input terminal. The first memory is formed at the semiconductor substrate and stores a plurality of image data. The second memory is formed at the semiconductor substrate and stores a plurality of data. The first transfer bus is formed at the semiconductor substrate, and transfers image data between the first and second memories. The image processing circuit is formed at the semiconductor substrate, and carries out a predetermined operation according to first and second image data. The second transfer bus is formed at the semiconductor substrate, and transfers the first image data from the second memory to the image processing circuit. The third transfer bus is formed at the semiconductor substrate, and transfers the second data from the data input terminal to the image processing circuit. The fourth transfer bus is formed on the semiconductor substrate, and transfers the resultant data from the image processing circuit to the second memory.

The image processing circuit preferably includes first to third input nodes, a multiplier, and an adder. Blending rate data indicating the ratio of blending the current image data that is currently displayed with the image data of the next screen to be displayed is applied to the first input node. The current image data is applied as the first image data to the second input node. The next image data is applied to the third input node as the second image data. The multiplier multiplies the blending rate data from the first input node by the current image data from the second input node. The adder adds the resultant data from the multiplier with the next image data from the third input node.

The image processing circuit preferably includes a match comparator, a magnitude comparator, and a logic circuit. The match comparator compares the current depth data provided as the first image data with the next depth data provided as the second image data to make determination whether the current depth data matches the next depth data. The magnitude comparator compares the current depth data with the next depth data to make determination of the magnitude of the current depth data and the next depth data. The logic circuit responds to the results of the match comparator and the magnitude comparator to generate a control signal.

Preferably, the first memory is a dynamic random access memory, and the second memory is a static random access memory.

More preferably, the first transfer bus includes a predetermined number of data lines, and the third transfer bus includes a number of data lines fewer than that of said predetermined number.

A semiconductor integrated circuit device according to another aspect of the present invention includes a semiconductor substrate, a data input terminal, first and second memories, first to fourth transfer buses, an operation circuit, a compare circuit, a video output terminal, a serial access memory, a control signal input terminal, a control signal output terminal, and a logic circuit. The first memory is formed at the semiconductor substrate, and stores a plurality of data. The second memory is formed at the semiconductor substrate, and stores a plurality of data. The first transfer bus is formed on the semiconductor substrate, and transfers data between the first and second memories. The operation circuit is formed at the semiconductor substrate, and carries out a predetermined operation according to first and second data. The compare circuit is formed at the semiconductor substrate, and compares the first data with the second data. The second transfer bus is formed on the semiconductor substrate, and transfers the first data from the second memory to the operation circuit and the compare circuit. The third transfer bus is formed on the semiconductor substrate, and transfers the second data from the data input terminal to the operation circuit and the compare circuit. The fourth transfer bus is formed on the semiconductor substrate, and transfers the resultant data from the operation circuit to the second memory. The serial access memory is formed at the semiconductor substrate, and stores data readout from the first memory, and provides the stored data serially via the video output terminal. A predetermined control signal is externally applied to the control signal input terminal. The logic circuit responds to a control signal from the control signal input terminal and a resultant signal from the compare circuit to provide a write enable signal to the second memory. The second memory responds to a write enable signal to enable writing of the resultant data transferred by the fourth transfer path from the operation circuit. The resultant signal from the compare circuit is output via the control signal output terminal.

Preferably, the operation circuit is formed of a plurality of pipeline stages. The compare circuit and the logic circuit are formed of pipeline stages identical in number to the pipeline stages of the operation circuit.

In the semiconductor integrated circuit device of the first aspect, the first and second memories, the first to fourth transfer buses, and the image processing circuit are formed on one chip, so that image data for graphics is processed at high speed.

Since one multiplier is provided in the image processing circuit that carries out an α blending process, the size of the image processing circuit is small. The image processing circuit includes a match comparator, a magnitude comparator, and a logic circuit, so that the process for graphics, for example a Z compare process, can be carried out flexibly.

Since the first memory is a dynamic random access memory, and the second memory is a static random access memory with the first transfer bus having a width greater than that of the third transfer bus, image data for graphics is processed more speedily.

In the semiconductor integrated circuit device according to the another aspect of the present invention, an operation circuit and a compare circuit are provided, so that color data and depth data are processed in parallel.

When the second memory attains a write enable state in response to an externally applied control signal by fixing the output of the compare circuit, the semiconductor integrated circuit can process only color data for graphics. When the second memory attains a write enable state in response to a resultant signal from the compare circuit by fixing the potential of the control signal input terminal and externally applied depth data is passed through the operation circuit, the semiconductor integrated circuit device can process only the depth data for graphics. By providing two such semiconductor integrated circuit devices, connecting the control signal input terminal of one semiconductor integrated circuit device to the control signal output terminal of the other semiconductor integrated circuit device, fixing the potential of the other control signal input terminal and setting the operation circuit of the other semiconductor integrated circuit device to a passing state, the one semiconductor integrated circuit processes only color data, and the other semiconductor integrated circuit device processes only depth data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
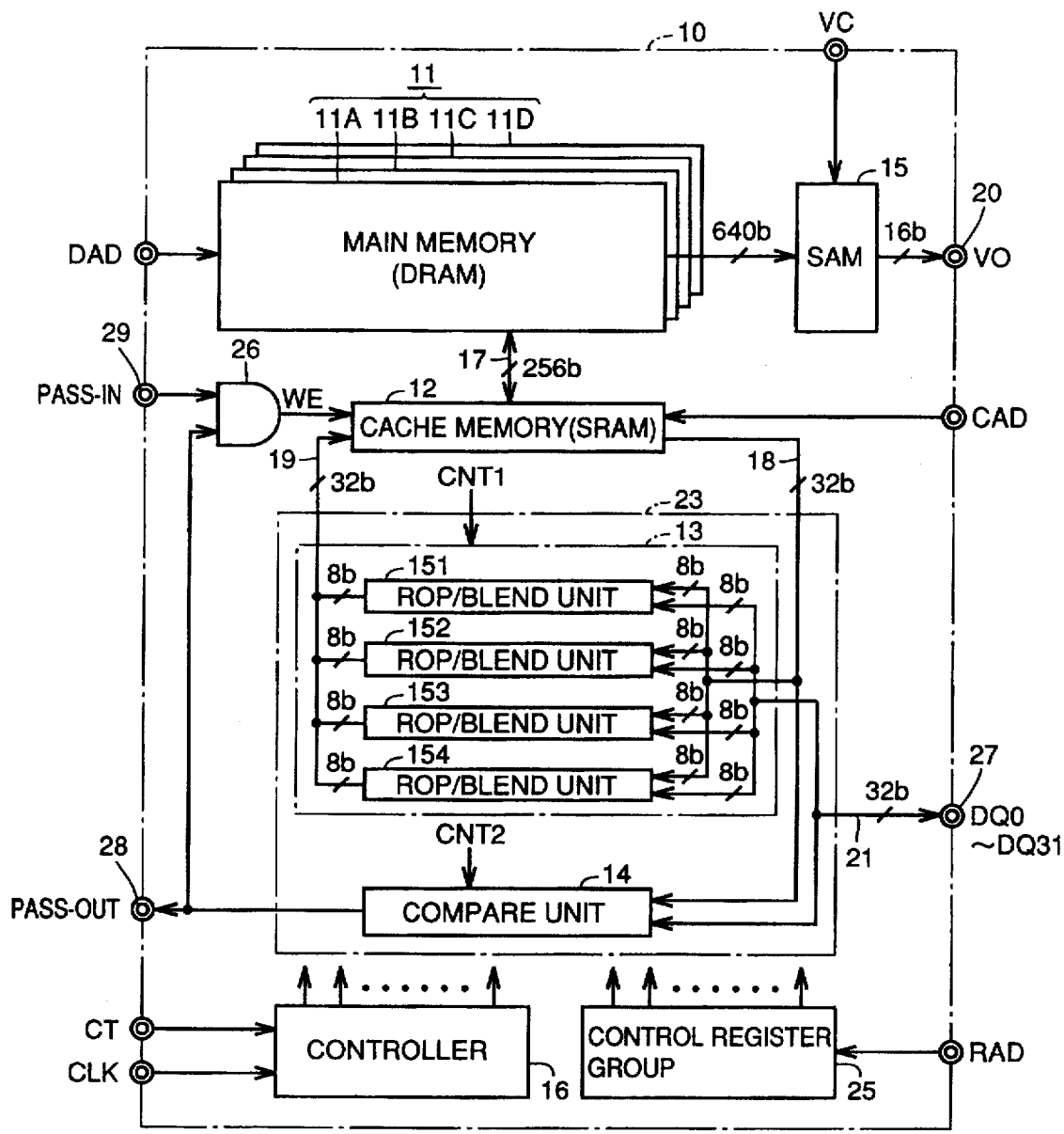
FIG. 1 is a block diagram showing the entire structure of a semiconductor integrated circuit device according to Embodiment 1 of the present invention.

Embodiments of the present invention will be described in detail with reference to the drawings. In the drawings, the same reference characters denote the same or corresponding components.

Embodiment 1

Figure 2:
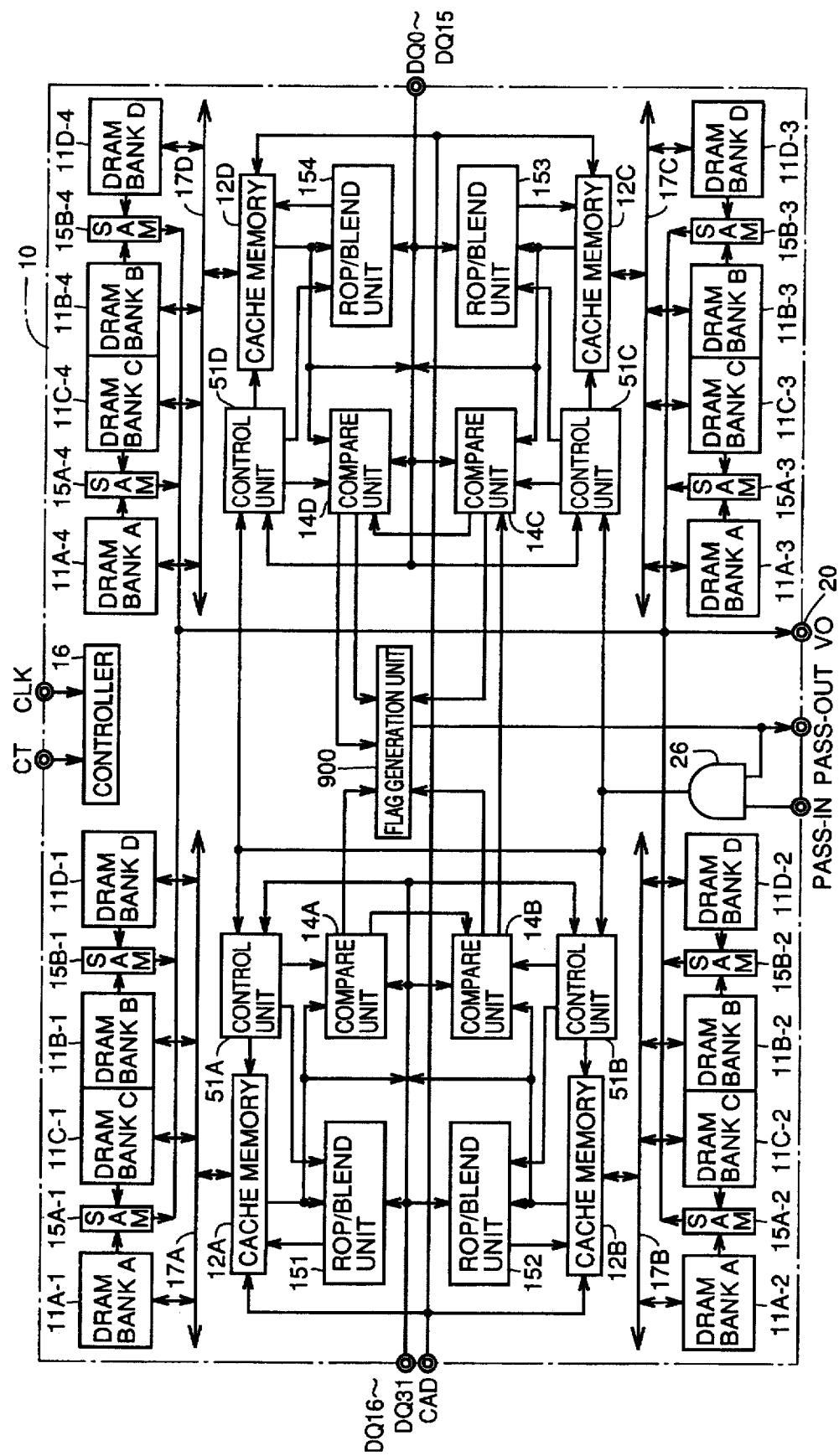
FIG. 2 is another block diagram showing the entire structure of the semiconductor integrated circuit device of FIG. 1.
Figure 3:
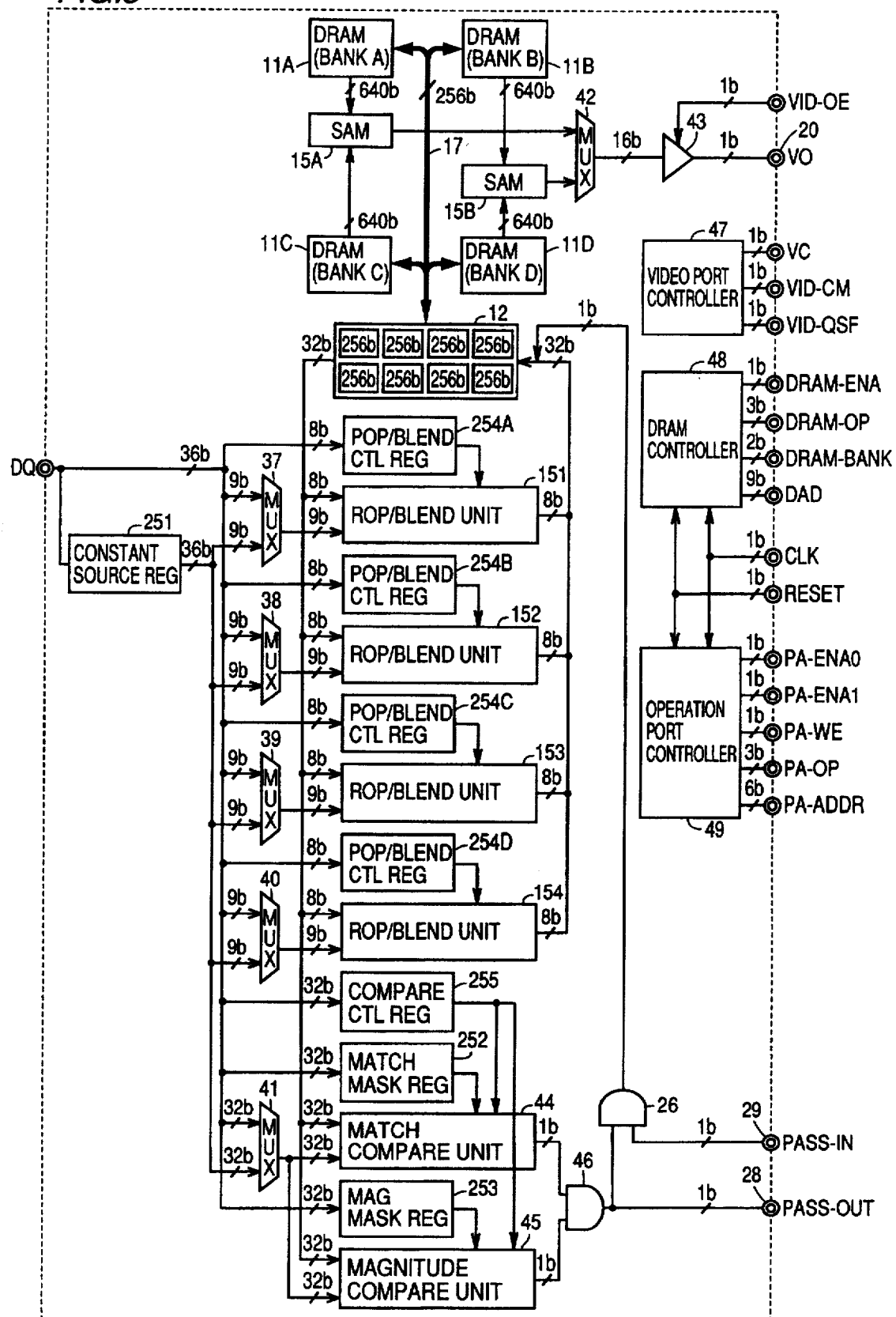
FIG. 3 is a further block diagram showing the entire structure of the semiconductor integrated circuit device of FIGS. 1 and 2.

FIGS. 1–3 are block diagrams showing the entire structure of a frame buffer memory according to Embodiment 1 of the present invention. FIG. 2 particularly shows the layout of the frame buffer memory of FIG. 1. FIG. 3 is a block diagram viewed from a point different from that of FIG. 1.

Referring to FIG. 1, a frame buffer memory 10 includes a main memory 11 formed of a Dynamic Random Access Memory (DRAM), a cache memory 12 formed of a Static Random Access Memory (SRAM), and an operation unit 23 for calculating data provided from cache memory 12 and data DQ0–DQ31 provided via data input/output terminal 27 on at least one semiconductor substrate 1.

Main memory 11 includes four banks 11A–11D, as also shown in FIGS. 2 and 3. Each bank has (512×640×8) memory cells (not shown), so that data of 2.6 megabits can be stored. Therefore, the entire main memory 11 has a storage capacity of 10.5 megabits, allowing storage of image data of ¼ frame on the display.

Cache memory 12 is formed of eight memory blocks as shown in FIG. 3. Each memory block can store 256 bits of data. Therefore, cache memory 12 can store data of 2 kilobits.

A global bus 17 of 256 bits is provided between main memory 11 and cache memory 12. Global bus 17 allows data transfer for every 256 bits from main memory 11 to cache memory 12, and from cache memory 12 to main memory 11. One memory block of cache memory 12 is rewritten by 256 bits of data transferred from main memory 11. When data is transferred from cache memory 12 to main memory 11, data of one memory block in cache memory 12 is transferred as a group.

Referring to FIG. 1 again, operation unit 23 includes a pixel processing unit 13 and a compare unit 14. Image processing unit 13 includes four raster operation (ROP)/blend units 151–154. Pixel processing unit 13 carries out a predetermined operation process according to 32 bits of data provided from cache memory 12 via data bus 18, and 32 bits of data DQ0–DQ31 provided via data bus 21. As a result of the operation process, resultant data of 32 bits is generated in pixel processing unit 13. This resultant data is rewritten into cache memory 12 via data bus 19. Here, each ROP/blend unit applies an operation on 8 bits of the 32 bits of data from cache memory 12 and 8 bits of the externally applied 32 bits of data DQ0–DQ31.

Compare unit 14 compares 32 bits of data provided from cache memory 12 via data bus 18 with 32 bits of data DQ0-DQ31 provided via data bus 21 to generate a flag output signal PASS-OUT indicating the comparison result. Flag output signal PASS-OUT is output via control signal output terminal 28, and also applied to an AND gate 26. A flag input signal PASS-IN is applied to AND gate 26 via a control signal input terminal 29. AND gate 26 provides an AND signal of signals PASS-IN and PASS-OUT to cache memory 12 as write enable signal WE. When this write enable signal WE attains a H level (logical high), the resultant data of pixel processing unit 13 is written into cache memory 12.

Frame buffer memory 10 further includes a serial access memory (SAM) 15 for generating a video output data VO to display the image stored in main memory 11 on a display. Serial access memory 15 reads out data from main memory 11 for every 640 bits, and provides the readout data via a video output terminal 20 as video output data VO for every 16 bits in response to a video clock signal VC.

As shown in FIGS. 2 and 3, serial access memory 15 is divided into two. One serial access memory 15A reads out data from either main memory 11A or 11C. The other serial access memory 15B reads out data from either main memory 11B or 11D. The data from serial access memory 15A and serial access memory 15B are alternately selected by a multiplexer 42. The selected data is output as video output data VO via a tristate buffer 43. Video output data VO is output at high speed since data is transferred from a corresponding main memory to the other serial access memory 15B while data is output from one serial access memory 15A.

Frame buffer memory 10 further includes a controller 16. Controller 16 responds to externally applied control signal CT and clock signal CLK for generating a control signal to control main memory 11, cache memory 12, serial access memory 15 and operation unit 23. Pixel processing unit 13 operates in response to a control signal CNT1 from controller 16. Compare unit 14 operates in response to a control signal CNT2 provided from controller 16.

Data transfer bus 18 allows data to be provided to the outside world via data input/output terminal 27 as well as from cache memory 12 to operation unit 23.

The above-described main memory i1, cache memory 12, pixel processing unit 13, compare unit 14, serial access memory 15, the control register group, and controller 16 all are formed on one semiconductor substrate.

Figure 4:
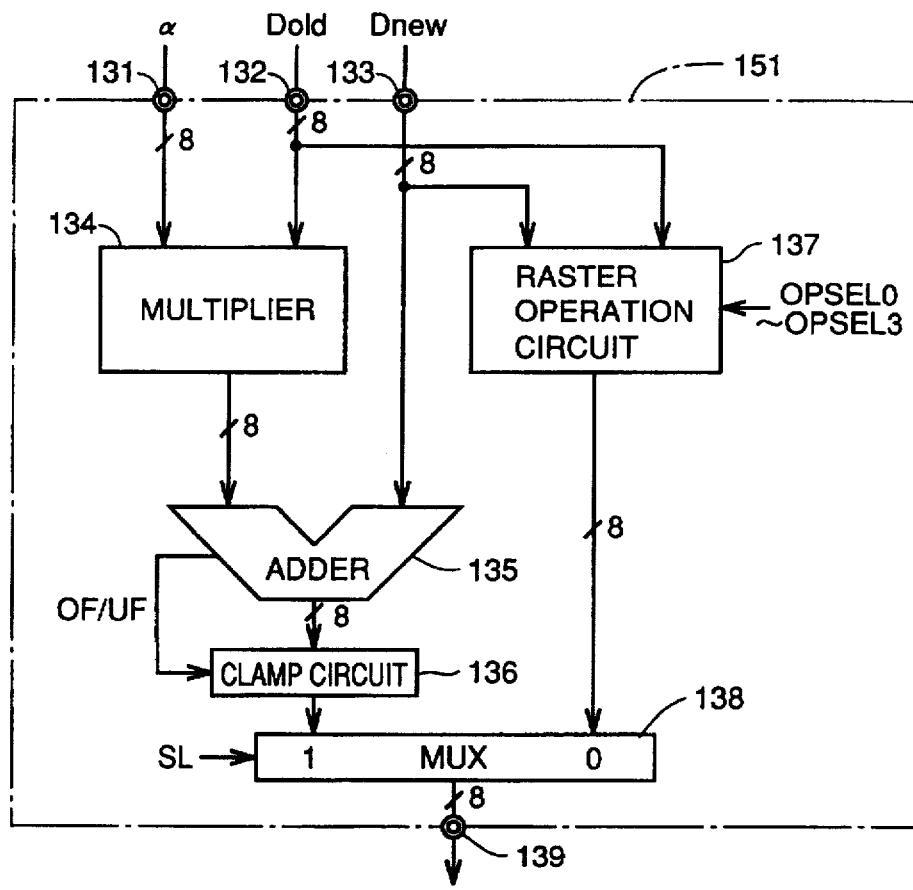
FIG. 4 is a block diagram showing a structure of a ROP/blend unit in the semiconductor integrated circuit device of FIGS. 1-3.

FIG. 4 is a block diagram showing a structure of a ROP/blend unit 151 of image processing unit 13 in frame buffer memory 10 of FIGS. 1-3. Each of ROP/blend units 152-153 has a structure similar to that of ROP/blend unit 151.

Referring to FIG. 4, ROP/blend unit 13 includes three input nodes 131-133, a multiplier 134, an adder 135, a clamp circuit 136, a raster operation circuit 137, a multiplexer (MUX) 138, and an output node 139.

Multiplier 134 multiplies the 8-bit of data from input node 131 by the 8-bit of data from input node 132. Adder 135 adds the resultant data from multiplier 134 with the data from input node 133. Clamp circuit 136 sets the resultant data from adder 135 to a positive maximum value in response to an overflow flag signal OF in the case of an overflow of adder 135, and sets the resultant data from adder 135 as zero in response to an underflow flag signal UF in the case of an underflow of adder 135. Here, multiplier 134, adder 135, and clamp circuit 136 serve to carry out an α-blend process according to data provided from the three input nodes.

Raster operation circuit 137 carries out a predetermined logic operation that will be described afterwards according to 8 bits of data from input node 132 and 8 bits of data from input node 133.

Multiplexer 138 selects an output from either clamp circuit 136 or raster operation circuit 137 in response to a select signal SL. The selected output is provided via output node 139.

Figure 5:
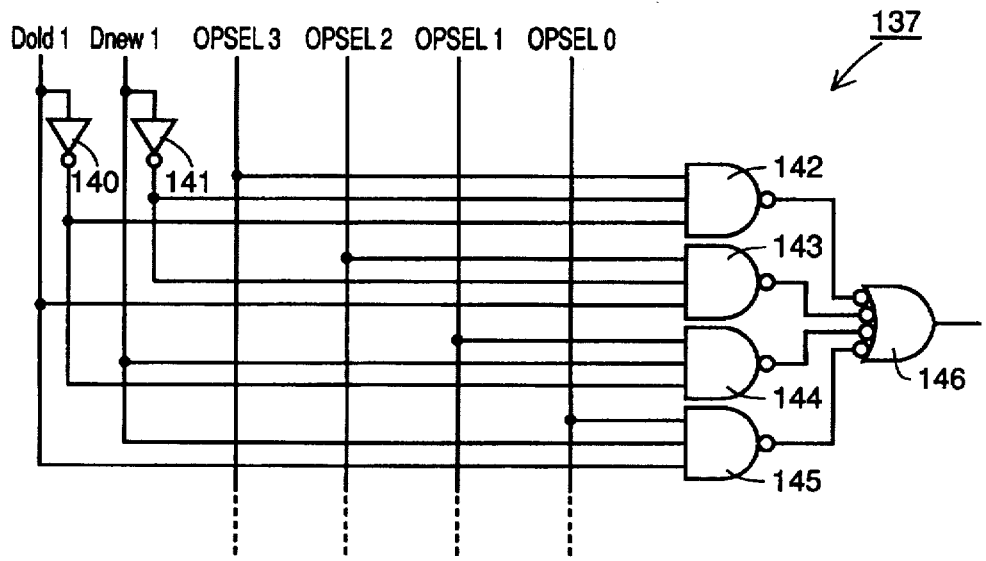
FIG. 5 is a circuit diagram showing a structure of a raster operation circuit in the ROP/blend unit of FIG. 4.

FIG. 5 is a circuit diagram showing partially raster operation circuit 137 of ROP/blend unit 151 of FIG. 4. A circuit is shown for processing one bit of data Doldl and Dnewl out of the 8 bits of data Dold and Dnew provided from input nodes 132 and 133 in FIG. 5. The circuits for processing the remaining 7 bits of data Dold and Dnew have a similar structure.

Referring to FIG. 5, the circuit for processing Doldl and Dnewl of raster operation circuit 137 includes inverters 140 and 141, NAND gates 142-145, and a NAND gate 146.

1 bit data Doldl from input node 132 is applied to NAND gates 143 and 145 as well as to NAND gates 142 and 144 via inverter 140. 1 bit data Dnewl from input node 133 is applied to NAND gates 144 and 145 as well as to NAND gates 142 and 143 via inverter 141.

Operation select signals OPSEL0, OPSEL1, OPSEL2, and OPSEL3 are applied to NAND gates 145, 144, 143, and 142, respectively. Operation select signals OPSEL0-OPSEL3 are similarly applied to a NAND gate for processing other bit data besides 1 bit of data Doldl and Dnewl (not shown). The output signals of NAND gates 142-145 are all applied to NAND gate 146.

Thus, raster operation circuit 137 selects one of 16 types of logic functions in response to operation select signal signals OPSEL0-OPSEL3 to carry out an operation process according to the selected logic function.

The following Table 1 indicates the truth table of this raster operation circuit 137.

TABLE 1

| OPSEL <3><2><1><0> | Logic Function |
|---|---|
| 0000 | 0 |
| 0001 | Dnew and Dold |
| 0010 | Dnew and /Dold |
| 0011 | Dnew |
| 0100 | /Dnew and Dold |
| 0101 | Dold |
| 0110 | Dnew xor Dold |
| 0111 | Dnew or Dold |
| 1000 | /Dnew and/Dold |
| 1001 | /Dnew xor Dold |
| 1010 | /Dold |
| 1011 | Dnew or/Dold |
| 1100 | /Dnew |
| 1101 | /Dnew or Dold |
| 1110 | /Dnew or/Dold |
| 1111 | 1 |

It is appreciated from Table 1 that when all operation select signals OPSEL0-OPSEL3 are "0", the output signal of raster operation circuit 137 is "0" regardless of the input data Dold and Dnew.

When only operation select signal OPSEL0 is "1", and the other operation select signals OPSEL1-OPSEL3 are "0", raster operation circuit 137 carries out an AND operation on the input data Dold and Dnew. Therefore, raster operation circuit 137 provides an output signal of "1" when both the input data Dold and Dnew are "1".

When only operation select signal OPSEL1 is "1", and the other operation select signals OPSEL0, OPSEL2, and OPSEL3 are "0", raster operation circuit 137 carries out an AND operation on the input data Dnew and/Dold which is an inverted version of the input Dold. Therefore, raster operation circuit 137 provides an output signal of "1" when data Dnew is "1" and data Dold is "0".

When operation select signals OPSEL0–OPSEL1 are "1", and the remaining operation select signals OPSEL2 and OPSEL3 are "0", raster operation circuit 137 directly provides the input data Dnew as the output signal. Therefore, raster operation circuit 137 provides an output signal of "1" when the input data Dnew is "1" regardless of the input data Dold.

When all operation select signal OPSEL1–OPSEL2 are "1" and the remaining operation select signals OPSEL0 and OPSEL3 are "0", raster operation circuit 137 carries out an exclusive OR operation on the input two data Dold and Dnew. Therefore, raster operation circuit 137 provides an output signal of "1" when the two input data Dold and Dnew do not match.

When all operation select signals OPSEL0–OPSEL2 are "1", and the other operation select signal OPSEL3 is "0", raster operation circuit 137 carries out an OR operation on data Dold and Dnew. Therefore, raster operation circuit 137 provides an output signal of "1" when at least one of the two input data Dold and Dnew is "1".

When all operation select signals OPSEL0–OPSEL3 are "1", raster operation circuit 137 provides an output signal of "1" regardless of the input data Dold and Dnew.

The result of other combinations of operation select signals OPSEL0–OPSEL3 besides the above-described cases are shown in Table 1.

Figure 6:
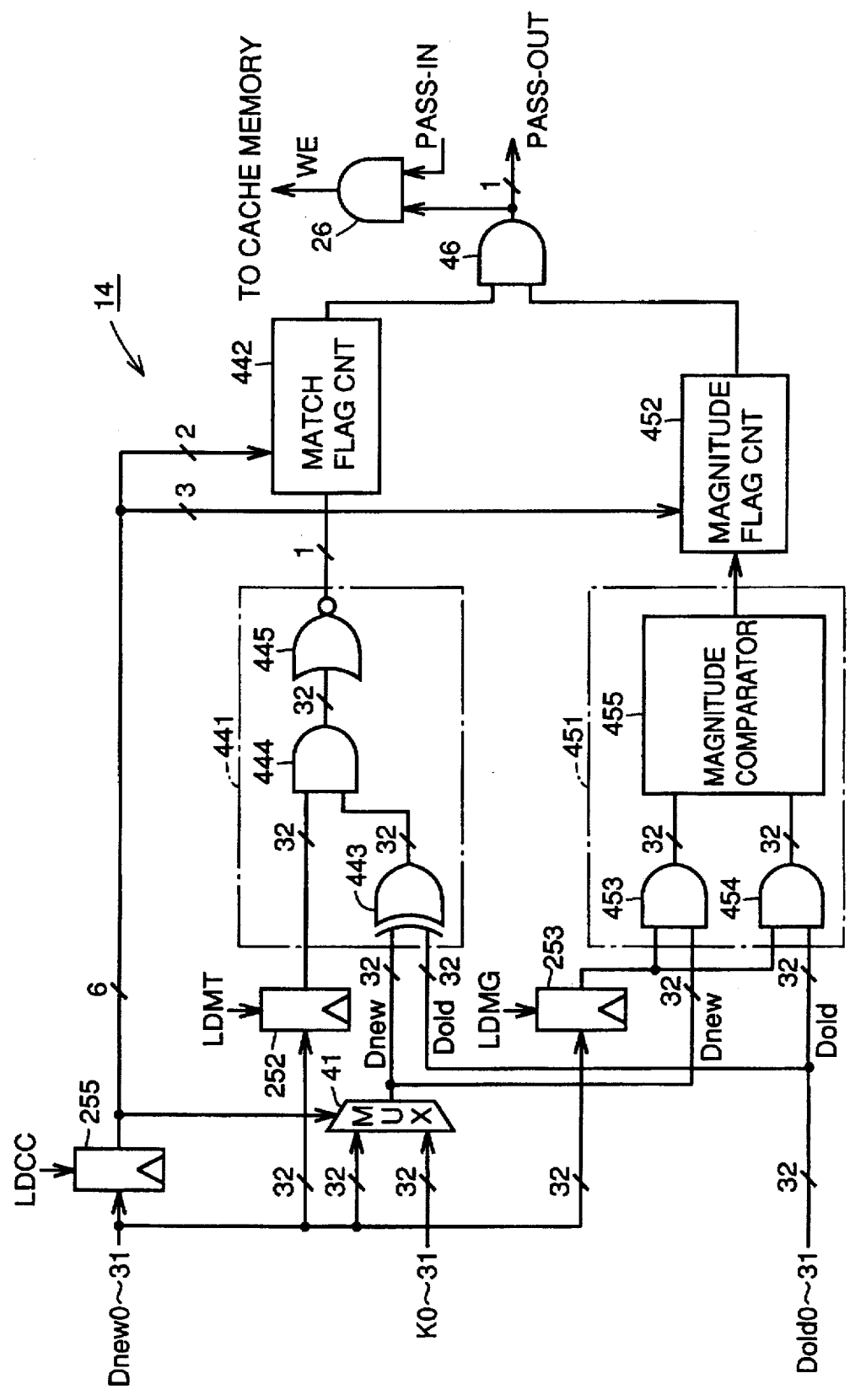
FIG. 6 is a block diagram showing the structure of a compare unit in the semiconductor integrated circuit device of FIG. 1.

FIG. 6 is a block diagram showing an entire structure of compare unit 14 of operation unit 23 in the frame buffer memory of FIG. 1. Referring to FIG. 6, compare unit 14 includes a match compare circuit 441 for comparing 32 bits of data Dnew with 32 bits of data Dold, and a magnitude compare circuit 451 that compares 32 bits of data Dnew with 32 bits of data Dold. Match compare circuit 441 includes 32 EX-OR gates 443, 32 AND gates 444, and one NOR gate 445.

Compare unit 14 further includes a match mask register 252 that can set mask data for masking a particular data out of the 32 bits of data in match compare circuit 441. When any bit in match mask register 252 is set to "0", the output of AND gate 444 of match compare circuit 441 corresponding to that bit attains a L level (logical low) regardless of the output of the corresponding EX-OR gate 443. Therefore, the output signal of EX-OR gate 443 corresponding to this bit is not provided to NOR gate 445. In match compare circuit 441, any of the 32 bits of data is masked in response to the mask data specified by match mask register 252.

Magnitude compare circuit 451 includes thirty two AND gates 453, thirty two AND gates 454, and one magnitude comparator 455. Similar to the above-described match mask register 252, magnitude compare circuit 451 responds to the mask data specified in a magnitude mask register 253 to mask any of the 32 bits.

Compare unit 141 further includes a match flag controller 442 responsive to an output signal of match compare circuit 441 for generating a flag signal, and a magnitude flag controller 452 responsive to an output signal of magnitude compare circuit 451 for generating a flag signal.

Match flag controller 442 includes four operation modes. In the first operation mode, a flag signal of "1" is generated regardless of whether a valid bit of data Dnew and a valid bit of Dold match each other or not. In the second operation mode, a flag signal of "0" is always generated regardless of whether a valid bit of data Dnew and a valid bit of data Dold match each other or not. In a third operation mode, a flag signal of "1" is generated when a valid bit of data Dnew and a valid bit of Dold match each other. In a fourth operation mode, a flag signal of "1" is generated when a valid bit of data Dnew and a valid bit of data Dold do not match each other. The operation mode of match flag controller 442 is determined by data set by a compare control register 255.

Magnitude compare controller 452 includes eight operation modes. In a first operation mode, a flag signal of "1" is always generated regardless of the magnitude relationship between a valid bit of data Dnew" and a valid bit of data Dold". In a second operation mode, a flag signal of "1" is generated when a valid bit of data Dnew" is greater than a valid bit of data Dold". In a third operation mode, a flag signal of "1" is generated when a valid bit of data Dnew" and a valid bit of data Dold" equal each other. In a fourth operation mode, a flag signal of "1" is generated when a valid bit of data Dnew" is greater than a valid bit of data Dold". In a fifth operation mode, a flag signal of "0" is always generated regardless of the magnitude relationship between the valid bits of data Dnew" and Dold". In a sixth operation mode, a flag signal of "1" is generated when a valid bit of data Dnew" is smaller than a valid bit of data Dold". In a seventh operation mode, a flag signal of "1" is generated when a valid bit of data Dnew" and a valid bit of data Dold" do not match each other. In an eighth operation mode, a flag signal of "1" is generated when a valid bit of data Dnew" is smaller than a valid bit of data Dold". The operation mode of magnitude compare controller 452 is determined by data set by compare control register 255.

The flag signals from controllers 442 and 452 are both applied to AND gate 46, whereby an AND signal thereof is output as a flag output signal PASS-OUT.

In compare unit 14, externally applied data Dnew0–Dnew31 are provided to match compare circuit 441 and magnitude compare circuit 451 via multiplexer 41. Data Dold0–Dold31 provided from cache memory 12 are applied to both match compare circuit 441 and magnitude compare circuit 451.

If necessary, constant data K0–K31 are applied instead of data Dnew0–Dnew31 to match compare circuit 441 and match compare circuit 451 via multiplexer 41. The provision of either data Dnew and constant data K is determined by the data set in compare control register 255. Constant data K0–K31 are provided from a contact source register 251 shown in FIG. 3.

The mask data to be set in match mask register 252 is provided in a time-divisional manner with an externally applied data Dnew. Similarly, the mask data to be set in magnitude mask register 253 is provided in a time-divisional manner with an externally applied data Dnew.

The operation of the frame buffer memory according to Embodiment 1 will be briefly described hereinafter.

(1) Initial Operation

In frame buffer memory 10, it is first necessary to write into main memory 11 image data to be displayed on a display. The data to be written into main memory 11 is applied as external data DQ0–DQ31, and stored in cache memory 12 via pixel processing unit 13 and data bus 19. The data stored in cache memory 12 is written into a memory cell specified by an address signal DAD via data bus 17. This operation is carried out for all the addresses in main memory 11.

(2) Image Output Operation

Figure 7:
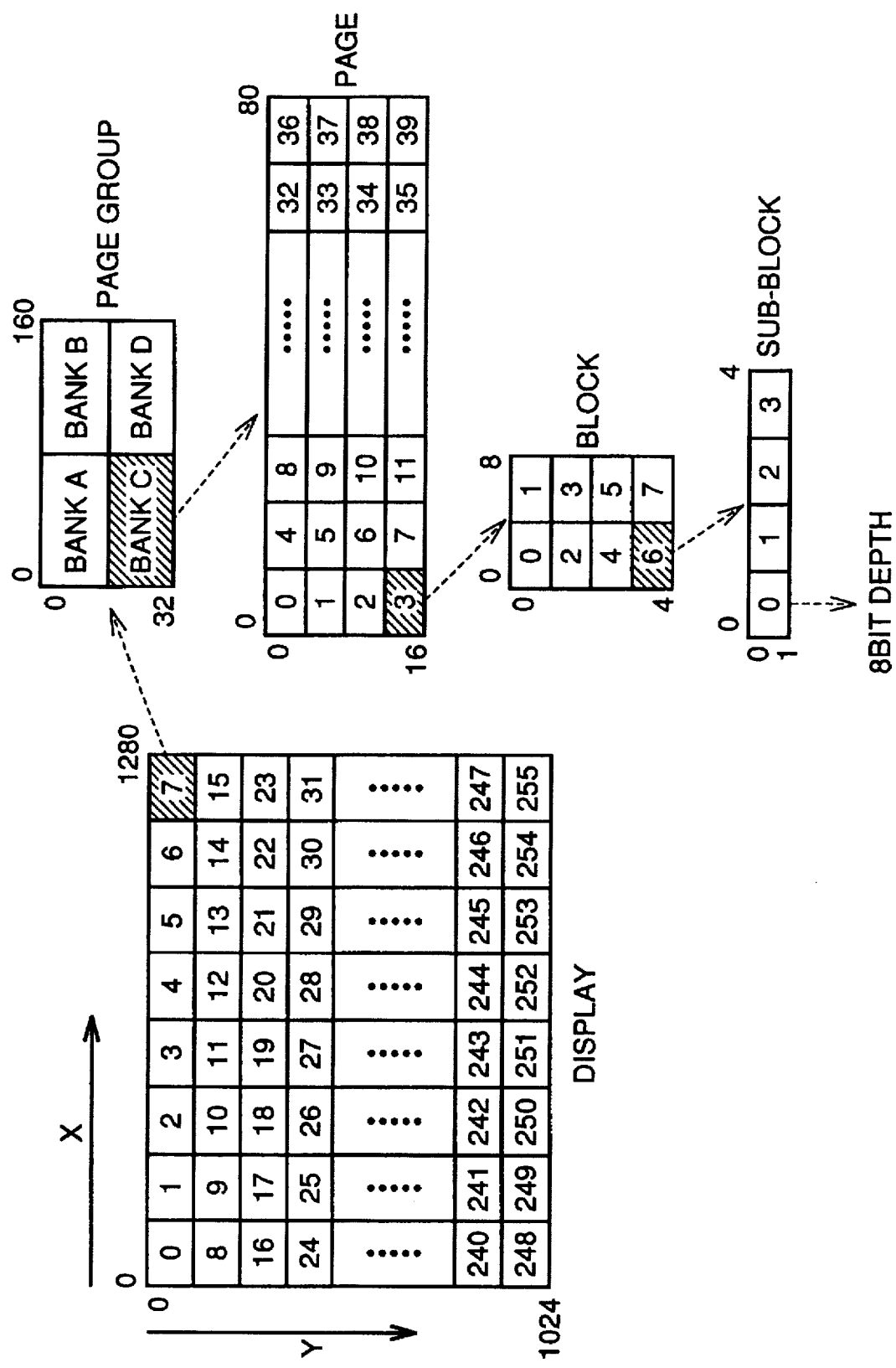
FIG. 7 is a diagram showing the processing method of image data of one frame.

FIG. 7 is a diagram showing the correspondence between a screen displayed on a display and a memory region of main memory 11. As shown in FIG. 7, one frame is divided into 256 page groups. One page group is further divided into four pages. Data of one page is stored into a corresponding bank in main memory 11. Each page is further divided into forty blocks. Each block is divided into eight sub-blocks.

In graphics where the hit rate is improved by setting each page in a rectangular shape, adjacent data are rewritten continuously. This is the case for drawing a square, for example. Therefore, data on a cache memory is preferably made to correspond to a rectangular block on a display. If data is stored in the cache memory in the unit of 1 row, transfer must be carried out frequently between the DRAM and the SRAM when a line is to be drawn in the vertical direction.

The data written into main memory 11 is transferred for every 256 bits into cache memory 12 via a global bus 17 in response to an address signal DAD. This 256 bits of data corresponds to the block shown in FIG. 7. An operation process is carried out in the unit of a sub-block (1×4×8), and transfer to a SAM is carried out in the unit of one line of a page (1×80×8).

Figures 8, 9:
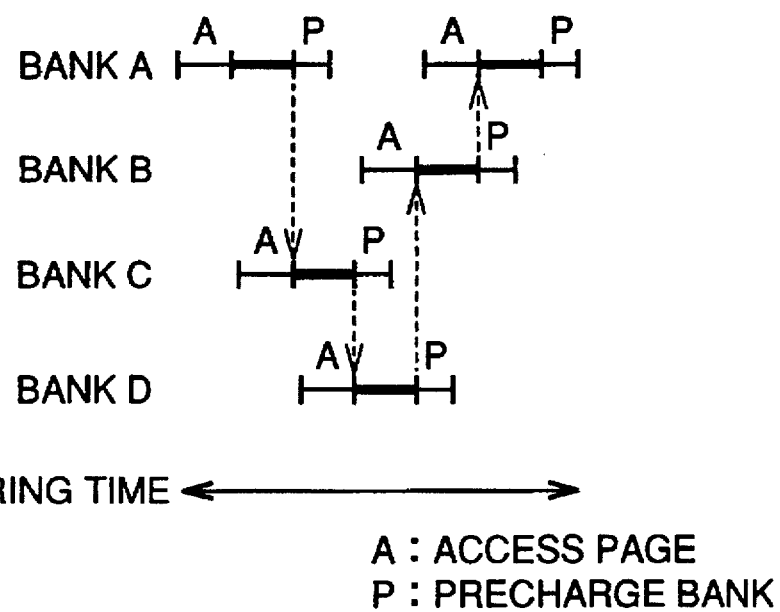
FIG. 8 shows the manner of image data stored in a main memory when the bank of the main memory is interleaved.
FIG. 9 is a timing chart showing the bank interleave operation of FIG. 8.
Figures 10, 11:
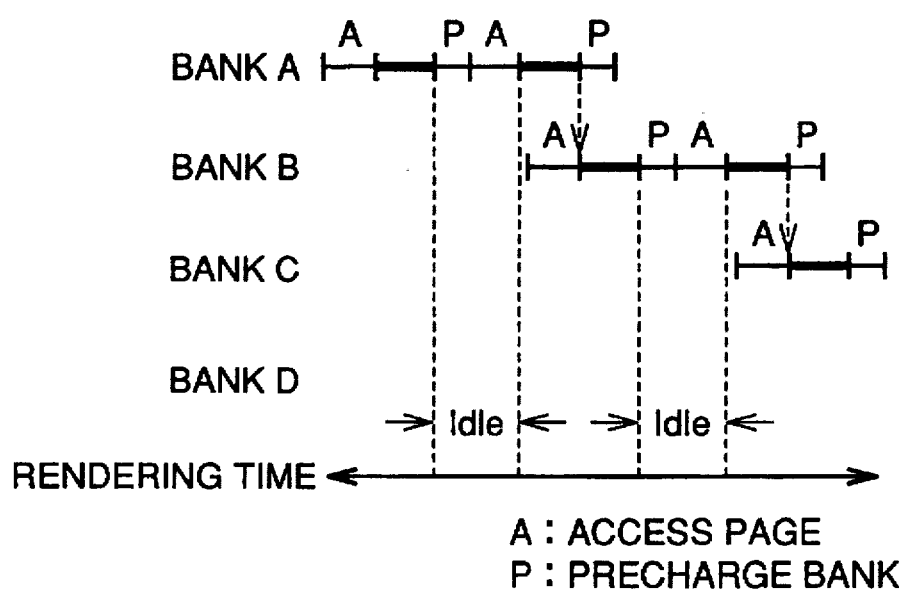
FIG. 10 shows the manner of image data stored in a main memory when the bank of the main memory is not interleaved.
FIG. 11 is a timing chart showing the non-interleave operation of the bank of FIG. 10.

FIGS. 8 and 10 show the correspondence between image data in a frame and a memory region of main memory 11. FIG. 9 is a timing chart showing the manner of data read by serial access memory 15 and the readout data serially output when image data is stored as shown in FIG. 8. FIG. 11 is a timing chart of image data stored as shown in FIG. 10 read out by serial access memory 15 and the serial output. Continuous access to the same bank is prevented by avoiding arrangement of one bank (for example, bank A) adjacent to the same bank. Such an arrangement is effective from the standpoint of speed since access to continuous (adjacent) data is general instead of random rewriting of data in graphic representations.

As shown in FIG. 9, data is output from each bank in an interleaved manner in the case of FIG. 8. Therefore, the execution time period is shorter than that in the case where data is output without being interleaved as shown in FIG. 11. The worst case is when a line is drawn vertically.

Since data is stored as shown in FIG. 8 in Embodiment 1, video output data VO is output speedily from serial access memory 15. Data is output in an interleaved manner by multiplexer 42 as

A:0, B:0, A:1, B:1 . . . , C:0, D:0, C:1, D:1 . . . .

(3) Image Processing Operation

The data written into main memory 11 is transferred to cache memory 12 256 bits at a time via data 17 in response to address signal DAD.

The data transferred to cache memory 12 is sent to pixel processing unit 13 or compare unit 14 32 bits at one time via data bus 18 in response to address signal CAD.

New image data DQ0–DQ31 are applied to pixel processing unit 13 or compare unit 14. Pixel processing unit 13 carries out an operation process specified by control signal CNT1 according to old image data read out from cache memory 12 and new image data DQ0–DQ31. Compare unit 14 carries out a comparison process specified by control signal CNT2 according to old image data read out from cache memory 12 and new image data DQ0–DQ31.

Image processing unit 13 selectively carries out an α-blend process which is a basic process of a three-dimensional graphic process and a logic operation process between image data called a raster operation. In comparison unit 14, a Z compare process is carried out for processing depth information on a CRT.

(3)-1 α Blend Process

An α-blend process carried out in pixel processing unit 13 will be described hereinafter.

An α-blend process is carried out to represent the transparency when a three-dimensional graphical representation is displayed on a CRT. The calculations for carrying out an α-blend process is as in the following equation 2:

$$\begin{cases} \text{OUT}(R) = (1-\alpha) \times \text{Dnew}(R) + \alpha \times \text{Dold}(R) \\ \text{OUT}(G) = (1-\alpha) \times \text{Dnew}(G) + \alpha \times \text{Dold}(G) \\ \text{OUT}(G) = (1-\alpha) \times \text{Dnew}(B) + \alpha \times \text{Dold}(B) \end{cases}$$

where OUT (R) indicates the output value of a red color signal component in a pixel to be actually displayed on the CRT, OUT(G) indicates an output value of a green color signal component in a pixel to be actually displayed on the CRT, and OUT (B) indicates an output value of blue color signal component in a pixel to be actually displayed on CRT.

Dnew (R) indicates an input value of a red color signal component in a pixel to be newly displayed on the CRT, Dnew (G) indicates an input value of a green color signal component in a pixel to be newly displayed on the CRT, and Dnew (B) indicates an input value of a blue color signal component in a pixel to be newly displayed on the CRT.

Dold (R) indicates an input value of a red color signal component in a pixel that is already displayed on the CRT, Dold (G) indicates an input value of a green color signal component in a pixel that is already displayed on the CRT, and Dold (B) shows an input value of a blue color signal component in a pixel already displayed on the CRT.

α indicates the blending rate of data Dold of the screen already displayed on the CRT with data Dnew of a screen to be newly displayed on the CRT. It is a coefficient indicating how much the screen already displayed on the CRT is to be blended into a screen that is to be newly displayed on the CRT.

When this coefficient α is 0, each output value OUT of the RGB is equal to data Dnew to be newly displayed on the CRT. When coefficient α is 1, each output value OUT of the RGB becomes equal to data Dold already displayed on the CRT. Approximately 16000,000 colors (natural color) can be expressed in one pixel when each data of RGB is 8 bits.

The operation of the α-blend process will be described with reference to the block diagram of FIG. 4.

When an α-blend process is carried out in pixel processing unit 13, an 8-bit coefficient α is applied to input node 131, and 8 bits of image data Dold <R>, Dold <G> or Dold <B> already displayed on the CRT is applied to input node 132. Image data Dold is provided from cache memory 12. Data represented by (1–αs)×Dnew is applied to input node 133. Data (1–α)×Dnew is generated by an operation process according to coefficient α by an external IC and data Dnew <R>, <G>, <B>. Therefore, a corresponding one of <R>, <G>, <B> of Dold is applied to input node 133.

Data α applied to input node 131 is multiplied by data Dold applied to input node 132 by multiplier 134. Although the multiplied resultant data α×Dold is (2×8) bits, only the more significant 8 bits of the resultant data α×Dold are applied to adder 135 since the number of bits representing each color component is 8 bits in the present embodiment. Although less significant 8 bits are to be rounded as an error, 0 is deleted and 1 is taken because the value is binary.

In adder 135, resultant data α×Dold provided from multiplier 134 and data (1−α)×Dnew provided to input data 133 are added. For the purpose of data subtraction, an externally applied (1−α)×Dnew can take a complement on "2".

When the value of resultant data (1−α)×Dnew from adder 135 takes a negative value, an underflow flag UF is applied from adder 135 to clamp circuit 136. When the value of resultant data (1−α)×Dnew from adder 135 exceeds 255, an overflow flag signal OF is applied from adder 135 to clamp circuit 136.

In clamp circuit 136, the resultant data from adder 135 is forced to 0 and 255 when underflow flag signal UF and overflow flag signal OF, respectively, are applied.

More specifically, clamp circuit 136 clamps the value to "0" or 255 when the range of the resultant data is outside the range of "0–255".

When an α-blend process is carried out in pixel process unit 13, a select signal SL of "1" is applied to multiplexer 138. Therefore, data from clamp circuit 136 is selected to be output via output node 139.

(3)-2 Raster Operation

A raster operation carried out in pixel processing unit 13 will be described.

Similar to the above-described α-blend process, data Dold already displayed on the CRT is applied to input node 132. Data Dnew to be newly displayed on the CRT is applied to input node 133. Data Dnew is applied as external data DQ0–DQ31.

Data Dold and Dnew are both provided to raster operation circuit 137. Raster operation circuit 137 carries out a logic operation process specified by operation select signals OPSEL0–OPSEL3, according to data Dold and Dnew. The relationship between operation select signals OPSEL0–OPSEL3 and the logic function is as described in the previous Table 1.

When a raster operation is carried out in pixel processing unit 13, select signal SL of 0 is applied to multiplexer 138. As a result, resultant data from raster operation circuit 137 is selected to be output via output node 139.

(3)-3 Z Compare Process

A Z compare process carried out in compare unit 14 will be described hereinafter.

When a three-dimensional graphic representation is to be displayed, each pixel generally includes five data of R, G, B, α, and Z. R, G and B indicate color data, and α indicates the blending rate in the above-described α-blend process. It can be said that this blending rate α also shows the transparency since it indicates how much old data Dold is blended with the new data Dnew. Z is the depth information, and indicates the viewed placement of an object on a screen from the person observing the screen. A greater value of Z implies that it is farther away and a smaller values implies a closer placement.

Figure 12:
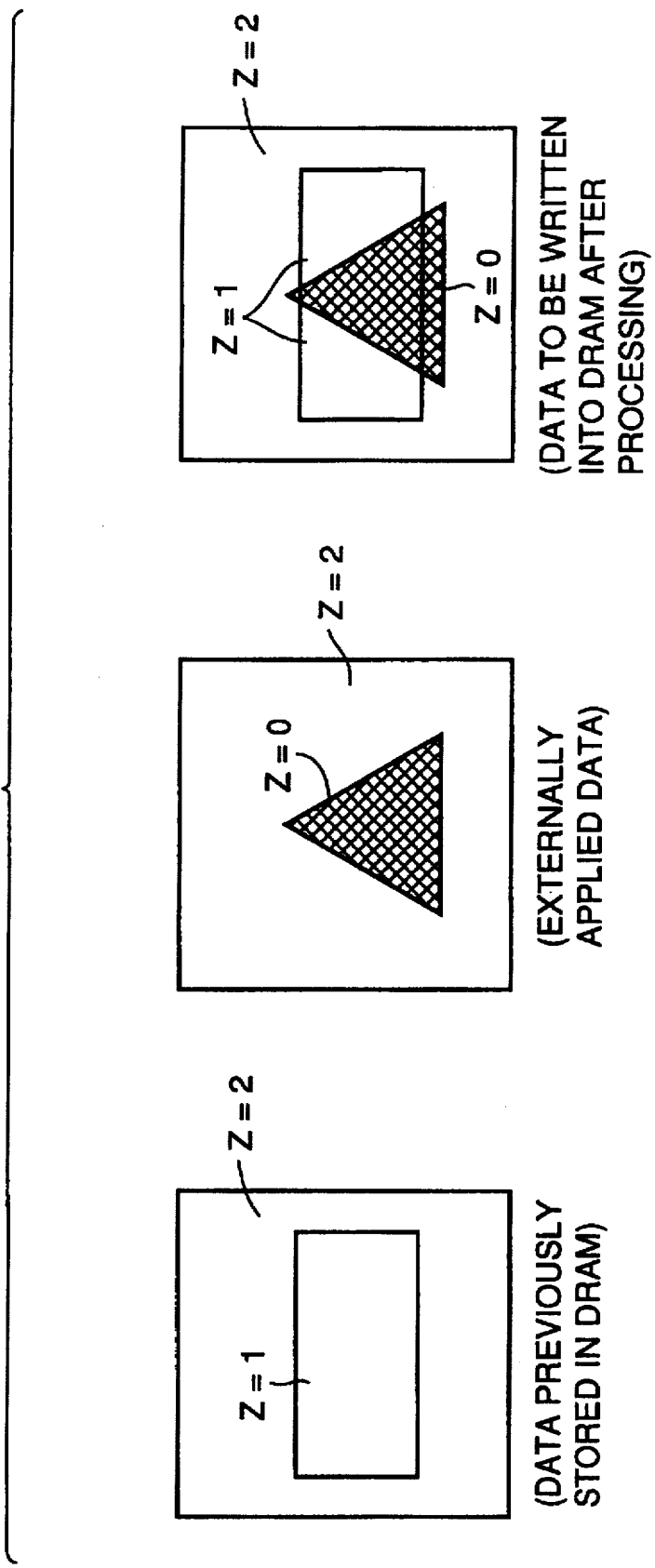
FIG. 12 is a schematic diagram for describing a Z compare process according to the semiconductor integrated circuit device of FIG. 1.

FIG. 12 is a schematic diagram for describing a Z compare process.

It is assumed that data Z as shown in FIG. 12(A) (referred to as "ZA" hereinafter) is stored in advance in main memory 11, and data Z as shown in FIG. 12(B) (referred to as data ZB hereinafter) is applied as external data DQ0–DQ31. Data Z is not displayed.

Data ZA stored in main memory 11 is read out into cache memory 12 via data bus 17. The readout data ZA in cache memory 12 is provided to compare unit 14 via data bus 18. Data ZB is provided to compare unit 14.

In compare unit 14, data ZA from cache memory 12 is sequentially compared with externally applied data ZD for every pixel.

When data ZA is greater than data ZB, the externally applied data ZB is written into cache memory 12. When data ZA is smaller than data ZB, data ZA stored in cache memory 12 is maintained. The result is rewritten into main memory 11.

When the above-described process is carried out for all the pixels of one screen, data having a smaller value of Z is written with priority into main memory 11 as shown in FIG. 12(C).

Although the above has been described about a compare process of value Z, other data such as R, G, B and α can be stored in main memory 11 of frame buffer memory 10 or in the main memory of other frame buffer memories.

The data of R, G, B and α can be processed in a manner similar to that of value Z. Old data already stored in the main memory or data resulting from an operation on externally applied new data and old data must be selected, by which the data in the main memory has to be updated. Therefore, a flag output signal PASS-OUT of compare unit 14 is provided to the outside world. This flag output signal PASS-OUT is applied as a flag input signal PASS-IN to the cache memory of other frame buffer memories. Therefore, frame buffer memory 10 can operate in cooperation with other frame buffer memories. The above-described frame buffer memory 10 can be adapted, not only to a Z buffer for carrying out a Z compare process, but also to a color buffer that carries out a ROP/blend process. Furthermore, allocation of a memory region can be carried out arbitrary according to the size of the display screen. It is also possible to have color data and Z data within one chip. The color data process can be set in the unit of bytes (ROP/blend unit). Furthermore, the compare process can be carried out by masking a bit of the color data.

Thus, the flexibility of frame buffer memory 10 is extremely high.

(3)-4 Stencil Operation

In a stencil operation, a stencil bit where display is to be rewritten is set to 1, and the bit where display is not to be rewritten is set to 0. It is assumed that the more significant 8 bits of the 32 bits of data determining one pixel represent such stencil data, and the lower significant 24 bits represent the depth coordinates (Z data). The operation of compare unit 14 of FIG. 6 will be described hereinafter.

Referring to FIG. 6, the less significant 24 bits are masked in match compare circuit 441. Match compare circuit 441 makes determination whether the more significant 8 bits of data match each other. In magnitude compare circuit 441, the more significant 8 bits are masked. Therefore, the magnitude of the less significant 24 bits are compared in magnitude compare circuit 451.

32 bits of data Dnew and Dold including 8 bits of stencil data and 24 bits of Z data are respectively applied to match compare circuit 441 and magnitude compare circuit 451. In match compare circuit 441, only the stencil data of the 8 significant bits are compared. In magnitude compare circuit 451, only Z data of the less significant 24 bits are compared.

When the stencil data match each other, a flag signal of 1 is output from match flag controller 442. Match flag controller 442 is set so that a flag signal of 1 is output when data Dnew equals data Dold. Magnitude flag controller 452 is set to output a flag signal of 1 when data Dnew is smaller than data Dold.

When the Z data in Dnew is smaller than the Z data in data Dold, a flag signal of 1 is generated from magnitude flag controller 452. Here, flag output signal PASS-OUT becomes 1, indicating that the data in the cache memory must be rewritten.

(3)-5 Color Index Operation

A case is described with reference to FIG. 1 when 32 bits of data representing one pixel is formed of color index data of the less significant 8 bits and Z data of the more significant 24 bits. The 8-bit color index data is to identify one of the 256 colors determined in advance.

First, ROP/blend units 152, 153 and 154 are set to a state where externally applied data DQ8–DQ31 are passed through. Color index data read out from cache memory 12 is provided to ROP/blend unit 151. Externally applied color index data of 8 bits DQ0–DQ7 are provided to ROP/blend unit 151.

Therefore, the color index data applied to ROP/blend unit 151 is subjected to a raster operation process, for example, while externally applied Z data of 24 bits provided to ROP/blend units 152–154 are directly passed through to be output.

In compare unit 14, the less significant 8 bits are masked. Therefore, only Z data of the more significant 24 bits are applied to a Z compare process (including match comparison and magnitude comparison). When the new data has a closer placement on the display than the old data, a flag output signal PASS-OUT of 1 is provided from compare unit 14. Since control signal input terminal 29 is pulled up to a power supply potential not shown, flag output signal PASS-OUT is provided to cache memory 12 as a write enable signal WE. Thus, 8 bits of color index data subjected to an α-blend process and externally applied Z data of 24 bits are written into cache memory 12 via transfer bus 19.

Figure 13:
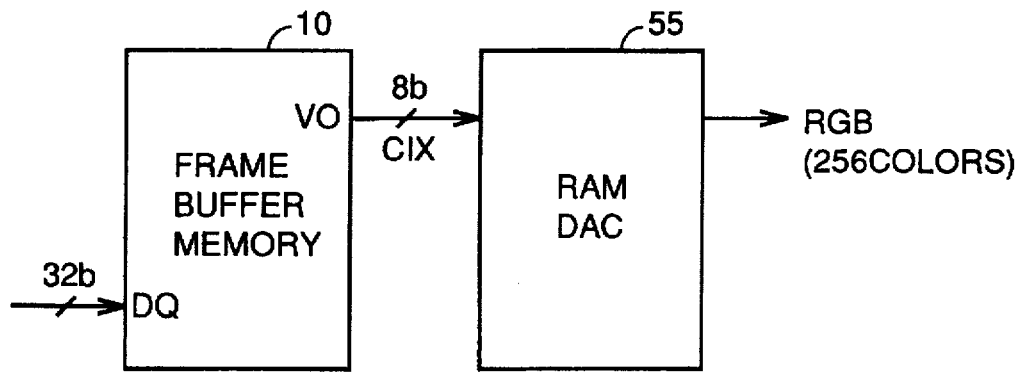
FIG. 13 is a block diagram showing a system structure for processing 32 bits of data including 8 bits of color index data in the semiconductor integrated circuit device of FIG. 1.

As shown in FIG. 13, the 8-bit color index data CIX is applied from frame buffer memory 10 to a RAMDAC (Random Access Memory Digital Analog Converter) 55. RAMDAC 55 responds to color index data CIX to select one of the 256 types of colors stored in advance in the look up table.

As described above, frame buffer memory 10 can carry out a single operation of a raster operation, an α-blend process, or a Z compare process, as well as color data process in pixel processing unit 13 in parallel to a Z compare process in compare unit 14.

Figure 14:
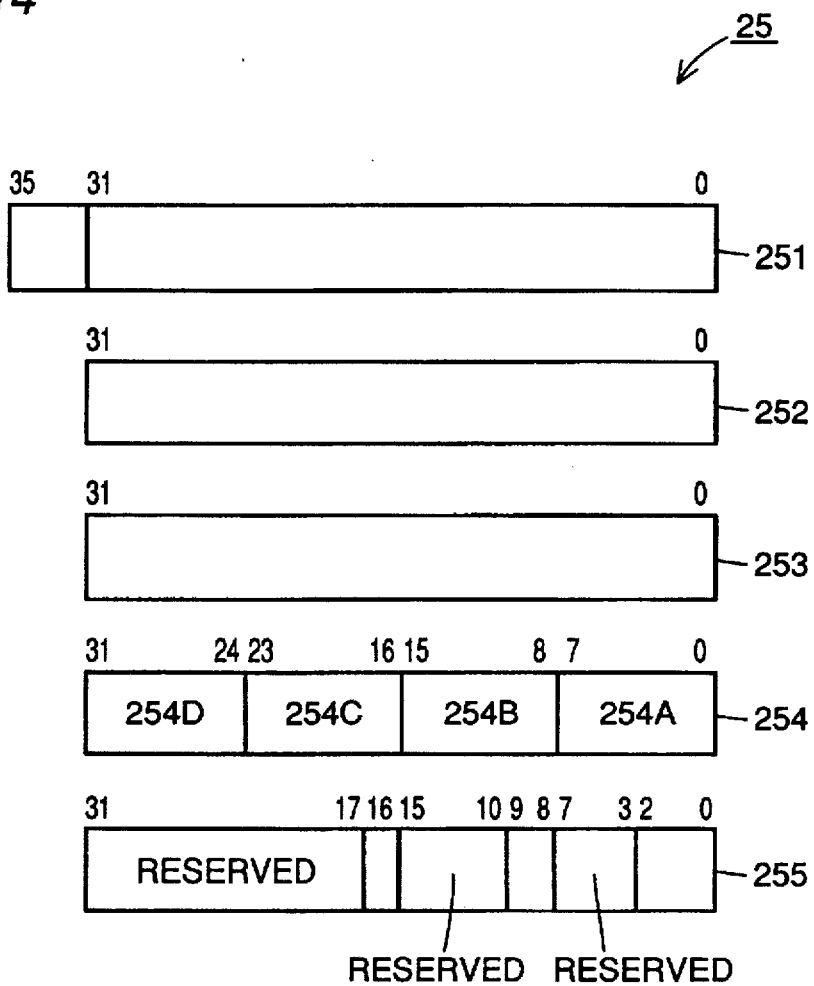
FIG. 14 is a diagram showing a structure of a control register group of FIG. 1.

FIG. 14 is a diagram indicating a control register group for determining the process to be carried out by frame buffer memory 10. Referring to FIG. 14, a control register group 25 includes a contact source register 251, a match mask register 252, a magnitude mask register 253, a ROP/blend control register 254, and a compare control register 255. Data is written into a register according to an externally applied register write operation code and an address signal RAD.

The following Table 2 indicates the relationship between address signal RAD provided to control register group 25 and a corresponding selected control register. For example, when an address signal RAD of "000001" is applied, constant source register 251 is selected.

TABLE 2

| RAD | Control register |
| --- | --- |
| 000001 | Constant source |
| 000010 | Match mask |
| 000011 | Magnitude mask |
| 000100 | ROP/blend unit |
| 000101 | Comparison control |

Referring to FIG. 14, when constant source register 151 is reset, the data is forced to the value of "00000000H". "H" implies that the preceding numbers are 16-ary. In the 0–31st bits, the 32 bits of data DQ provided from data input terminal 27 are set. Four bits of data applied to the DX terminal are set in the 32–35th bits. Here, the DX terminal corresponds to the fourth input node (α indicates "1"). DQ24–DQ31 correspond to the 35th bit, DQ16–DQ23 correspond to the 34th bit, DQ8–DQ15 corresponds to the 33rd bit, and DQ0–DQ7 correspond to the 32nd bit.

When match mask register 252 is reset, the data is forced to "00000000H". The 32 bits of data applied to data input terminal 27 are set into the 0–31st bits. When the value of each bit is 0, the corresponding bits are masked. When the value of a bit is 1, the corresponding bit is not masked. Thus, all the bits are masked when match mask register 252 is reset.

When magnitude mask register 253 is reset, the data is forced to "00000000H". The remaining operation is similar to that of the above-described match mask register 252.

The 0–7th bits of ROP/blend control registers 254 control ROP/blend unit 151. The 8–15th bits control ROP/blend unit 152. The 16–23rd bits control ROP/blend unit 153. The 24–31st bits control ROP/blend unit 154. When ROP/blend control register 254 is reset, the data is forced to "03030303H". This sets a mode where externally applied data is passed through. The following Table 3 indicates the role of the 8 bits of data controlling each unit.

TABLE 3

| <3> <2> <1> <0> | |
| --- | --- |
| <4> | Function |
| 0 | ROP Output Selection |
| 1 | Blend Output Selection |
| <5> | Function (ROP, Input Data Selection to Adder) |
| 0 | External Pin Input Data |
| 1 | Constant Source Register |
| <7> <6> | |
| 00 | 100H |
| 01 | Constant Source Register |
| 10 | DX<n>, DQ<8n + 7:8n> n:unit number |
| 11 | DX<3> :DQ<31:24> |

When compare control register 255 is reset, the data is forced to the value of "00000000H". The 0–2nd bits control magnitude flag controller 452. The 8th and 9th bits control match flag controller 442. The 16th bit selects either data DQ provided from data input terminal or constant data K stored in constant source register 251. The following Table 4 indicates the role of the 0–2nd bit, the eighth, the ninth, and the sixteenth bits.

TABLE 4

| <2> <1> <0> | Function |
|---|---|
| 000 | Pass always |
| 001 | Pass if Dnew > Dold |
| 010 | Pass if Dnew = Dold |
| 011 | Pass if Dnew ≧ Dold |
| 100 | Pass never |
| 101 | Pass if Dnew ≦ Dold |
| 110 | Pass if Dnew ≠ Dold |
| 111 | Pass if Dnew < Dold |
| <9> <8> | Function |
| 00 | Pass always |
| 01 | Pass never |
| 10 | Pass if Dnew = Old |
| 11 | Pass if New ≠ Old |
| <16> | Select Data |
| 0 | Data Input Terminal |
| 1 | Constant Source Register |

(4) Pipeline Operation

Figure 15:
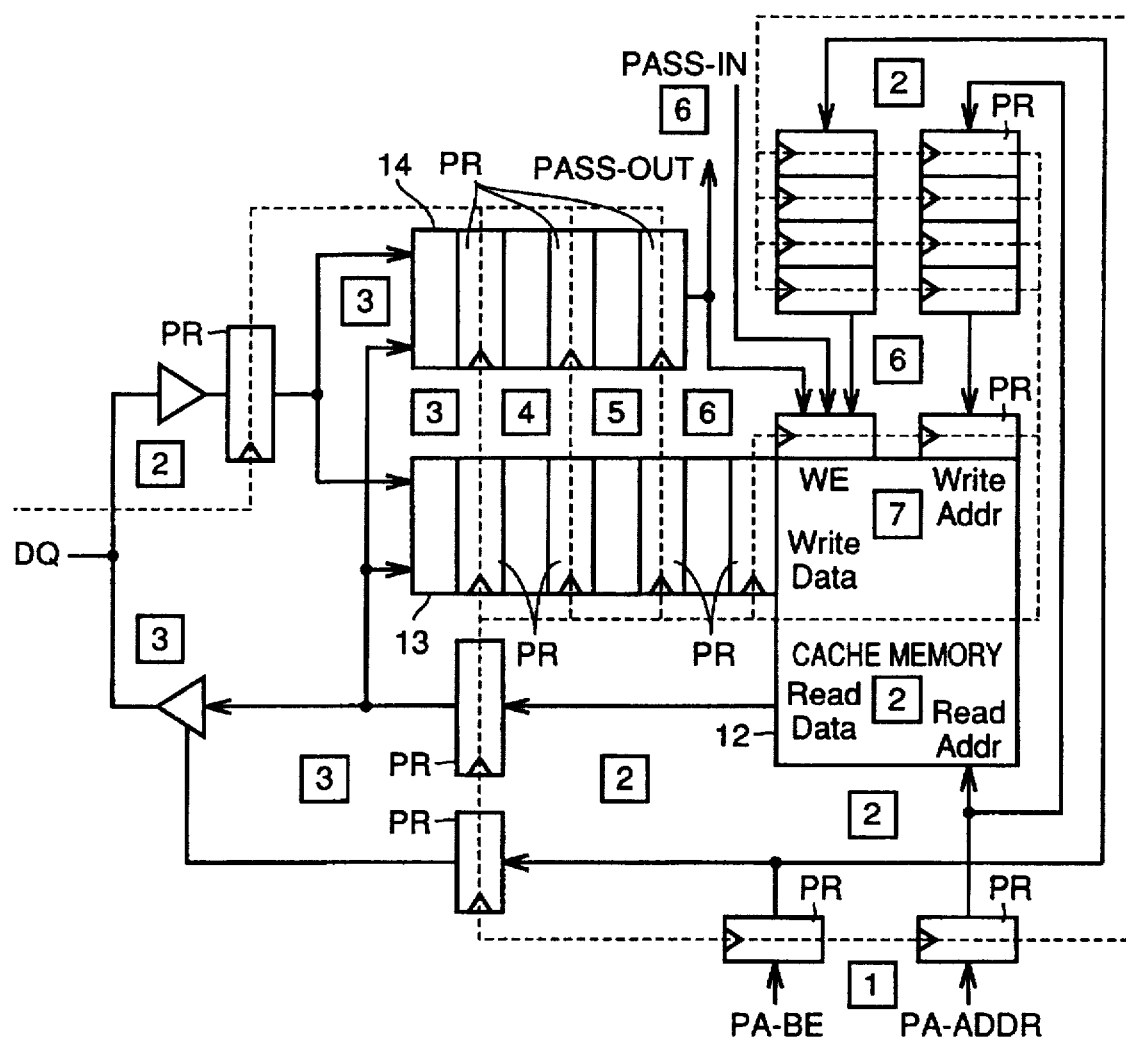
FIG. 15 is a block diagram showing a pipeline structure of the semiconductor integrated circuit device of FIGS. 1–3.
Figure 16A:
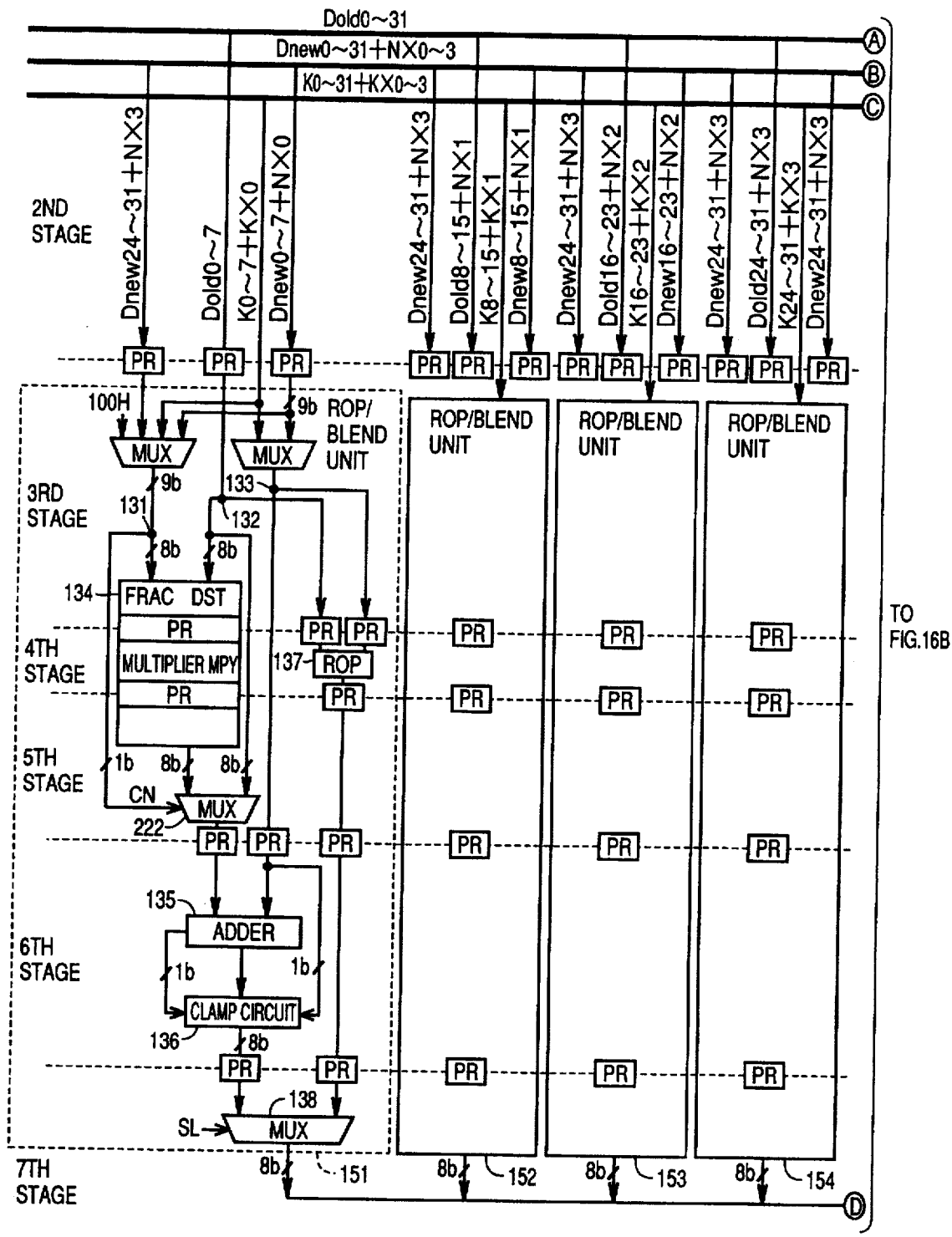
FIGS. 16A and 16B are block diagrams showing the pipeline structure of FIG. 15 in further detail.
Figure 16B:
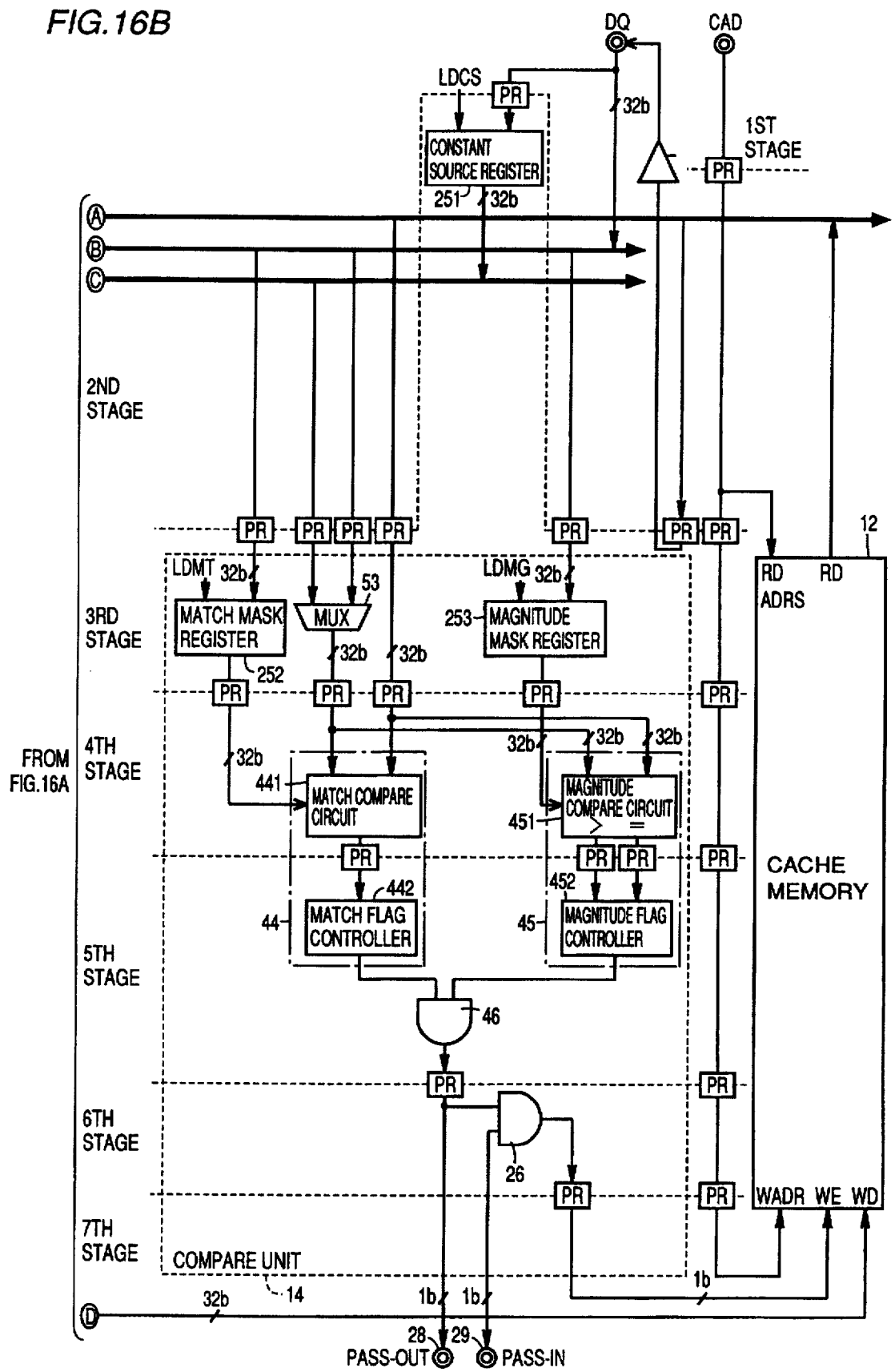
Figure 17:
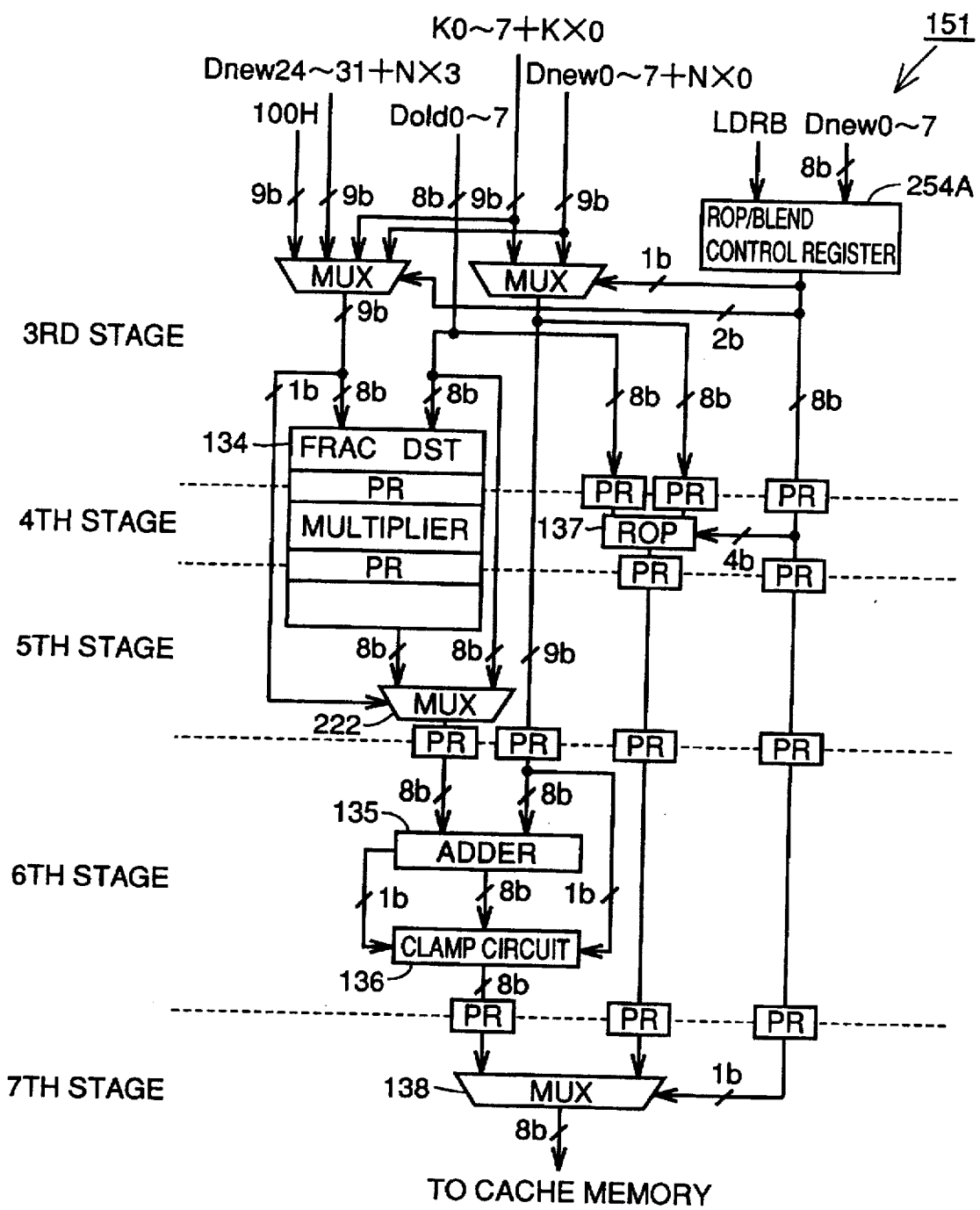
FIG. 17 is a block diagram showing the pipeline structure of the ROP/blend unit of FIG. 16A.
Figure 18:
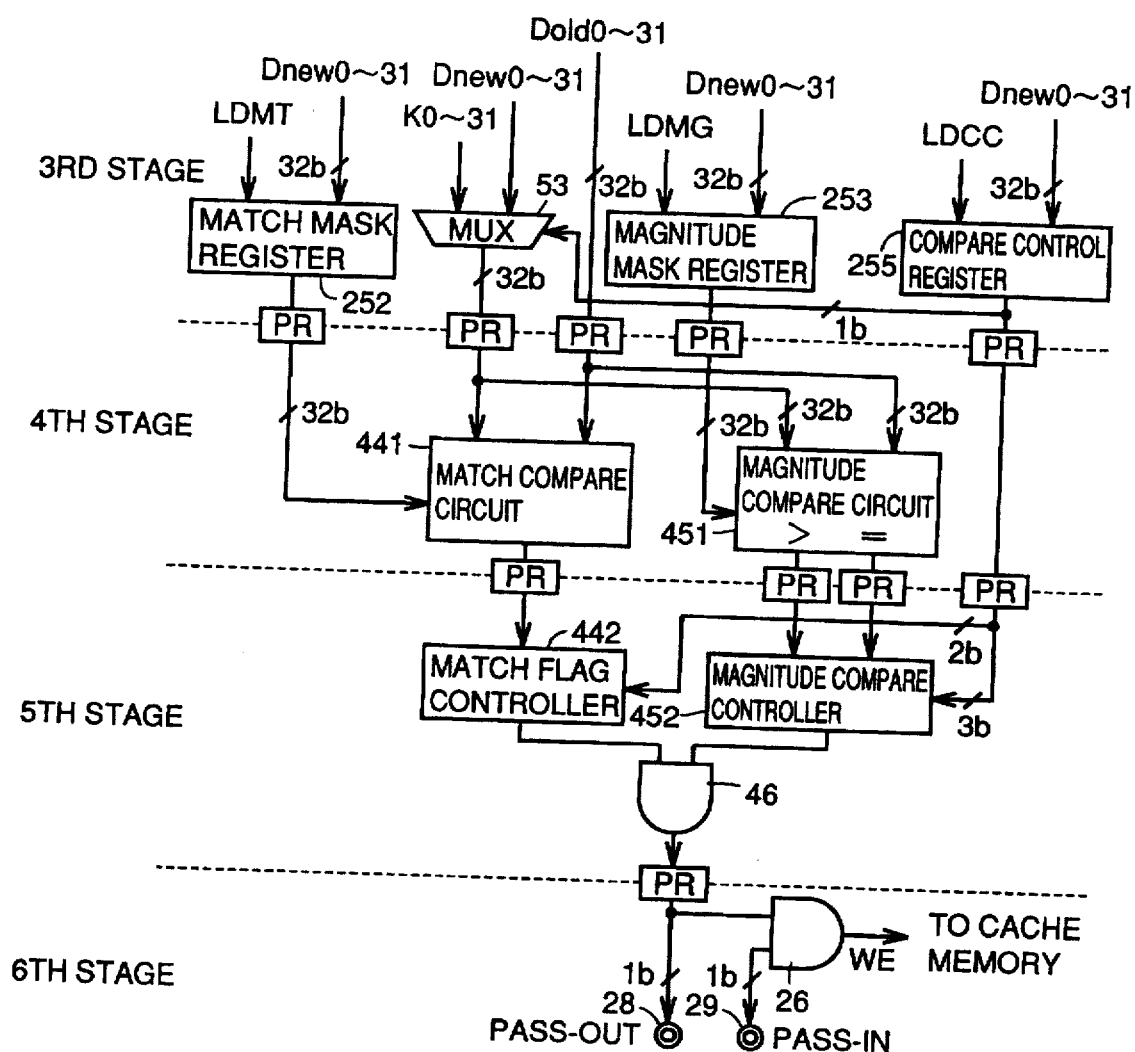
FIG. 18 is a block diagram showing the pipeline structure of the compare unit of FIG. 16B.

An operation where operation unit 23 is pipelined will be described hereinafter. FIG. 15 shows a schematic structure of pipelined operation unit 23. FIGS. 16A and 16B are block diagrams showing in detail the pipelined operation unit 23. FIG. 17 is a block diagram showing only ROP/blend unit 151 in FIG. 16A. FIG. 18 is a block diagram showing only compare unit 14 of FIG. 16B.

Referring to FIGS. 15-18, frame buffer memory 10 is formed of seven pipeline stages. The number in each square box of FIG. 15 indicates the pipeline stage number. A pipeline register PR is provided between each pipeline stage.

In the first stage, an address CAD for cache memory 12 is provided. In the second stage, the provided address CAD is applied to cache memory 12 as readout address RDADRS. This causes data RD readout from cache memory 12 to be provided as data Dold to ROP/blend units 151-154 and to compare unit 14. Also the second stage, externally applied data DQ is provided to ROP/blend units 151-154 and to compare unit 14 as data Dnew.

ROP/blend units 151-154 and compare unit 14 are respectively formed of third to sixth stages. At the third stage of a ROP/blend unit, data Dold and Dnew are provided to multiplier 134 and a raster operation circuit 137. The third stage of compare unit 14 includes match mask register 252 and magnitude mask register 253.

The fourth stage of a ROP/blend unit includes multiplier 134 and raster operation circuit 137. The fourth stage of compare unit 14 includes match compare circuit 441 and magnitude compare circuit 451.

The fifth stage of a ROP/blend unit includes multiplexer 222. The fifth stage of compare unit 14 includes match flag controller 442, magnitude flag controller 452, and AND gate 46.

The sixth stage of a ROP/blend unit includes adder 135 and clamp circuit 136. The sixth stage of compare unit 14 includes AND gate 26.

The seventh stage includes multiplexer 138 in each of ROP/blend units 151-154. In the seventh stage, address CAD provided at the first stage is applied to cache memory 12 as write address WADR via the second to sixth stages. Also, in the seventh stage, write enable signal WE generated by AND gate 26 of sixth stage is provided to cache memory 12. Therefore, the resultant data from ROP/blend units 151-154 is provided as write data WD to cache memory 12 in the seventh stage.

As described above, ROP/blend units 151-254 and compare unit 14 are formed of four pipeline stages respectively. Therefore, the timing of providing write data WD from ROP/blend unit 151-154 to cache memory 12 matches the timing of providing write enable signal WE from compare unit 14 to cache memory 12.

Figure 19:
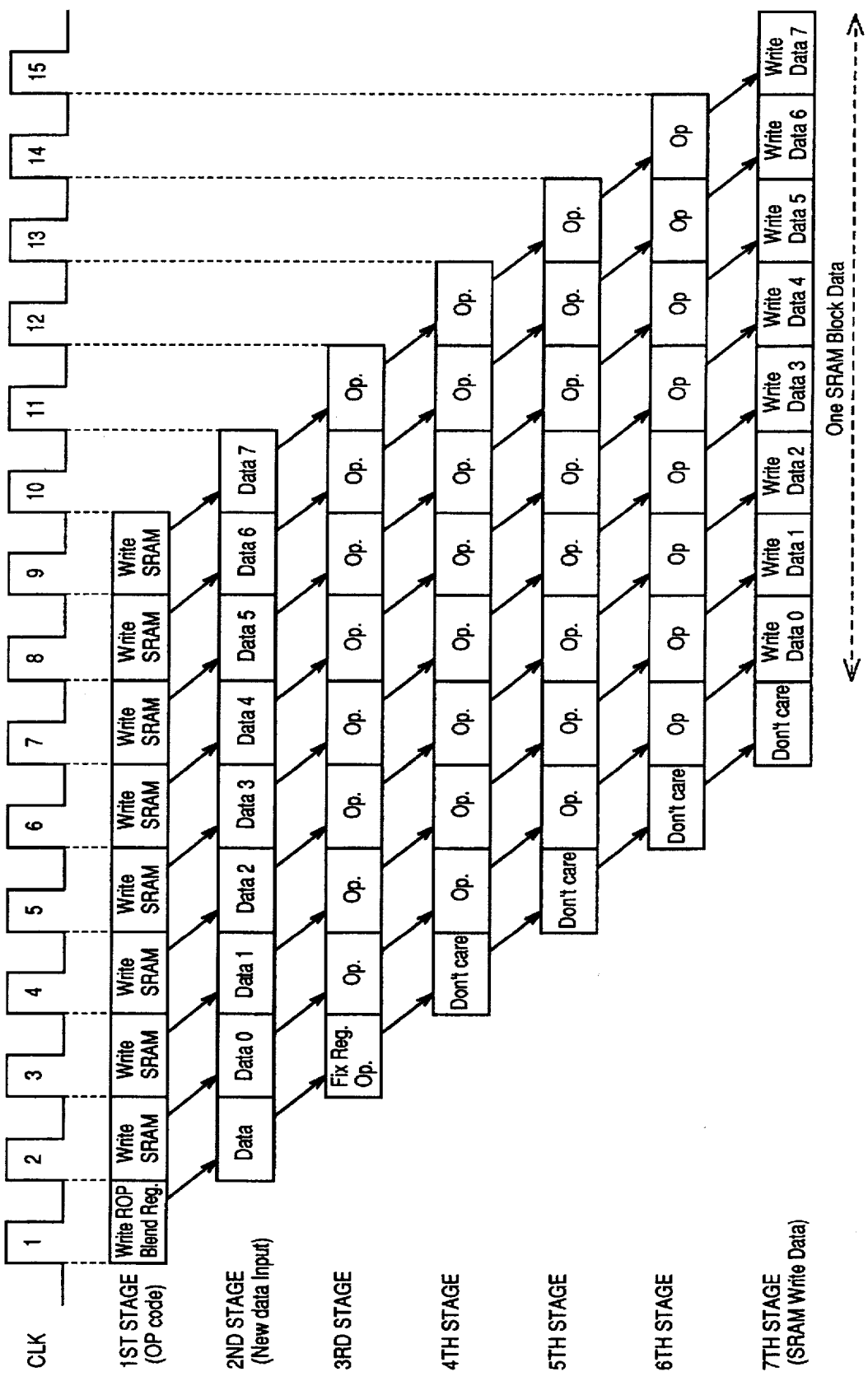
FIG. 19 is a timing chart showing the pipeline operation of the ROP/blend unit of FIG. 17.

FIG. 19 is a timing chart showing the pipeline operation of the ROP/blend unit shown in FIG. 17.

Referring to FIG. 19, in the second stage, externally applied data is provided to ROP/blend units 151-154, and also the data read out from cache memory 12 is applied to ROP/blend units 151-154. These data are processed at the third to sixth stages. More specifically, these data are processed within the four cycles of clock signal CLK. At the seventh stage, resultant data is provided to cache memory 12 from ROP/blend units 151-154.

Figure 20:
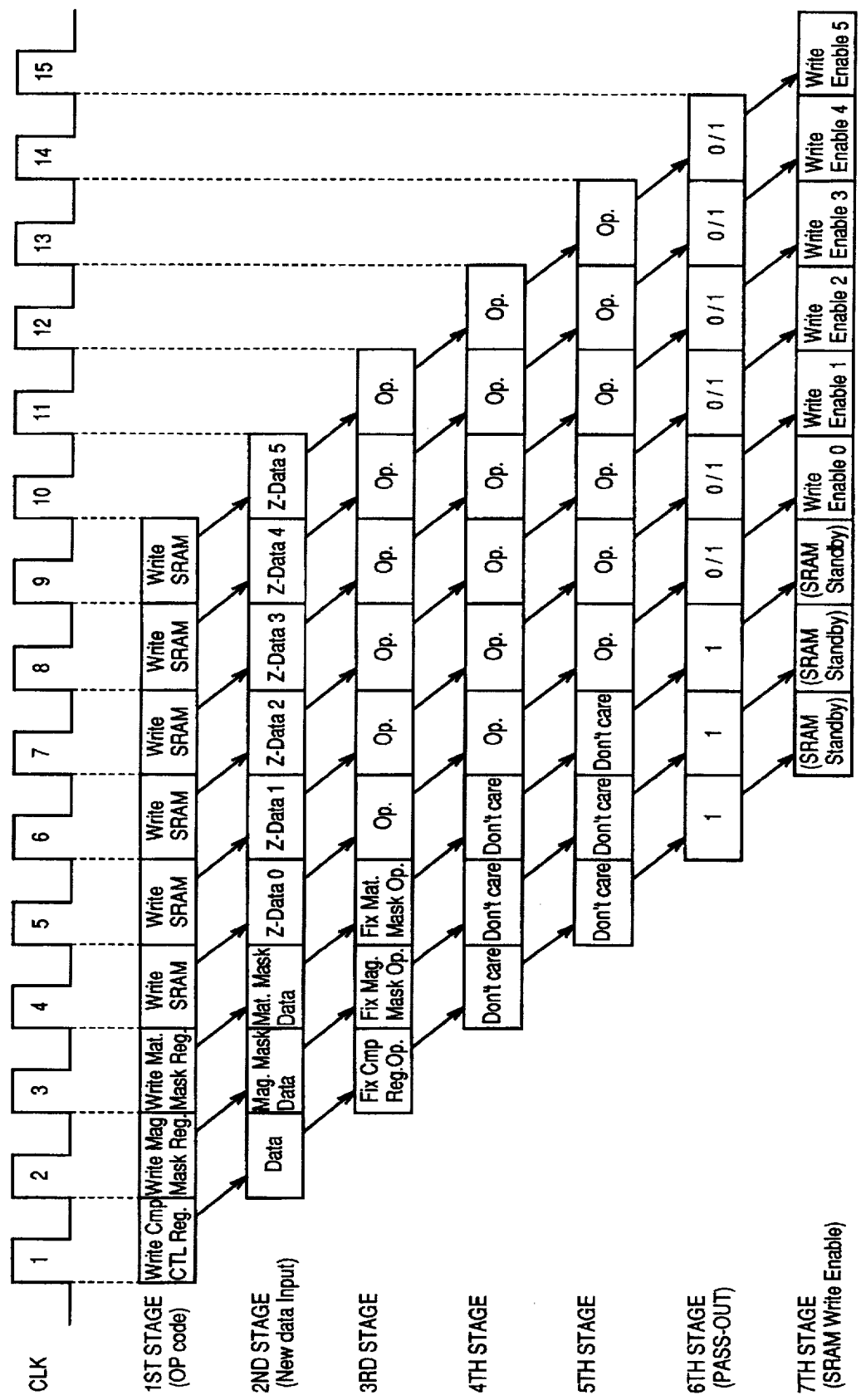
FIG. 20 is a timing chart showing the pipeline operation of the compare unit of FIG. 18.

FIG. 20 is a timing chart showing the pipeline operation of compare unit 14 of FIG. 18. Referring to FIG. 20, Z data is applied to compare unit 14 at the second stage. The applied Z data is processed in the third to fifth stages. Then, flag output signal PASS-OUT of 0 or 1 is applied to AND gate 26, whereby write enable signal WE is generated. The generated write enable signal WE is applied to cache memory 12 at the seventh stage.

Thus, the resultant data of ROP/blend units 151-154 is provided to cache memory 12 as write data WD, and write enable signal WE from compare unit 14 is applied to cache memory 12 at the seventh stage.

(5) Divided Layout

FIG. 2 is a layout diagram of the above-described frame buffer memory 10. As shown in FIG. 2, each of banks 11A-11D are divided into four. More specifically, banks 11A, 11B, 11C, and 11D are formed of four divided banks 11A-1~11A-4, 11B-1~11B-4, 11C-1~11C-4, and 11D-1~11D-4, respectively.

Cache memory 12 is also divided into four. More specifically, cache memory 12 is formed of four divided cache memories 12A-12D. Cache memory 12A is connected to divided banks 11A-1, 11B-1, 11C-1, and 11D-1. Divided cache memory 12B is connected to divided banks 11A-2, 11B-2, 11C-2, and 11D-2. Divided cache memory 12C is connected to divided banks 11A-3, 11B-3, 11C-3 and 11D-3. Divided cache memory 12D is connected to divided banks 11A-4, 11B-4, 11C-4, and 11D-4.

Compare unit 14 is also divided into four. More specifically, compare unit 14 is formed of four divided compare units 14A-14D. Divided compare unit 14A carries out match comparison/magnitude comparison between data provided from divided cache memory 12A and a predetermined bit out of externally applied data DQ16-DQ31. Divided compare unit 14B carries out match comparison/ magnitude comparison between data provided from divided cache memory 12B and a predetermined bit out of externally applied data DQ16-DQ31. Divided compare unit 14C carries out match comparison/magnitude comparison between data provided from divided cache memory 12C and a predetermined bit out of externally applied data DQ0-DQ15. Divided compare unit 14D carries out match comparison/magnitude comparison between data applied from divided cache memory 12D and a predetermined bit out of externally applied data DQ0-DQ15.

Serial access memory 15A is further divided into four. More specifically, serial access memory 15A is formed of divided serial access memories 15A-1~15A-4. Serial access memory 15B is also further divided into four. More specifically, serial access memory 15B is formed of divided serial access memories 15B-1~15B-4. Divided serial access memory 15A-1 can store data readout from either divided bank 11A-1 or 11C-1. Divided serial access memory 15A-2 can store data readout from either divided bank 11A-2 or 11C-2. Divided serial access memory 15A-3 can store data read out from either divided bank 11A-3 or 11C-3. Divided serial access memory 15A-4 can store data read out from either divided bank 11A-4 or 11C-4. Divided serial access memory 15B-1 can store data readout from either divided bank 11B-1 or 11D-1. Divided serial access memory 15B-2 can store data read out from either divided bank 11B-2 or 11D-2. Divided serial access memory 15B-3 can store data read out from either divided bank 11B-3 or 11D-3. Divided serial access memory 15B-4 can store data read out from either divided bank 11B-4 or 11D-4. Data of divided serial access memories 15A-1~15A-4 and data of divided serial access memories 15B-1~15B-4 are selectively applied to video output signal 20.

ROP/blend unit 151 processes data provided from divided cache memory 12A and a predetermined bit out of externally applied data DQ16–DQ31. The resultant data of ROP/blend unit 151 is applied to divided cache memory 12A. ROP/blend unit 152 processes data provided from divided cache memory 12B and a predetermined bit out of externally applied data DQ16–DQ31. The resultant data of ROP/blend unit 152 is applied to divided cache memory 12B. ROP/blend unit 153 processes data provided from divided cache memory 12C and a predetermined bit out of externally applied data DQ0–DQ15. The resultant data of ROP/blend unit 153 is applied to divided cache memory 12C. ROP/blend unit 154 processes data provided from divided cache memory 12D and a predetermined bit out of externally applied data DQ0–DQ15. The resultant data of ROP/blend unit 154 is applied to divided cache memory 12D.

The output signals of the four divided compare units 14A–14D are provided to flag generation unit 900. In response to the four output signals, flag generation unit 900 generates a flag output signal PASS-OUT. Frame buffer memory 10 further includes a controller 16 for generating various internal control signals. Control units 15A–15D are also divided into four.

Since each of ROP/blend units 151–154 can process data of 8 bits, the entire four ROP/blend units 151–154 can process data of 32 bits. Furthermore, since each of divided compare units 14A–14D can process data of 8 bits, the entire compare unit 14 can process data of 32 bits. The processing unit of data is not limited to 32 bits, and the divided number is also not limited to 4. For example, the divided number can be varied according to the number of bits treated by each unit.

ROP/blend unit 151 and divided compare unit 14A process the 24–31st bits of the 32 bits. ROP/blend unit 152 and divided compare unit 14B process the 16–23rd bits. ROP/blend unit 153 and divided compare unit 14C process the 8–15th bits. ROP/blend unit 154 and divided compare unit 14D process the 0–7th bits.

Each of banks 11A-1~11A-4, 11B-1~11B-4, 11C-1~11C-4, and 11D-1~11D-4 processes bits identical in number to the bits processed by a corresponding ROP/blend unit. Each of divided cache memories 12A–12D processes bits identical in number to the bits processed by a corresponding ROP/blend unit. Each of divided cache memories 12A–12D processes bits identical to those processed by a corresponding ROP/blend unit. Also, divided serial access memories 15A-1~15A-4, 15B-1~15B-4 also process bits identical to those processed by a corresponding ROP/blend unit.

The main feature of this layout lies in that almost all the function units are divided for every 8 bits. The above-described 32 bits of data is formed of 24 bits of color data of a pixel for graphic display, and blending rate data of 8 bits. The color data is formed of red data of 8 bits, green data of 8 bits, and blue data of 8 bits. For example, red data R corresponds to the 24–31st bits, green data G corresponds to the 16–23rd bits, and blue data B corresponds to the 8–15th bits. When blending rate data α corresponds to the 0–7th bits, ROP/blend unit 151 processes red data R, ROP/blend unit 152 processes green data G, ROP/blend unit 153 processes blue data B, and ROP/blend unit 154 processes blending rate data α.

Although the above-described 32 bits of data correspond to one pixel, it may correspond to, for example 4 pixels. In this case, one of the data of color data R, G, B and blending rate data α form the data of 32 bits. Although the format of the 32 bits of data is not limited to the above described case. Although various formats of the 32 bits of data can be considered other than the above-described case, a format where color data R, G, B and blending rate data α form data of 32 bits will be described here.

Each of banks 11A–11D stores 1 frame entirely or partially according to the method shown in FIG. 7. The storable frame region is determined by the number of bits of color data, the size of the frame and the like. When an α-blend process is to be carried out on a pixel on a screen, an externally applied address DAD form main memory 11 is used. In response to this address, the page number including that pixel and any of banks 11A–11D are selected. Data is read out from the selected bank.

It is assumed that the certain pixel is stored in bank 11A. Bank 11A is divided into four banks for every 8 bits. Each of divided banks 11A-1~11A-4 is located adjacent to a corresponding ROP/blend unit and a corresponding divided cache memory.

In response to address DAD, the same pages from the four divided banks 11A-1~11A-4 are read out simultaneously. Then, the block including the pixel to be processed is transferred to each of divided cache memories 12A–12D simultaneously. The transferred block is stored in divided cache memories 12A–12D respectively in response to address CAD for cache memory 12.

In a general three dimensional graphics process, the same process is often repeated continuously on a plurality of adjacent regions each including a plurality of pixels. The data processing speed in main memory 11 that has low access speed can be substantially improved by transferring data of a plurality of adjacent regions at one time from main memory 11. However, a great amount of data must be transferred from main memory 11 to cache memory 12. If a long data bus of a large number of bits is provided between main memory 11 and cache memory 12, the large parasitic capacitance of the long bus must be charged/discharged. In this case, data cannot be transferred speedily, and power consumption can be increased.

In Embodiment 1, main memory 11 is divided, wherein divided banks 11A-1~11A-4, 11B-1~11B-4, 11C-1~11C-4, and 11D-1~11D-4 are arranged adjacent to divided cache memories 12A–12D in order to solve the above-described problems. This feature of Embodiment 1 allows the length of the data bus to be reduced between a divided bank and a divided cache memory. As a result, high speed data transfer at low power consumption can be achieved.

When main memory 11 and cache memory 12 are divided and disposed as described above, the processing speed of ROP/blend units 151–154 is increased. However when Z data of 32 bits is processed, there is a problem since one unit is formed of 32 bits. Accordingly, compare unit 14 comparing Z data must be divided for every 8 bits, and each of divided compare units 14A–14D must be disposed adjacent to a corresponding divided cache memory. The entire four divided compare units 14A–14D carry out magnitude comparison/match comparison of the Z data of 32 bits. Since compare unit 14 is disposed in a divided manner, the length of a bus for transferring data read out from divided cache memories 12A–12D to divided compare units 14A–14D, respectively, is reduced. As a result, the data transfer can be speeded and the power consumption lowered.

In compare unit 14, a path for transmitting the result of the divided compare unit carrying out magnitude comparison of the higher bits (including the information that all of the bits match each other) to a divided compare unit that carries out magnitude comparison of a lower bit is necessary. A long signal line for transmitting such information will increase the time required for the comparison process, resulting in reduction of the data processing speed.

In order to solve such problems, Embodiment 1 has divided compare unit 14B processing the 16–23rd bits located as close as possible to divided compare unit 14A that processes the 24–31st bits. Also, divided compare unit 14C that processes the 8–15th bits is disposed as close as possible to divided compare unit 14B. Furthermore, divided compare 14D that processes the 0–7th bits is disposed as close as possible to divided compare unit 14C.

Color data R, G, and B stored in frame buffer memory 10 must be sequentially readable according to a scanning system. For this purpose, serial access memory 15 is provided in the present embodiment. The problem concerning the arrangement of each unit occurring due to division of main memory 11 is also encountered in serial access memory 15.

It is assumed that image data is stored in main memory 11 as shown in FIG. 7. In order to read out data according to raster scanning, the banks must be accessed in the order of bank A→bank B→bank A→bank B→. . . →bank A→bank B→bank C→bank D→bank C→bank D→. . .→bank C→bank D→bank A→. . . .

When banks 11A-1~11A-4 are accessed for transferring data from banks 11A-1~11A-4 to serial access memories 15A-1~15A-4, the same banks cannot be accessed for operation. As a result, the operation speed is delayed. This problem is similarly encountered in banks 11B-1~11B-4. This is because data is alternately read out from banks 11A-1~11A-4 and 11B-1~11B-4. However, during this readout, banks 11C-1~11C-4 and 11D-1~11D-4 are available for operation. Therefore, serial access memories 15A-1~15A-4 are commonly shared by banks 11A-1~11A-4 and 11C-1~11C-4. Also, serial access memories 15B-1~15B-4 are commonly shared by banks 11B-1~11B-4 and 11D-1~11D-4. As a result, the number of circuits in frame buffer memory 10 can be reduced.

When data is output via video output terminal 20 from serial access memories 15A-1~15A-4, data of bank 11B-1~11B-4 or 11D-1~11D-4 are transferred to serial access memories 15B-1~15B-4. When data output from serial access memory 15A is completed, serial access memory 15B is activated in response to a control signal from controller 16 in order to continuously output the next data. When data is output from serial access memory 15B, data of banks 11A-1~11A-4 or 11C-1~11C-4 are written into serial access memories 15A-1~15A-4. Therefore, the size of each of serial access memories 15A and 15B is determined so that the time required for providing all the data of serial access memory 10 is longer than the time required for fully writing data of the main memory into the other serial access memory.

According to the layout of FIG. 2, the data bus between the divided banks and divided cache memories can be reduced. The data transfer speed between the main memory and the cache memory is increased, and power consumption for transfer is reduced. Furthermore, the signal line for transferring a signal between each of divided compare units 14A–14D can be reduced. Therefore, the signal propagation speed between each divided compare unit is increased, whereby the comparison process is speeded. This unit divided arrangement facilitates modification of the function by adding or removing a unit corresponding to the unit data.

In Embodiment 1, main memory 11 is provided that can store a great amount of data despite its small occupying area. Data of 10.5 megabits corresponding to one frame can all be stored in main memory 11. The data stored in main memory 11 is processed together with externally applied 32 bits of data for every 32 bits. Data 8 times the 32 bits which will be the subject of operation is stored in one of the 8 units of cache memory 12. More specifically, 256 bits of data are globally transferred from main memory 11 to cache memory 12. Although cache memory 12 has a small storage capacity, it is formed of a SRAM that has high access speed. Therefore, the 32 bits of data that are the subject of operation can be provided at high speed.

Because frame buffer memory 10 is formed on one chip and data bus 17 for transferring the 256 bits of data are not extremely increased in length, the data transfer speed is not delayed and power consumption in transferring data is not increased. Embodiment 1 can sufficiently take advantage of "accessing multibits simultaneously" which is the essential feature of a main memory. Therefore, the main memory can be implemented as if operated at high speed by interleaving and processing the multi-bits of data.

In Embodiment 1, the four ROP/blend units 151–154 and compare units 14A–14D have a unit structure divided into the data processing unit of 8 bits. Because main memory 11 is divided into a plurality of banks, the length of the word line and the bit line can be reduced. A short word line and a short bit line has a small parasitic capacitance, so that the access time of main memories 11A–11D can be reduced, and cache memories 12A–12D can be operated at high speed.

The function of frame buffer memory 10 can easily be extended by increasing/decreasing the number of these banks. Various frame buffer memories can be designed in a short period time.

Since cache memory 12 takes a 3-port structure of 1 read/1 write/1 read.write, reading to an operation unit, writing the operation result, and data transfer with main memory 11 can be executed at the same time. Although not shown, cache memory 12 further includes a region that holds a flag data that indicates which of the data in cache memory 12 is newly written, in addition to the region holding pixel data. When the operation resultant data is written into cache memory 12, a bit corresponding to that data is set in this flag. Only data having this flag bit set is written in transferring data from cache memory 12 to main memory 11. The flag bit which is reset will not have data written. Thus, operation of unrequired writing buffer can be removed, and power consumption can be reduced.

The write control to main memory 11 according to this flag can be set by an external control signal. This flag is reset when data is transferred from main memory 11 to cache memory 12, or by means of an externally applied control signal.

Embodiment 2

Figure 21:
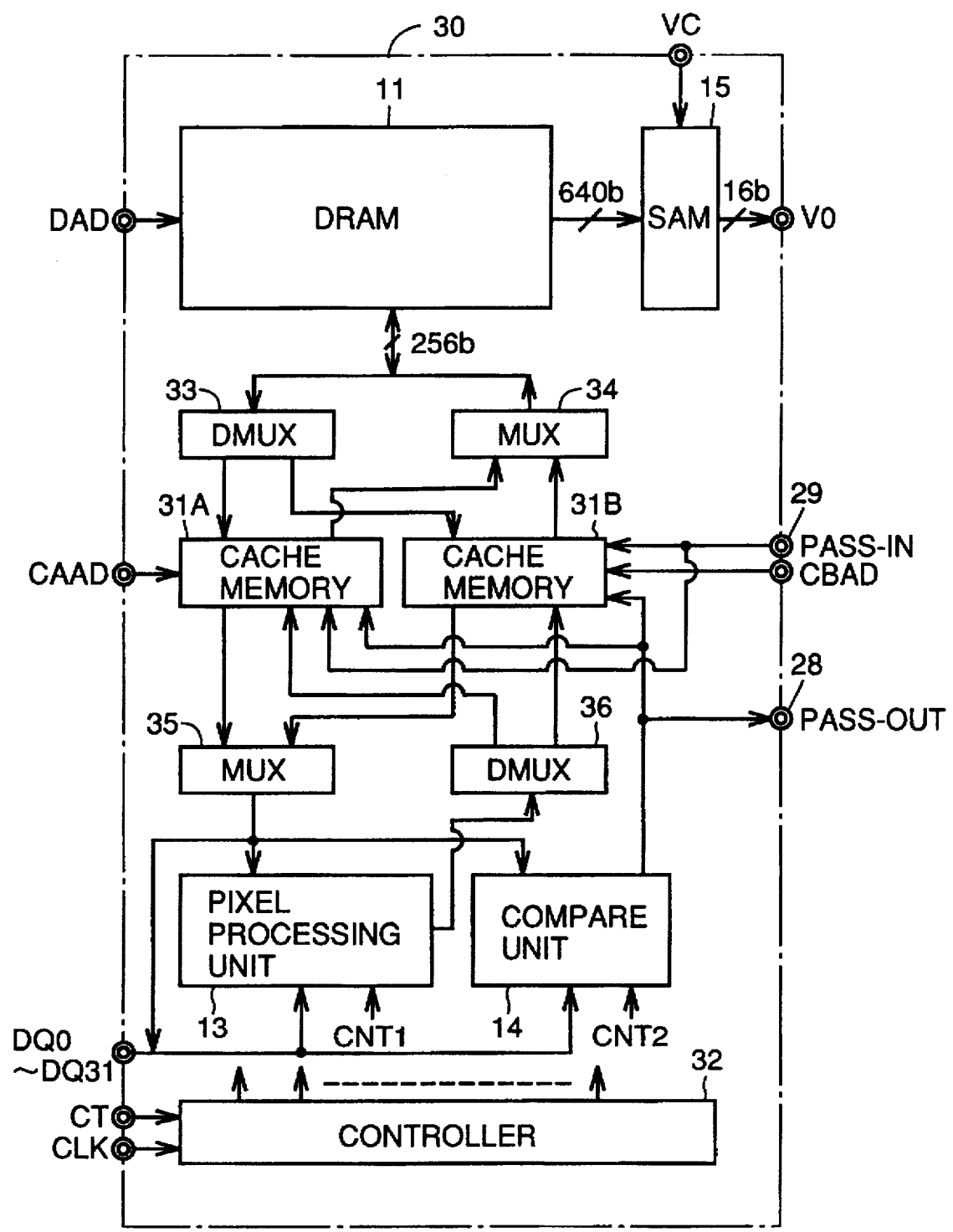
FIG. 21 is a block diagram showing the entire structure of a semiconductor integrated circuit device according to Embodiment 2 of the present invention.

FIG. 21 is a block diagram showing an entire structure of a frame buffer memory according to Embodiment 2 of the present invention. In the drawings, like reference characters denote the same or corresponding components.

Referring to FIG. 21, a frame buffer 30 includes a main memory 11, two cache memories 31A and 31B, a pixel processing unit 13, a compare unit 14, a serial access memory (SAM) 15, and a controller 32. All of these elements are formed on one semiconductor substrate.

Frame buffer memory 30 further includes a demultiplexer (DMUX) 33 for distributing data read out from main memory 11 into cache memories 31A and 31B, and a multiplexer (MUX) 34 for selecting data read out from cache memory 31A and data read out from cache memory 31B to provide the selected data to main memory 11.

Frame buffer memory 30 further includes a multiplexer 35 for selecting data read out from cache memories 31A and 31B to provide the selected data to pixel processing unit 13, and a demultiplexer 36 for dividing the resultant data from pixel processing unit 13 into register files 31A and 31B. The data from multiplexer 35 is provided to compare unit 14 and also to the outside world.

In cache memory 31A, data is read out or written in response to an externally applied address signal RF1AD. In cache memory 31B, data is read out or written in response to an address signal AF2AD. Output signal PASS-OUT of compare unit 14 is provided to the outside world, and also to cache memories 31A and 31B.

A flag output signal of a compare unit in another frame buffer memory is applied to cache memories 31A and 31B as flag input signal PASS-IN. Controller 32 responds to an externally applied control signal CT to generate a control signal for controlling main memory 11, cache registers 31A and 31B, pixel processing unit 13, and compare unit 14.

The operation of frame buffer memory 30 according to Embodiment 2 will be described hereinafter. The basic operation thereof is similar to that of the above-described Embodiment 1, and only different operations will be described in detail.

In the above-described Embodiment 1, there are cases where a "read modify write" is required as the function of cache memory 2. A "read modify write" is to carry out a read operation and then a write operation when a read operation and a write operation for the same address occurs within the same machine cycle. It is difficult to carry out a read operation and a write operation within the same machine cycle when cache memory 2 is operated at high speed.

In contrast, Embodiment 2 allows a read operation and a write operation to be carried out within the same machine cycle with respect to the same address (i.e. address signals RF1AD and RF2AD are identical) by using, for example, cache memory 31A only for a readout operation and cache memory 31B for only a write operation without reducing the operation speed of cache memories 31A and 31B.

The so-called bank interleave is possible by using cache memory 31A for data processing and cache memory 31B for data transfer with main memory 11. This is also effective in eliminating the gap between the access time with respect to main memory 11 and the processing time of pixel processing unit 13 which is significant when pixel processing unit 13 is further speeded.

Embodiment 3

Figure 22:
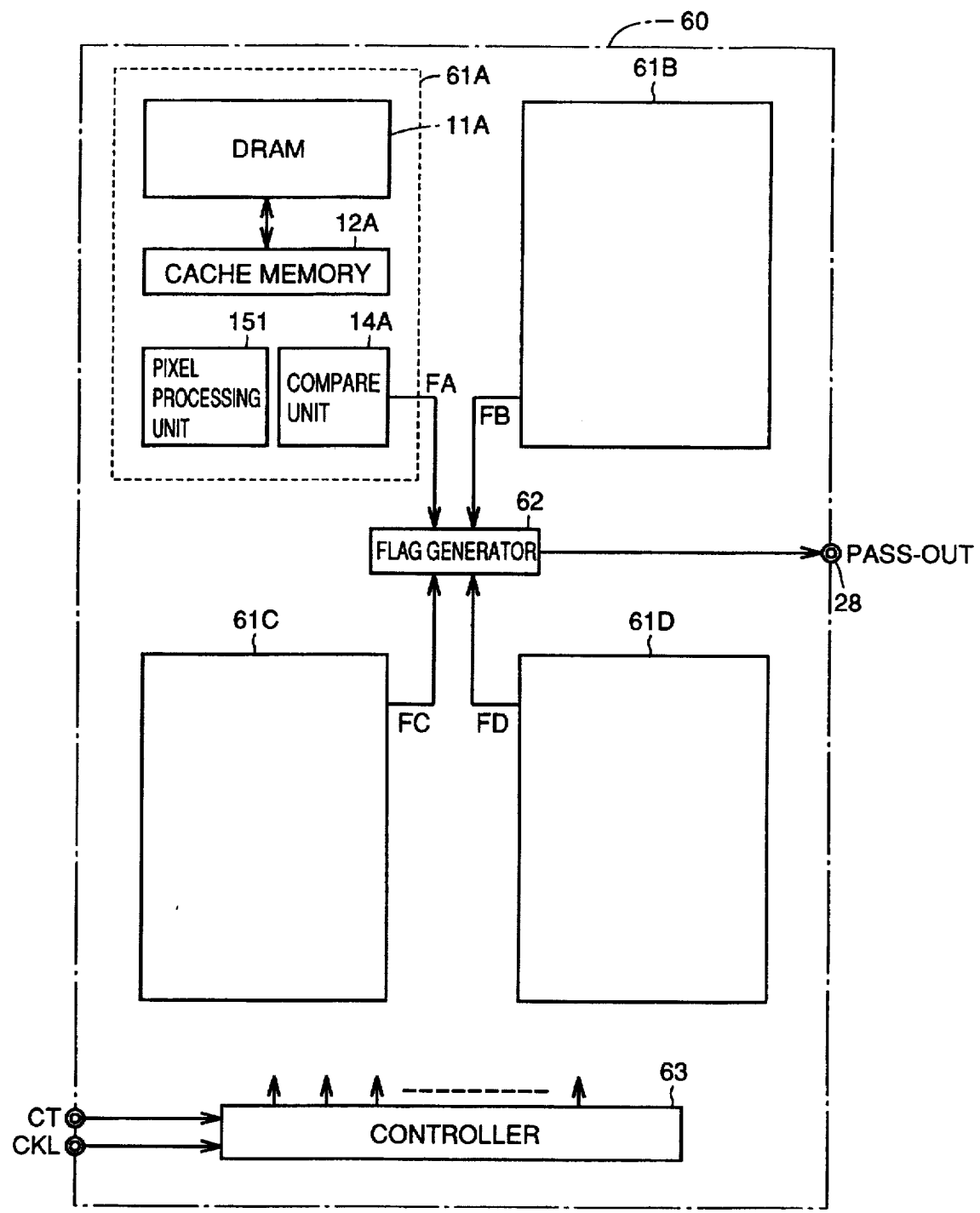
FIG. 22 is a block diagram showing the entire structure of a semiconductor integrated circuit device according to Embodiment 3 of the present invention.

FIG. 22 is a block diagram showing the entire structure of a frame buffer memory 60 according to Embodiment 3 of the present invention.

Referring to FIG. 22, frame buffer memory 60 includes four microcell blocks 60A–61D. Microcell block 61A, for example, includes a main memory 11A, a cache memory 12A, a pixel processing unit 13A, and a compare unit 14A. Each of microcell blocks 61B–61D has a similar structure.

Frame buffer memory 60 further includes a flag generator 62. Flag generator 62 responds to four flag signals FA–FD indicating the comparison results of the compare units in microcell blocks 61A–61D to generate one flag output signal PASS-OUT.

Figure 23:
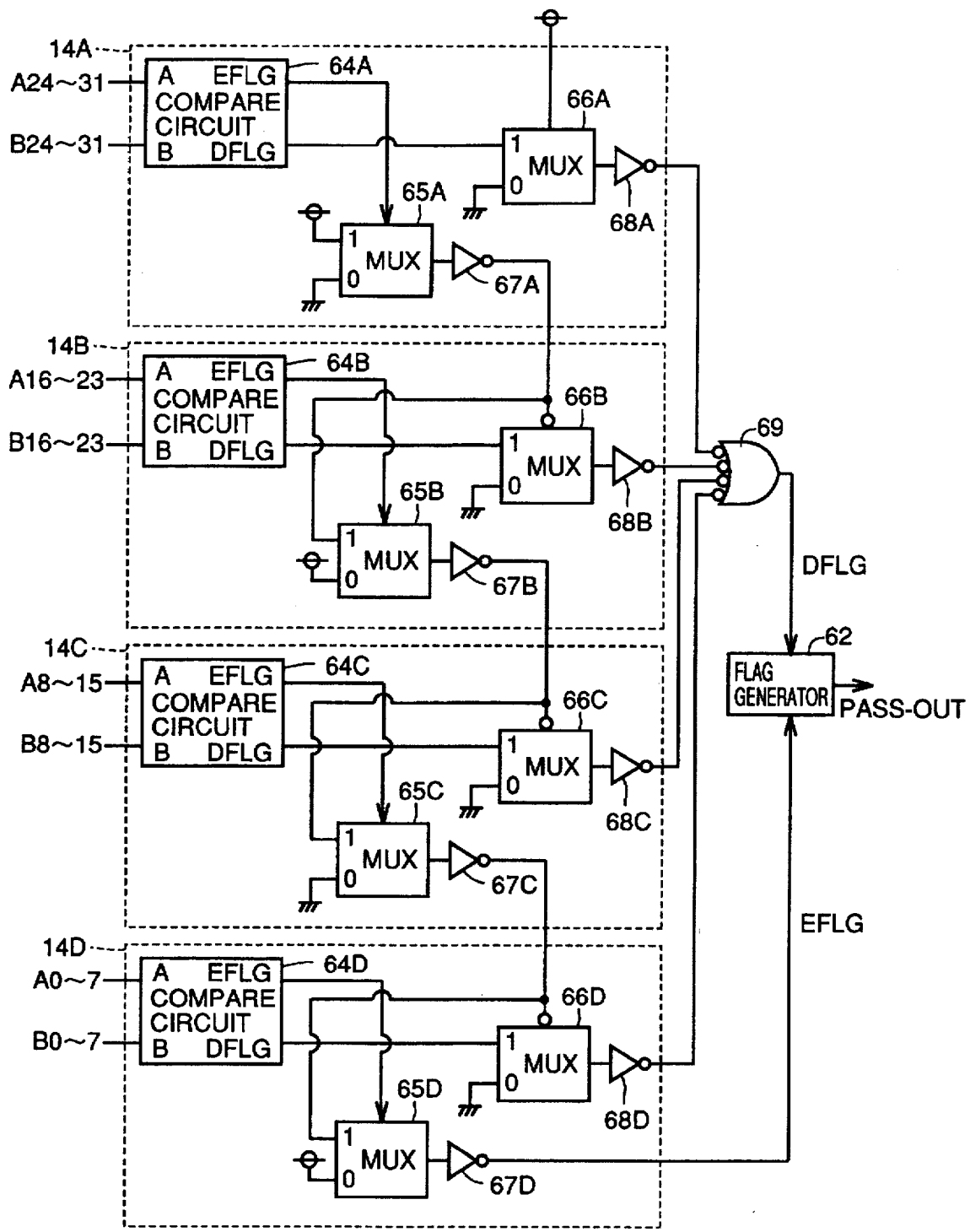
FIG. 23 is a block diagram showing the structure of a compare unit in the semiconductor integrated circuit device of FIG. 22.

FIG. 23 is a block diagram showing in detail the structure of compare units 14A–14D in microcell blocks 61A–61D shown in FIG. 22 (compare units 14B–14D of microcell blocks 61B–61D are not shown in FIG. 22).

Referring to FIG. 23, each of compare units 14A–14D includes 8-bit compare circuits 64A–64D, multiplexers (MUX) 65A–65D, and 66A–66D, inverters 67A–67D, and 68A–68D.

Compare circuits 64A–64D compare 8 bits of input data A24–A31 with 8 bits of input data B24–B31. An output signal of multiplexer 65A in compare unit 14A is applied to multiplexers 65B and 66B in compare 14B via inverter 67A. An output signal of multiplexer 65B in compare unit 14B is applied to multiplexers 65C and 66C in compare unit 14C via inverter 67B. An output signal of multiplexer 65C in compare unit 14C is applied to multiplexers 65D and 66D in compare unit 14D via inverter 67C.

The output signals of multiplexers 66A–66D in each of compare units 14A–14D are applied to one 4-input NAND gate 69. An output signal DFLG of NAND gate 69 is applied to flag generator 62. An output signal of multiplexer 65D in compare unit 14D is applied to flag generator 62 as a flag signal EFLG flag via inverter 67D.

Figure 24:
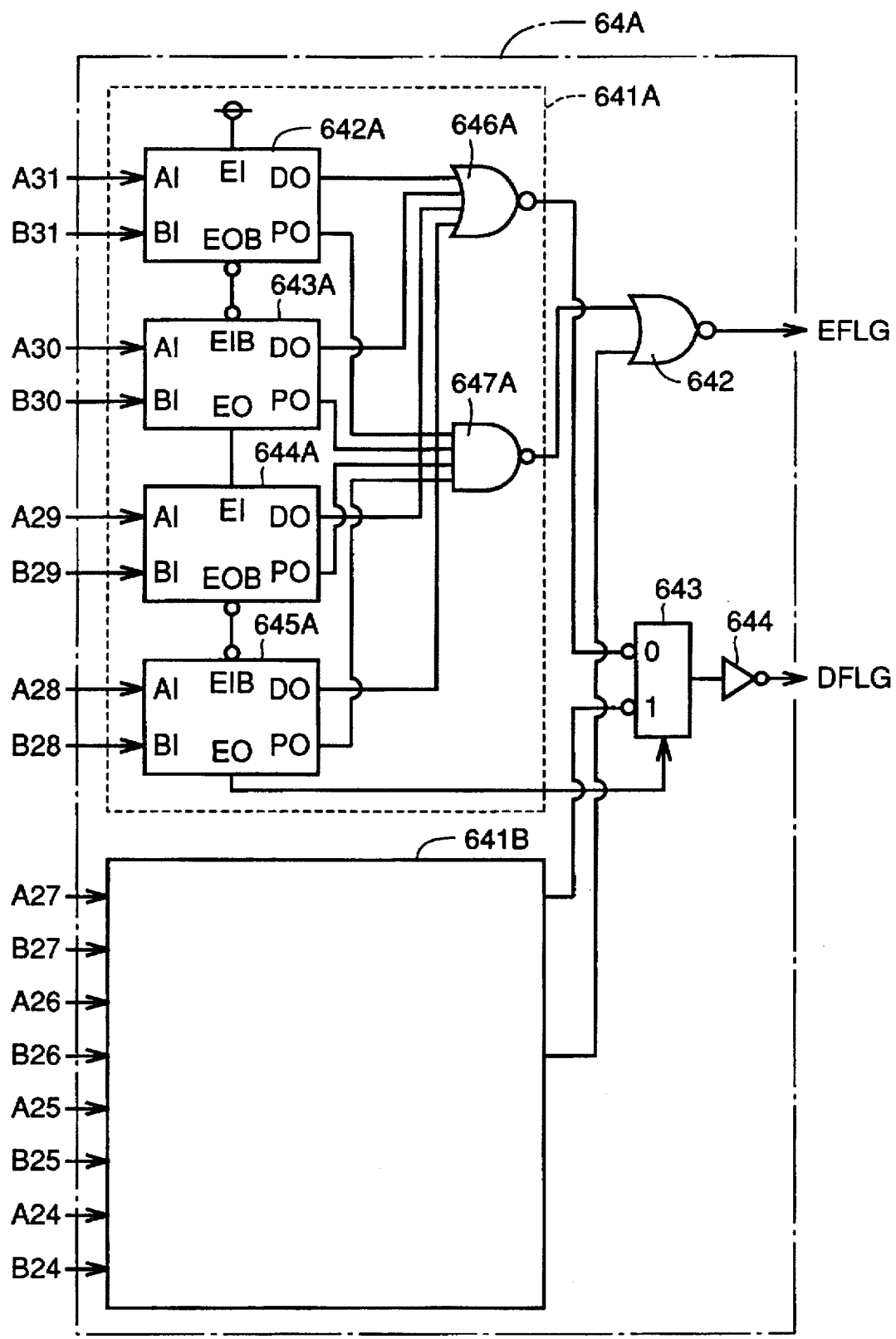
FIG. 24 is a block diagram showing a structure of a compare circuit in the compare unit of FIG. 23.

FIG. 24 is a block diagram showing in detail the structure of compare circuit 64A of FIG. 23. Each of the other compare circuits 64B–64D has a structure identical to that of compare circuit 64A.

Referring to FIG. 24, compare circuit 64A includes 4-bit compare circuits 641A and 641B, a 2-input NOR circuit 642, a multiplexer 643, and an inverter 644.

Compare circuit 641A includes 1-bit compare circuits 642A–645A, a 4-input NOR gate 646A, and a 4-input NAND gate 647A. Each of compare circuits 642A–645A compare 1-bit input data A28–A31 with 1-bit input data B28–B31 to generate output signals DO and BO. One output signal DO of each of compare circuits 642A–642A is applied to NOR gate 646A. The other output signal PO of each of compare circuits 642A is applied to NAND gate 647A. Compare circuit 641B has a structure similar to that of the above-described compare circuit 641A.

An output signal of NOR gate 646A in each compare circuit 641A is applied to one multiplexer, and an output signal of an NOR gate (not shown) in compare circuit 641B is applied to the other multiplexer 643.

An output signal of NAND gate 647A in compare circuit 641A is applied to one input of NOR gate 642, and an output signal of a NAND gate (not shown) in compare circuit 641B is applied to the other input of NOR gate 642. An output signal of NOR gate 642 is provided as a flag signal EFLG. An output signal of multiplexer 643 is provided as a flag signal DFLG via inverter 644.

Figure 25:
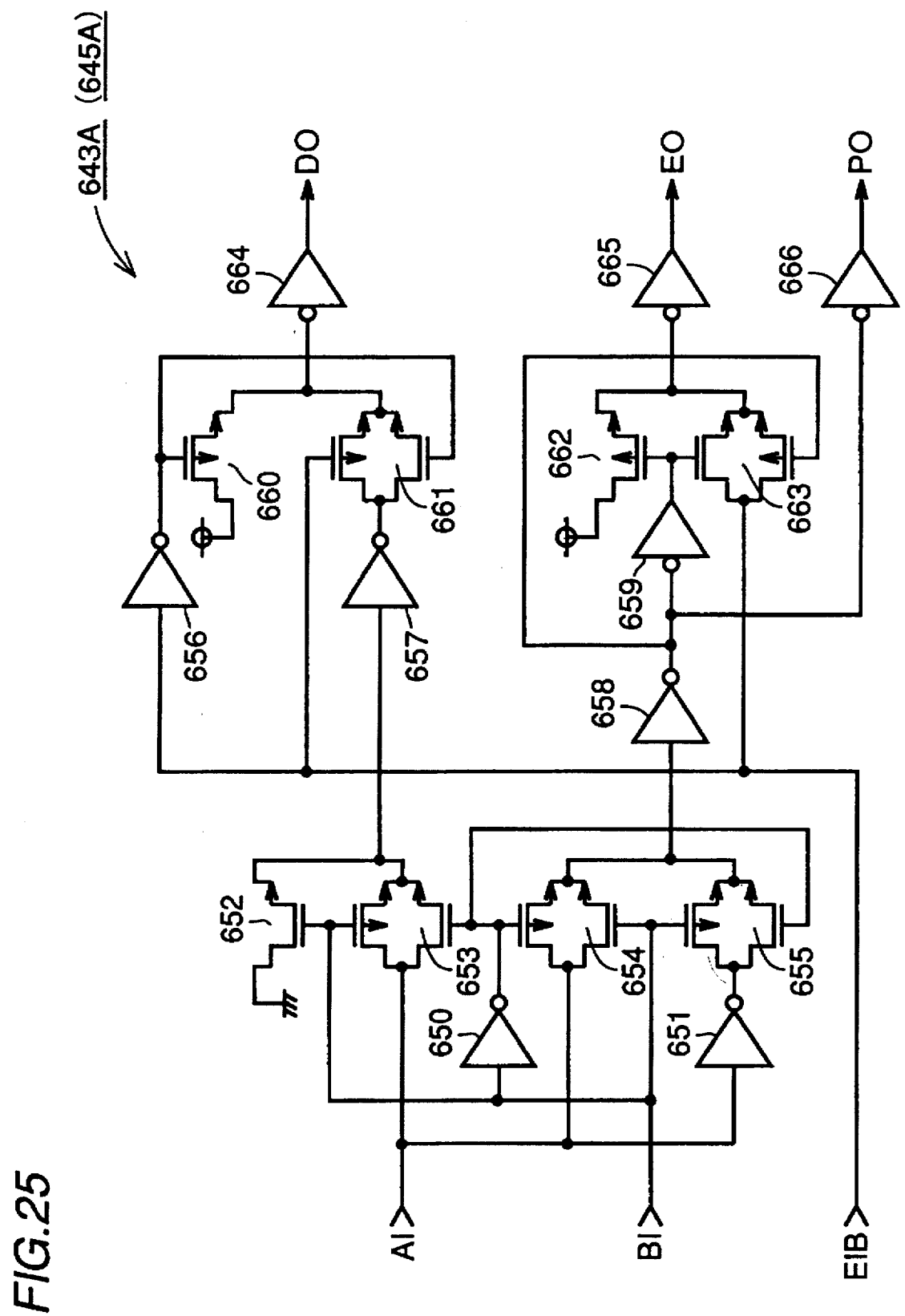
FIG. 25 is a circuit diagram showing a structure of a compare circuit of 1 bit in the compare circuit of FIG. 24.

FIG. 25 is a circuit diagram showing in detail a structure of compare circuits 643A or 645A of FIG. 24.

Referring to FIG. 25, compare circuit 643A or 645A includes inverters 650 and 651, an N channel MOS transistor 652, transfer gates 653–655 formed of an N channel MOS transistor and a P channel MOS transistor, inverters 656–659, a P channel MOS transistor 660, a transfer gate 661 formed of an N channel MOS transistor and a P channel MOS transistor, a P channel MOS transistor 662, a transfer gate 663 formed of an N channel MOS transistor and a P channel MOS transistor, and inverters 664–666.

An input signal AI is provided to transfer gates 653 and 654, as well as to transfer gate 655 via inverter 651. An input signal BI is applied to the gate electrode of transistor 652 and to the gate electrode of the P channel MOS transistor forming transfer gate 653, as well as to the gate electrode of the N channel MOS transistor forming transfer gate 654 and the gate electrode of the P channel MOS transistor forming transfer gate 655. This input signal BI is also applied to the gate electrode of the N channel MOS transistor forming transfer gate 653 via inverter 650 and the gate electrode of the P channel MOS transistor forming transfer gate 654, as well as to the gate electrode of the N channel MOS transistor forming transfer gate 655.

Output signals of transistor 652 and transfer gate 653 are applied to transfer gate 661 via inverter 657. Output signals of transfer gates 654 and 655 are provided to the gate electrode of the P channel MOS transistor forming transfer gate 663 via inverter 658. The output signal of this inverter 658 is further applied to the gate electrode of transistor 662 via inverter 659 and to the gate electrode of the N channel MOS transistor forming transfer gate 663. The output signal of inverter 658 is also output as an output signal PO via inverter 666.

An output signal EOB (FIB in FIG. 25) from adjacent compare circuits 642A or 644A shown in FIG. 24 is applied to the gate electrode of the P channel MOS transistor forming transfer gate 661 and to transfer gate 663. Signal EIB is also applied to the gate electrode of transistor 660 via inverter 656 and to the gate electrode of the N channel MOS transistor forming transfer gate 661. The output signals of transistor 660 and transfer gate 661 are output as an output signal DO via inverter 664. The output signals of transistor 662 and transfer gate 663 are output as an output signal EO via inverter 665.

The following Table 5 is a truth table indicating the operation of compare circuit 643A or 645A.

TABLE 5

| AI | BI | EIB | DO | EO | PO |
|----|----|-----|----|----|----|
| 0  | 0  | 0   | 0  | 1  | 1  |
| 0  | 1  | 0   | 0  | 0  | 0  |
| 1  | 0  | 0   | 1  | 0  | 0  |
| 1  | 1  | 0   | 0  | 1  | 1  |
| 0  | 0  | 1   | 0  | 1  | 1  |
| 0  | 1  | 1   | 0  | 0  | 0  |
| 1  | 0  | 1   | 0  | 0  | 0  |
| 1  | 1  | 1   | 0  | 1  | 1  |

Figure 26:
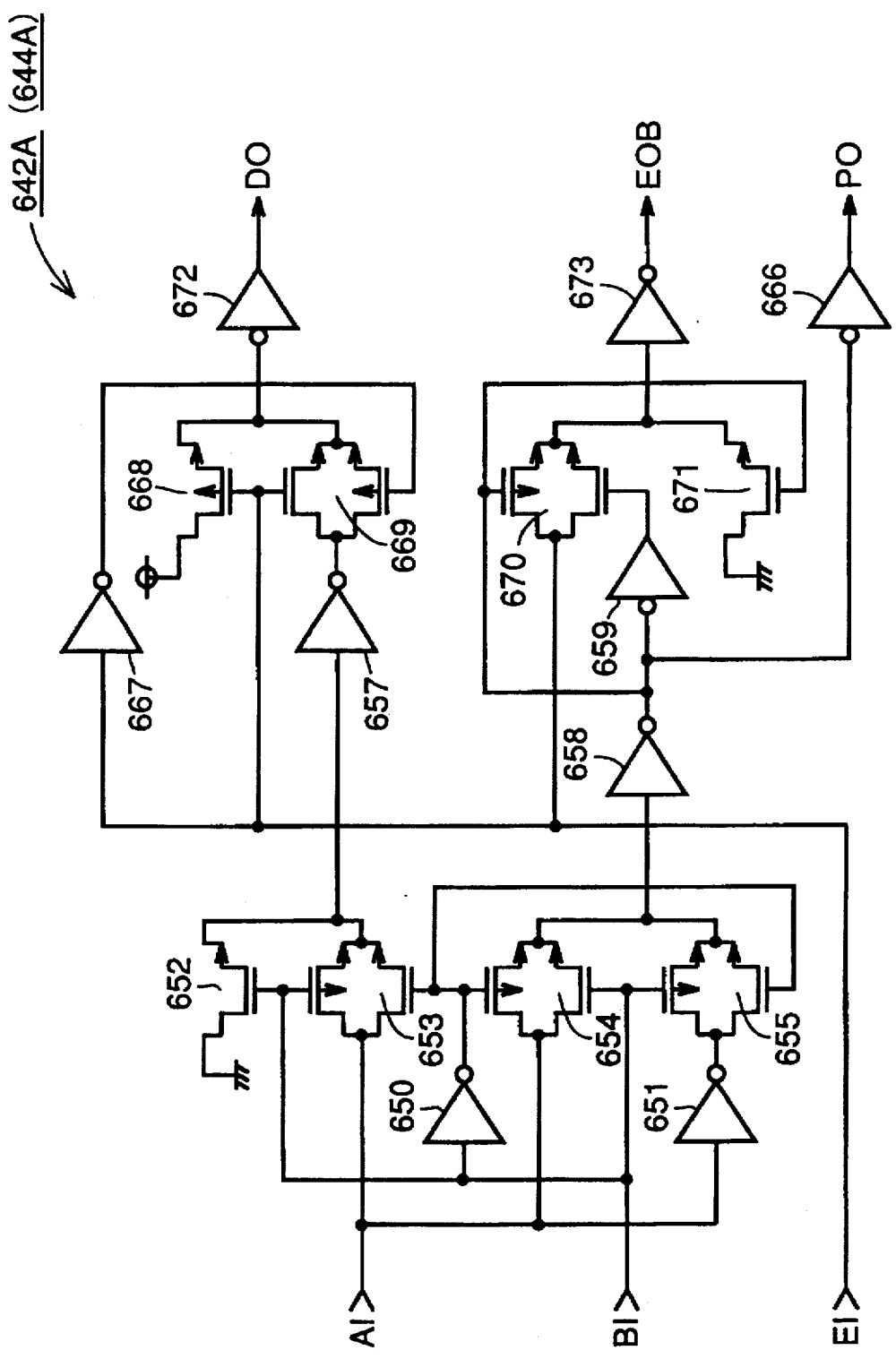
FIG. 26 is a circuit diagram showing the structure of another compare circuit of 1 bit in the compare circuit of FIG. 24.

FIG. 26 is a circuit diagram showing in detail the structure of compare circuit 642A or 644A shown in FIG. 24.

Referring to FIG. 26, compare circuit 642A or 644A includes inverters 650 and 651, a transistor 652, transfer gates 653–655, and inverters 657–659 and 666, similar to the above-described compare circuit 643A or 645A. Differing from the above-described compare circuit 643A or 645A, compare circuit 642A or 644A includes an inverter 667, a P channel MOS transistor 688, transfer gates 669 and 670, an N channel MOS transistor 671, and inverters and 673.

Output signals of transistor 652 and transfer gate 653 are provided to transfer gate 669 via inverter 657. Input signal EI is applied to the gate electrode of transistor 668, the gate electrode of the N channel MOS transistor forming transfer gate 669, as well as to transfer gate 670. Input signal EI is also provided to the gate electrode of the P channel MOS transistor forming transfer gate 669 via inverter 667.

Output signals of transistor 668 and transfer gate 669 are output as output signal DO via inverter 672. An output signal of inverter 658 is applied to the gate electrode of P channel MOS transistor forming transfer gate 670 and the gate electrode of transistor 671. The output signal of inverter 658 is also applied to the gate electrode of the N channel MOS transistor forming transfer gate 670 via inverter 659, and output as output signal PO via inverter 666. Output signals of transfer gate 670 and transistor 671 are output as output signal EOB via inverter 673.

The following Table 6 is a truth table showing the operation of compare circuit 643A or 645A.

TABLE 6

| AI | BI | EI | DO | EOB | PO |
|----|----|----|----|-----|----|
| 0  | 0  | 1  | 0  | 0   | 1  |
| 0  | 1  | 1  | 0  | 1   | 0  |
| 1  | 0  | 1  | 1  | 1   | 0  |
| 1  | 1  | 1  | 0  | 0   | 1  |
| 0  | 0  | 0  | 0  | 0   | 1  |
| 0  | 1  | 0  | 0  | 1   | 0  |
| 1  | 0  | 0  | 0  | 1   | 0  |
| 1  | 1  | 0  | 0  | 0   | 1  |

Figure 27:
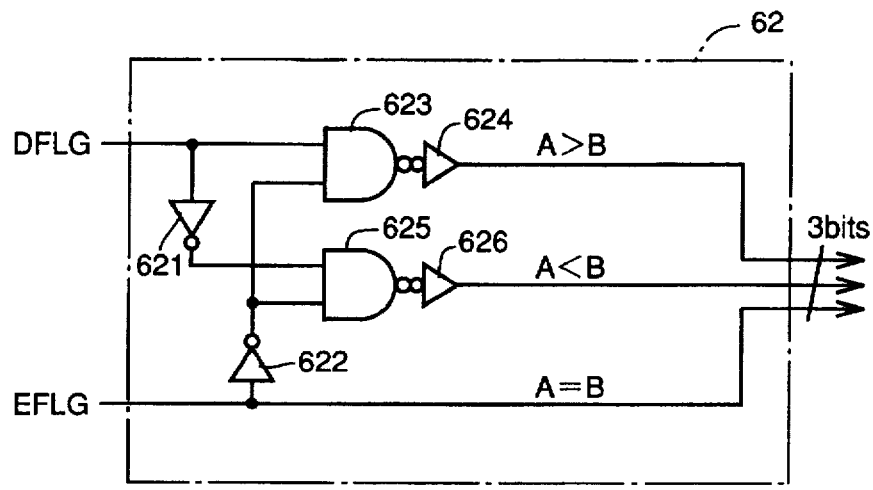
FIG. 27 is a circuit diagram showing a structure of a flag generator in the semiconductor integrated circuit device of FIG. 22.

FIG. 27 is a circuit diagram showing a structure of flag generator 62 of FIG. 22.

Referring to FIG. 27, flag generator 62 includes inverters 621 and 622, NAND gates 623 and 625, and inverters 624 and 626.

In Embodiment 3, compare circuits 14A–14D compare the two input data A0–A31 and B0–B31 of 32 bits to make a determination which of the two is greater, or whether they match each other. Compare circuits 14A–14D can carry out a comparison process at high speed since input data of 32 bits are divided into four groups of 8 bits which are processed in parallel.

The design time period is reduced significantly because the structure of each of 8-bit compare circuits 14A–14D differs in only an input signal and a select signal of the multiplexer.

Furthermore, since the 8-bit compare circuit 64A is formed of two 4-bit compare circuits 641A and 641B which are identical to each other in structure, the design time period is further reduced significantly. Since the 4-bit control circuits 641A and 641B can also carry out processing in parallel, the processing time period is further speeded.

The operation of the 1-bit compare circuit 643A or 645A shown in FIG. 25 will be described.

In FIG. 25, input data AI and BI is the m-th bit of the input data to be compared. As a result of comparison of the more significant bits, input signal EIB is set to 0 and 1 when input data AI (m+1) of the (m+1)th bit is equal and not equal to input data BI (m+1) of the (m+1)th bit, respectively. The comparison result of input data AI(m) and BI(m) is valid only when input signal EIB is 0. When input signal EIB is 1, the comparison result of the less significant bits is invalid since the magnitude of input data AI and BI is determined by comparing the more significant bits. More specifically, output signal DO is 0 when input signal EIB is 1 regardless of input data AI (m) and BI(m).

When input data AI(m) equals input data BI(m), output signal DO is 0 and output signal EO is 1. When input data AI(m) is greater than input data BI(m), output signal DO is 1 and output signal EO is 0. When input data AI(m) is smaller than input data BI(m), output signal DO is 0 and output signal EO is 0.

When output signal EIB is 0, the comparison result of the magnitude of input data AI(m) and BI(m) can be identified according to the values of output signals DO and EO. In comparing the magnitude, a comparison is sequentially carried out from the highest bit. This means that the determination of input data AI being equal to input data BI is most time consuming. The processing time is reduced by employing an output signal PO when input data AI equals input data BI.

Output signal PO is set to 1 when input data AI(m) equals input data BI(m). Output signal PO is ascertained faster since the number of gates to be passed is smaller than that of output signal EO. Because output signal PO is determined only by the values of two signals of input data AI(m) and BI(m), it is not necessary to identify the state of the higher bits. Therefore, all the bits are determined simultaneously. Thus, the information is obtained that a bit having output signal PO thereof set to 1 has an equal value.

1-bit compare circuit 642A or 644A shown in FIG. 26 is used with companion of 1-bit compare circuit 643A or 645A shown in FIG. 25. Because compare circuit 643A or 645A shown in FIG. 25 provides an output signal EO of a positive logic, compare circuit 642A or 644A has an input signal EI of a positive logic applied instead of the above-described input signal EIB, and an output signal EOB of a negative logic which is an inverted version of output signal EO.

By using alternately compare circuit 643A or 645A shown in FIG. 25 and compare circuit 642A or 644A shown in FIG. 26, the insertion of an inverter can be avoided on the transmission path of output signal EO. This is because the transmission path of output signal EO is a critical path of compare circuit 642A or 644A.

The operation of compare circuit 642A or 644A shown in FIG. 26 is basically similar to that of compare circuit 643A or 645A shown in FIG. 25.

The operation of 4-bit compare circuit 641A shown in FIG. 24 will be described. When input data A28–A31 is identical to input data B28–B31, output signals PO of compare circuits 642A–645A all become 1. Therefore, NAND gate 647A to which these output signals PO are input provides a signal of 0.

When input data A24–A27 equals input data B24–B27, the input signals of NOR gate 642 both become 0, so that flag signal EFLG is set to 1. As a result, multiplexer 65A of FIG. 8 selects and outputs 1 which is provided to multiplexer 66B in compare circuit 14B. Therefore, flag signal DFLG which is the comparison result of the less significant 8 bit input data A16–A23 and B16–B23 is selected by multiplexer 66B.

When input data D24–D31 is not equal to input data B24–B31 and flag signal EFLG is 0, multiplexer 65A outputs 0. Therefore, multiplexer 66B selects and outputs 0, whereby the comparison result of input data D16–D23 and B16–B23 become invalid. Thus, a flag signal DFLG which is the eventual output signal (output of 4-input NAND 69) is promptly output when determination is made that already any of the higher bits of input data is great.

When output signal EO of compare circuit 645A is 1, input data A28–A31 is equal to input data B28–B31, so that multiplexer 643 selects and provides the output signal of the NOR gate in the four lower-bit compare circuit 641B.

The operation of compare circuits 14A–14D of 32 bits shown in FIG. 27 and FIG. 22 will be described hereinafter.

When input data A24–A31 is equal to input data B24–B31, multiplexer 65A selects and outputs 1. Therefore, multiplexer 66B selects and outputs flag signal DFLG (output of compare circuit 64B) which is the comparison result of input data A16–A23 with B16–B23.

If input data A16–A23 is greater than input data B16–B23, the output signal of multiplexer 66B becomes 1, whereby output signal DFLG of NAND gate 69 becomes 1. Also, flag signal EFLG of 8-bit compare circuit 64B becomes 0, so that multiplexer 65B selects and outputs 0. Therefore, multiplexers 66C and 66D select and output 0. As a result, the output signals of inverters 68C and 68D become 1, and flag signal EFLG becomes 0.

The feature of Embodiment 3 lies is that data is processed in parallel in the units of 4 bits and 8 bits. Therefore, the comparison process of the 32 bits of data is extremely speeded. Furthermore, because the structure of these compare circuits are of simple repetition, the time required for circuit designing and/or layout designing can be reduced significantly.

Embodiment 4

Figure 28:
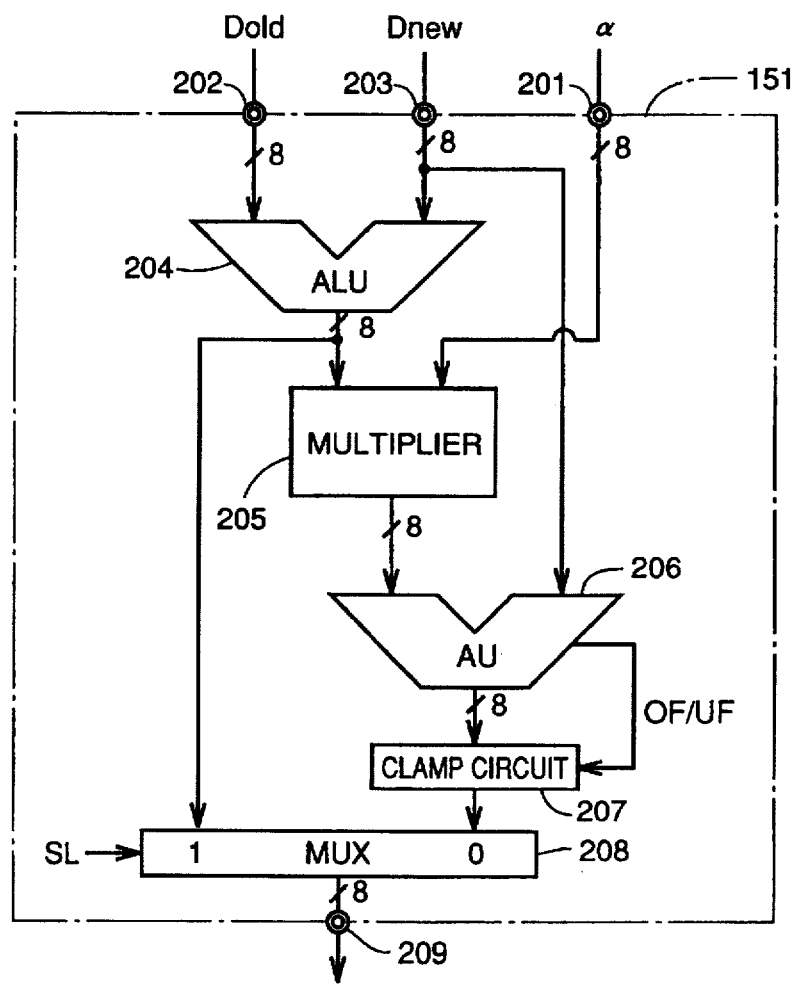
FIG. 28 is a block diagram showing a structure of a ROP/blend unit in the semiconductor integrated circuit device according to Embodiment 4 of the present invention.

FIG. 28 is a block diagram showing a structure of a ROP/blend unit 151 of pixel processing unit 13 in a frame buffer memory according to Embodiment 4 of the present invention. The other ROP/blend units 152–154 in pixel processing unit 13 has a structure similar to that of ROP/blend unit 151.

Referring to FIG. 28, ROP/blend unit 151 includes an input node 201 for entering a constant α in an α-blend process, an input node 202 for entering image data Dold displayed currently on the screen, and an input node 203 for entering data Dnew to be displayed on the next screen.

ROP/blend unit 151 further includes an arithmetic logic unit (ALU) 204, a multiplier 205, an arithmetic operation unit (AU) 206, a clamp circuit 207, and a multiplexer 208.

Arithmetic logic unit 204 subtracts data Dnew provided from input node 203 from data Dold provided from input node 202, or carries out a raster operation according to data Dold and Dnew.

Multiplier 205 multiplies the resultant data of arithmetic logic unit 204 by coefficient data α provided from input node 201. Arithmetic unit 206 adds resultant data α×(Dold-Dnew) of multiplier 205 with data Dnew provided from input node 203. Clamp circuit 207 serves to forcefully clamp the resultant data of arithmetic operation unit 206 to a predetermined value when overflow or underflow occurs in arithmetic operation unit 206.

Multiplexer 208 responds to a select signal SL to select the resultant data of arithmetic logic unit 204 or the output data of clamp circuit 207 to output the same via output node 209.

ROP/blend unit 151 according to Embodiment 4 can carry out the α-blend process shown in the aforementioned equation 2. Equation 2 can be modified as the following equation 3:

$$\begin{cases} OUT(R) = Dnew(R) + \alpha \times \{Dold(R) - Dnew(R)\} \\ OUT(G) = Dnew(G) + \alpha \times \{Dold(G) - Dnew(G)\} \\ OUT(B) = Dnew(B) + \alpha \times \{Dold(B) - Dnew(B)\} \end{cases}$$

ROP/blend unit 151 carries out an α-blend process according to the above equation 3. Although only one multiplier 205 is provided in ROP/blend unit 151, a complete α-blend process can be carried out.

According to Embodiment 4, a proper α-blend process can be carried out even if data (1−α)×Dnew that is calculated in advance by an external IC as in the above-described Embodiment 1 is not applied. A ROP process can also be carried out according to the circuitry of Embodiment 4 since the logic operation functions required for a ROP process are provided in ALU 204.

Embodiment 5

Figure 29:
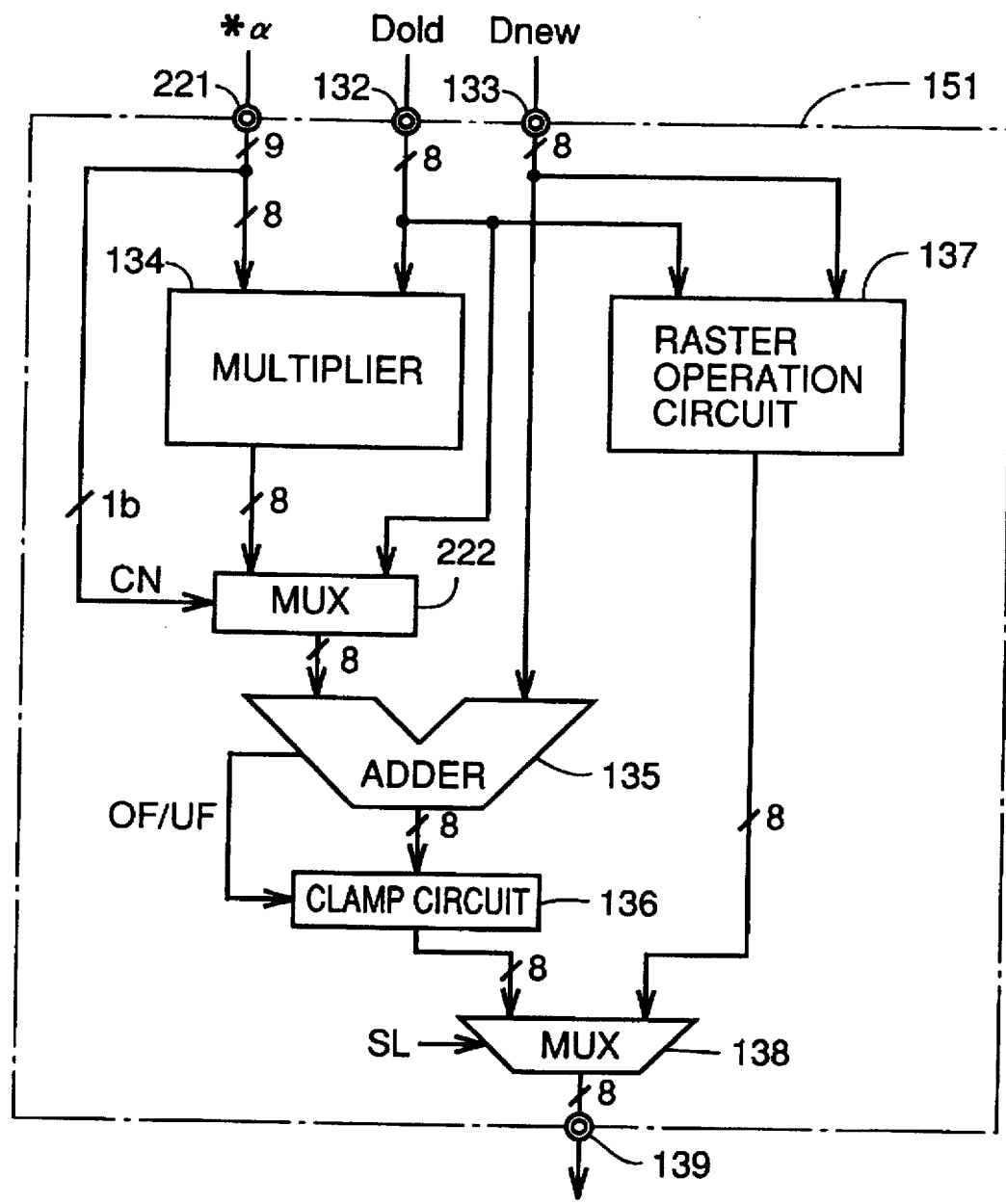
FIG. 29 is a block diagram showing the structure of a ROP/blend unit in a semiconductor integrated circuit device according to Embodiment 5 of the present invention.

FIG. 29 is a block diagram showing a structure of a ROP/blend unit in a frame buffer memory according to Embodiment 5 of the present invention.

Referring to FIG. 29, ROP/blend unit 22 is an improvement of ROP/blend unit 151 shown in FIG. 4. The present ROP/blend unit 151 differs from the above-described ROP/blend unit 151 in that data *α which is 1 bit of data added to the 8-bit coefficient α in the α-blend process is applied to input node 221, and that a multiplexer 222 is provided. Multiplexer 222 responds to a 1-bit binary signal CN added to coefficient α to select and output resultant data of multiplier 134 and data Dold of input node 132.

Image data is generally represented by a fixed-point in graphics processing LSIs. Therefore, there was a problem that a calculation error is generated when the current old image data Dold is to be exactly maintained with no blending of the next new image data Dnew, i.e. when coefficient α is to be 1 (decimal notation) in α-blend processing. For example, if α=1 (decimal notation) is to be expressed by N bits, the actual coefficient α becomes $1$-$\frac{1}{2}^N$. Therefore, even when α=1, the output data of multiplier 134 is not identical to Dold. The old image data Dold cannot be exactly maintained.

By a little addition of hardware, pixel processing unit 32 according to Embodiment 5 can carry out an α-blend processing without the above-described change in Dold when α−1, so that degradation in the quality of color can be prevented.

Coefficient data *α applied from input node 221 includes maintain data C of 1 bit at the most significant level, and coefficient data α of 8 bits at the lower significant level. The most significant bit (SMB) becomes 1 (binary) only when coefficient α is 1 (decimal notation), in which case the less significant 8 bits are ignored as 0. When coefficient α is smaller than 1 (decimal notation), the MSB becomes 0, and the less significant 8 bits represent the value of coefficient α.

The maintain data CN which is the MSB of coefficient data *α is provided to multiplexer 222. When maintain data CN is 1, image data Dold from input node 132 is selected and output. Therefore, the old image data Dold is directly output.

When maintain data CN is 0, the resultant data of multiplier 134 is selected, whereby a general α-blend process is carried out as in the case of Embodiment 1.

Embodiment 6

Figure 30:
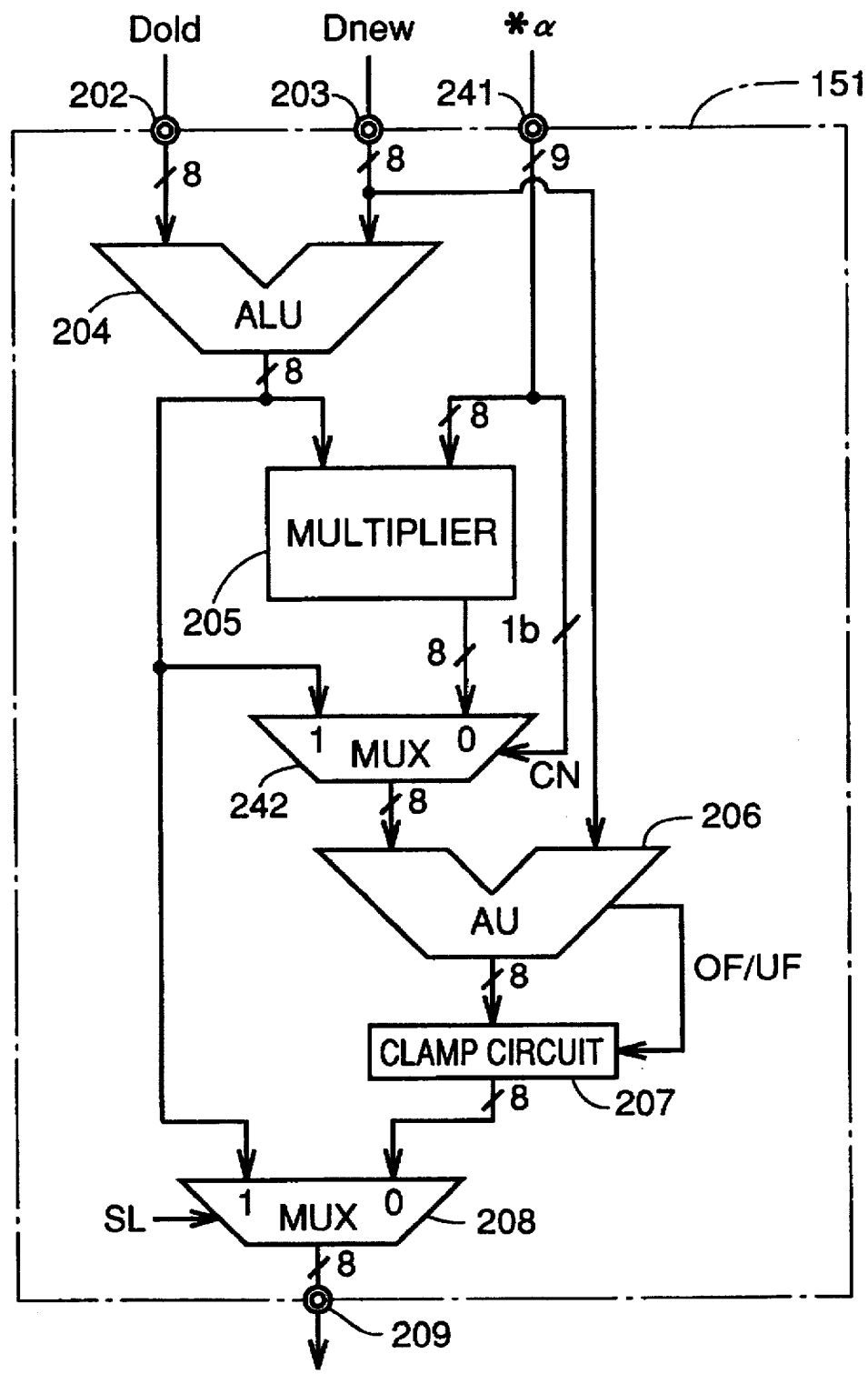
FIG. 30 is a block diagram showing a structure of ROP/blend nnit in a semiconductor integrated circuit device according to Embodiment 6 of the present invention.

FIG. 30 is a block diagram showing a structure of a ROP blend unit in a frame buffer memory according to Embodiment 6 of the present invention. The present ROP/blend unit 151 of Embodiment 6 is an improvement of ROP/blend unit 151 of Embodiment 4.

Referring to FIG. 30, pixel processing unit 151 includes an arithmetic logic unit 204, a multiplier 205, an arithmetic operation unit 206, a clamp circuit 207, and a multiplexer 208, as in the above-described Embodiment 4. Differing from Embodiment 4, pixel processing unit 151 includes a multiplexer 242.

The present Embodiment 6 differs from Embodiment 4 in that coefficient data *α having 1-bit maintain data CN added to coefficient data α in a blend process is applied to input node 241, and that multiplexer 242 responds to maintain data CN to select the resultant data of multiplier 205 and arithmetic logic unit 204 which is provided to arithmetic unit 206.

Similar to Embodiment 5, coefficient data *α having 1 as the MSB is applied to input node 241 when coefficient α is 1 (decimal notation). The MSB of coefficient data *α is provided to multiplexer 242 as maintain data CN. In response to 1 of maintain data CN, multiplexer 242 selects and provides to arithmetic unit 206 the resultant data of arithmetic logic unit 204. Therefore, the old image data Dold is directly output from adder 206 regardless of the value of data Dnew.

When coefficient data α is smaller than 1 (decimal notation), the MSB of the coefficient data *α is 0, whereby maintain data CN of 0 is applied to multiplexer 242. Therefore, multiplexer 242 selects and provides to arithmetic unit 206 the resultant data of multiplier 205. Thus, a general α-blend process is carried out, as in Embodiment 4.

Embodiment 7

Figure 31:
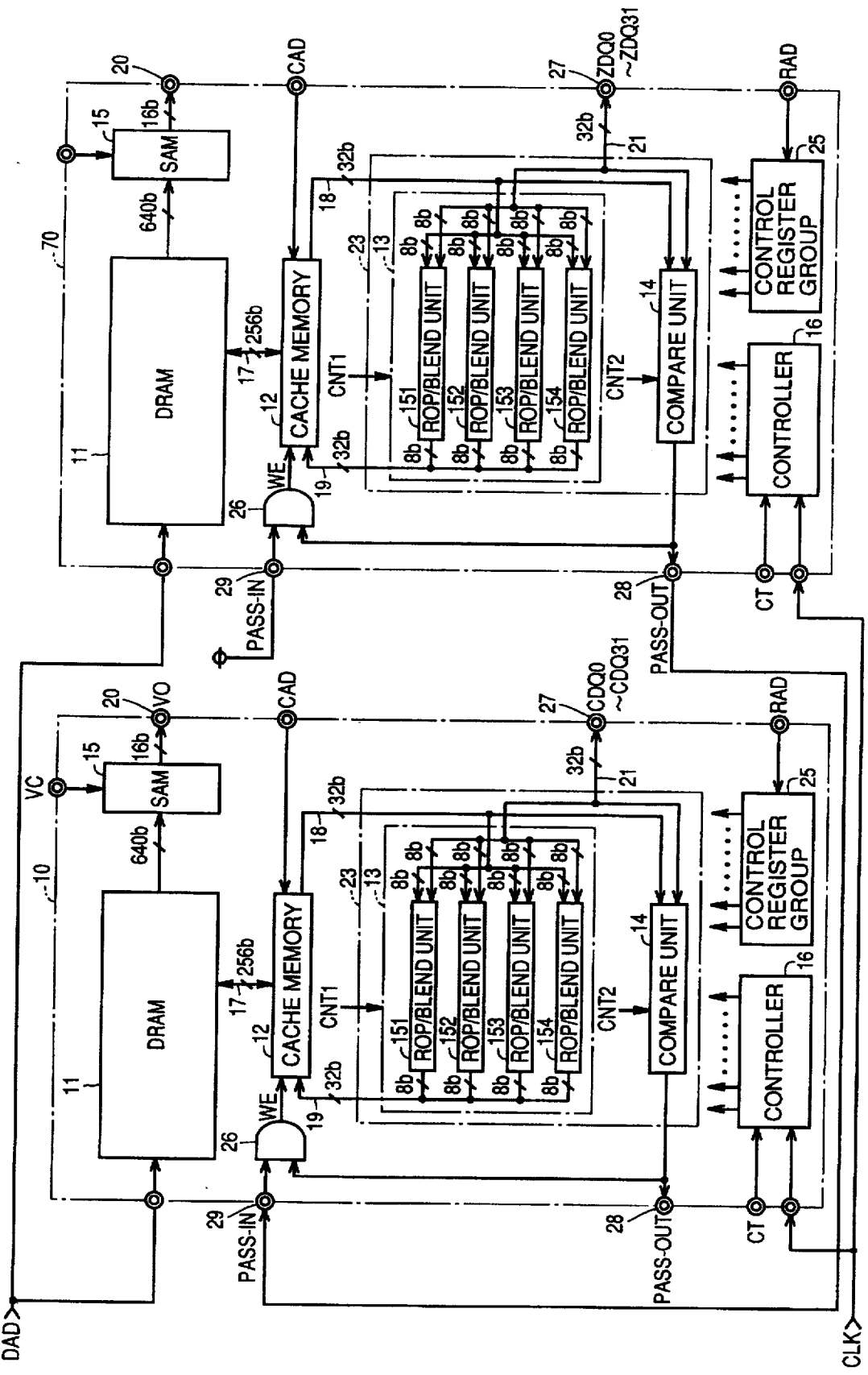
FIG. 31 is a block diagram showing the entire structure of an image storage processing system according to Embodiment 7 of the present invention.

FIG. 31 is a block diagram showing the entire structure of an image storage processing system according to Embodiment 7 of the present invention. Referring to FIG. 31, this image storage processing system includes two frame buffer memories 10 and 70.

The image storage processing system uses two of the frame buffer memory of Embodiment 1 to process data of 64 bits per pixel. 32-bit color data CDQ0–CDQ31 is applied to data input terminal 27 of frame buffer memory 10. Color data CDQ is formed of, for example, 8-bit R (Red) data, 8-bit G (Green) data, 8-bit B (Blue) data, and 8-bit α (transparency coefficient) data. 32-bit Z data ZDQ0–ZDQ31 is applied to data input terminal 27 of frame buffer memory 70.

Figure 32:
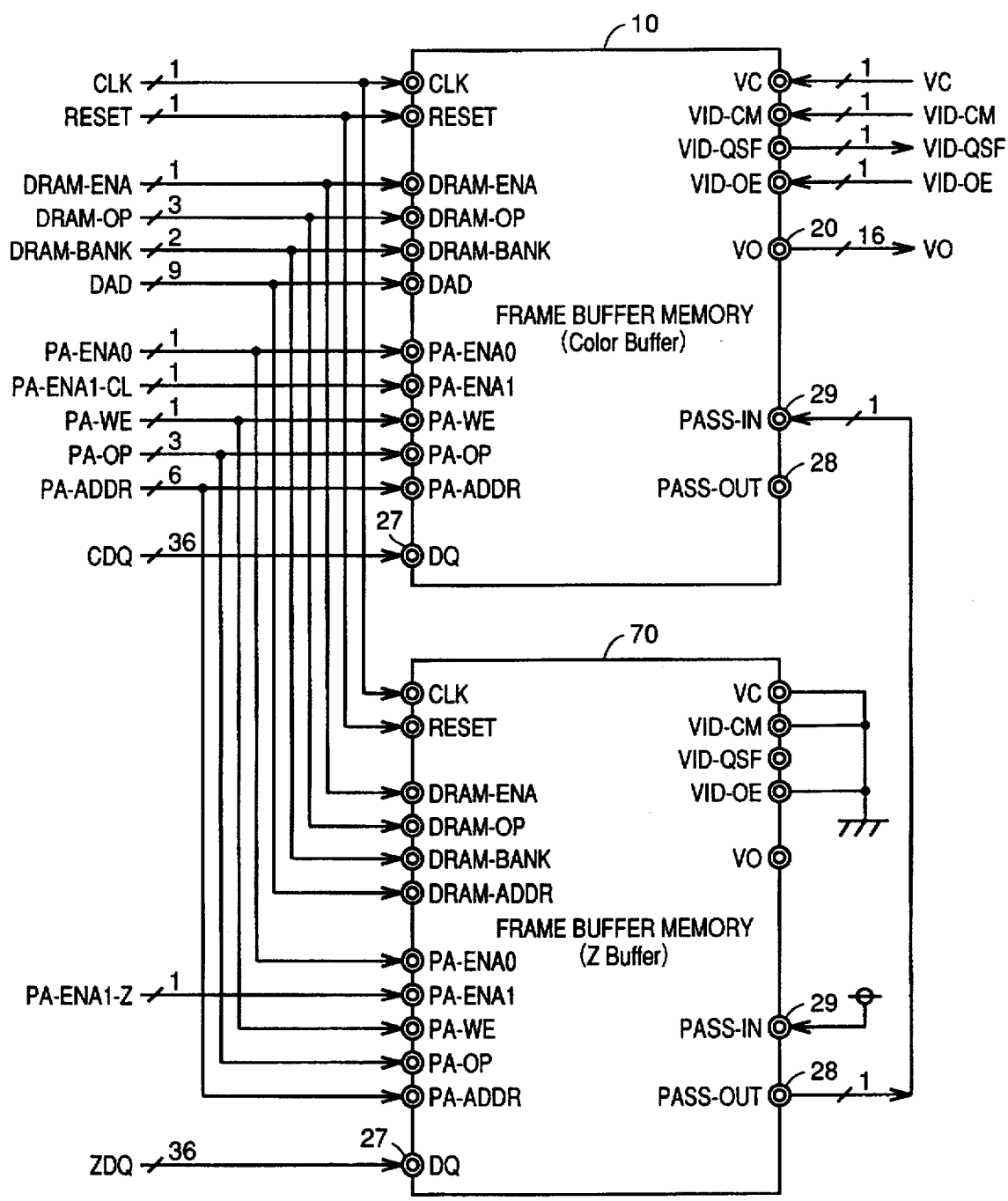
FIG. 32 is a block diagram showing a specific interconnection method in the image storage processing system of FIG. 31.
Figure 33:
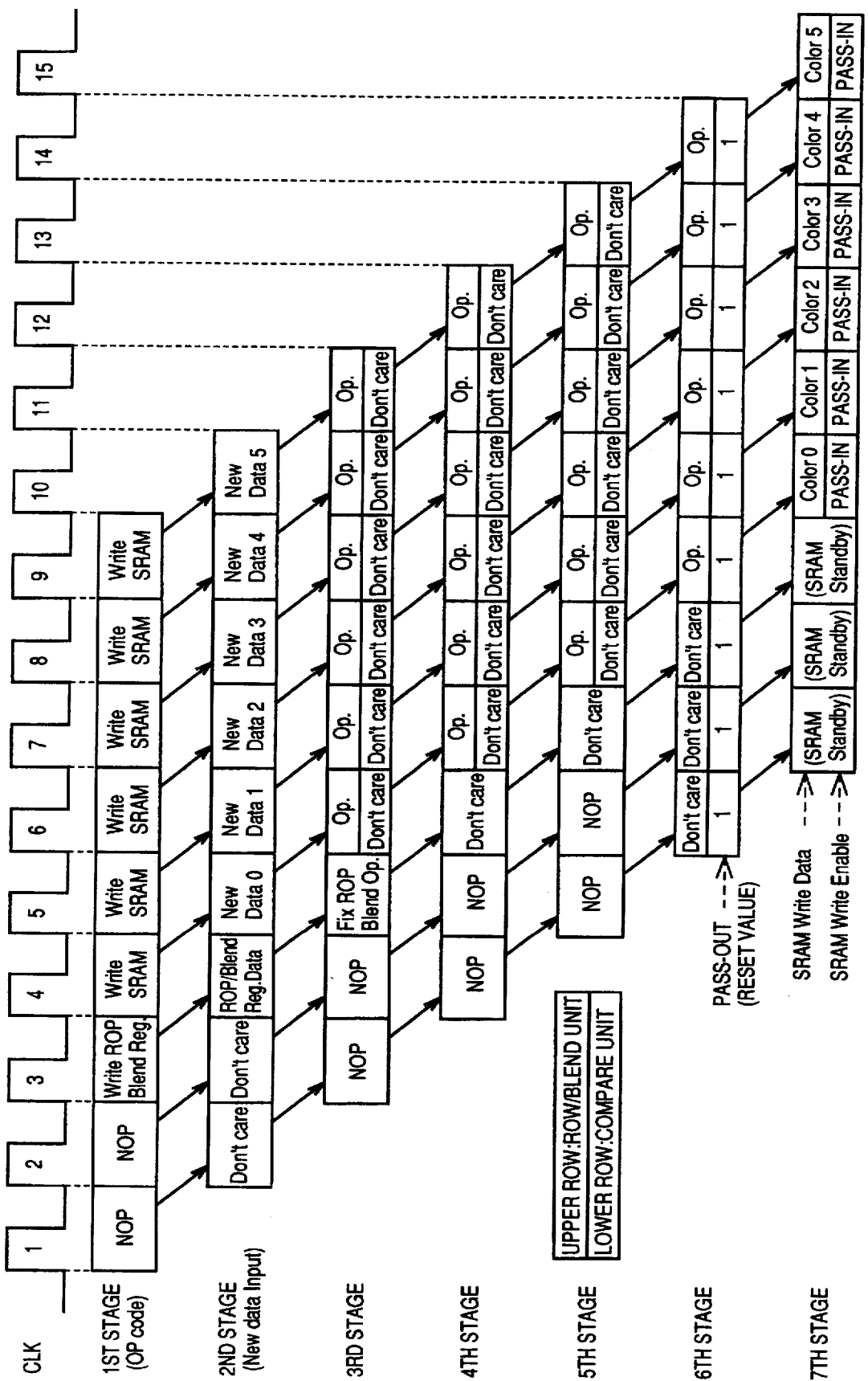
FIG. 33 is a timing chart showing the pipeline operation of a frame buffer memory for processing the color data shown in FIG. 31.

When one of the two frame buffer memories is exclusively used for color data processing and the other for Z data processing, control signal output terminal 28 of frame buffer memory 70 is connected to control signal input terminal 29 of frame buffer memory 10 to control the writing into the cache memories of frame buffer memories 10 and 70, as shown in FIGS. 31 and 32. Control signal input terminal 29 of frame buffer memory 70 is pulled up to power supply potential. The same address signal DAD is applied to both main memories 11, and data corresponding to one pixel is stored into the address of the same DRAM in frame buffer memories 10 and 70. The same clock signal CLK is applied to both controllers 16.

A predetermined data is applied to control register group 25 of frame buffer memory 10, whereby that frame buffer memory 10 is set to be dedicated for color data processing. More specifically, flag output signal PASS-OUT from compare unit 14 is fixed to 1. Also, the operation mode of the ROP/blend unit is set. A predetermined data RAD is applied to control register group 25 of frame buffer memory 70, whereby frame buffer memory 70 is set to be dedicated for Z data processing. More specifically, all the four ROP/blend units 151-154 are set to pass through any applied data.

FIG. 7 is a truth table of flag input signal PASS-IN and flag output signal PASS-OUT.

TABLE 7

| PASS-IN | PASS-OUT | Cache Memory Writing Operation |
|---------|----------|-------------------------------|
| 0 | 0 | Disable |
| 0 | 1 | Disable |
| 1 | 0 | Disable |
| 1 | 1 | Enable |

Referring to Table 7, flag output signal PASS-OUT of 1 is applied to AND gate 26 in frame buffer memory 10. Writing into cache memory 12 is enabled and disabled when flag input signal PASS-IN provided from frame buffer memory 70 is 1 and 0, respectively.

In frame buffer memory 70, flag input signal PASS-IN of 1 is applied to AND gate 26, whereby writing into cache memory 12 is enabled and disabled when flag output signal PASS-OUT from compare unit 14 is 1 and 0, respectively.

32-bit color data CDQ0-CDQ31 applied to data input terminal 27 of frame buffer memory 10 is provided to ROP/blend units 151-154 and compare unit 14 via data bus 21. In frame buffer memory 70, the 32 bits of color data read out from Cache memory 12 is applied to compare unit 14 via data bus 18. Externally applied Z data ZDQ0-ZDQ31 are also applied to ROP/blend units 151-154. However, they are subjected to no process and pass through directly according to information set in advance in control register group 25.

In compare unit 14 of buffer memory 70, the 32-bit Z data from cache memory 12 is compared with externally applied 32-bit Z data ZDQ0-ZDQ31. When the image currently displayed on the screen has a closer placement on the display than the image to be displayed on the next screen (Z data applied from cache memory 12 is smaller than the externally applied Z data), compare unit 14 generates a flag output signal PASS-OUT of 0. This inhibits the writing into the cache memory of data processed by the ROP/blend unit in parallel to a comparison process. When the image on the next screen to be displayed has a closer placement on the display than the currently displayed screen (the externally applied Z data is smaller than the Z data provided from cache memory 12), compare unit 14 provides a flag output signal PASS-OUT of 1. As a result, writing of data processed by ROP/blend unit parallel to a comparison process is enabled.

Figure 34:
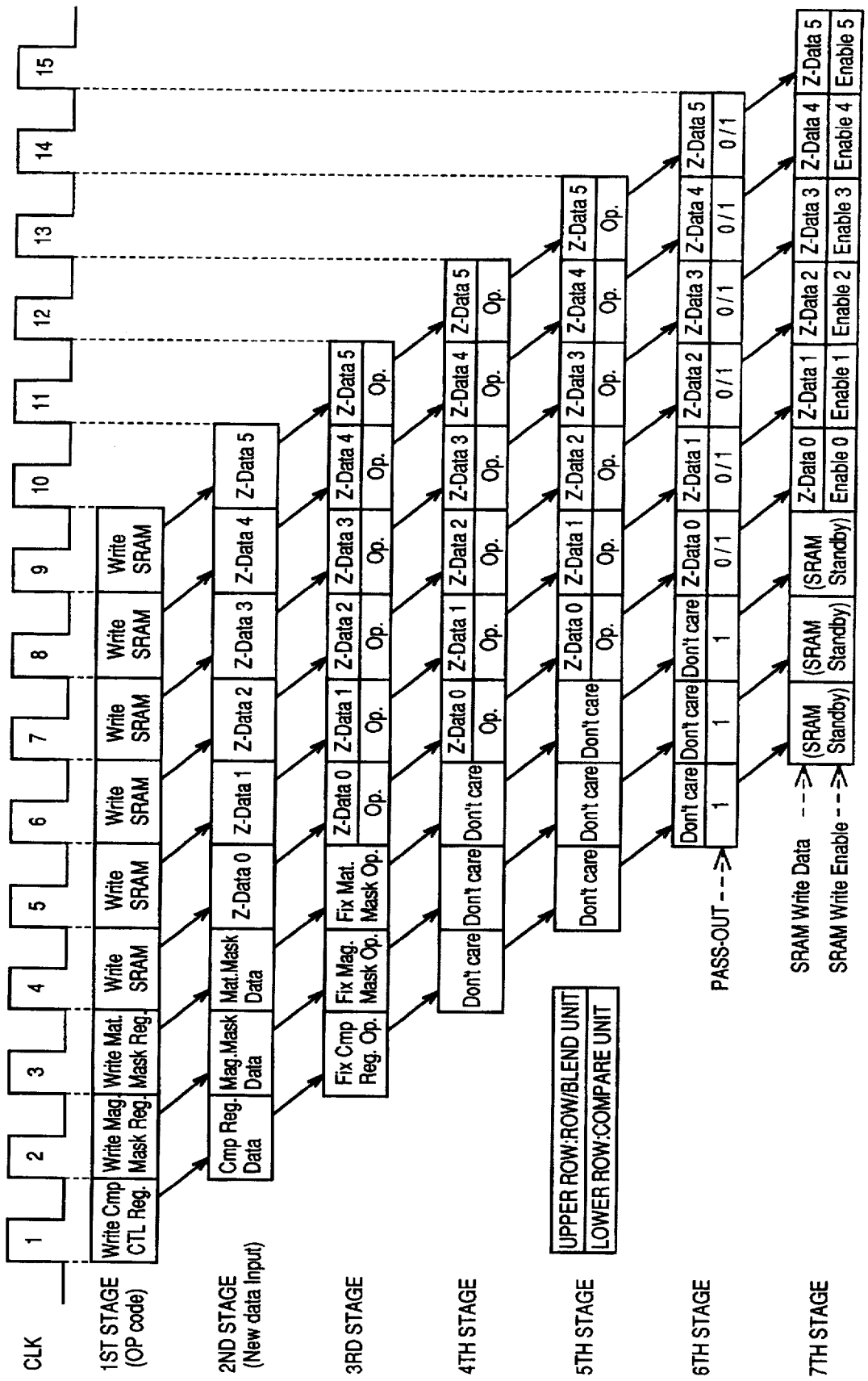
FIG. 34 is a timing chart showing the pipeline operation of a frame buffer memory for carrying out the Z compare process shown in FIG. 31.

FIG. 34 is a timing chart showing a pipeline operation in frame buffer memory 70 dedicated for Z data. It is appreciated from FIG. 34 that frame buffer memory 70 is formed of seven pipeline stages. Each operation of ROP/blend units 151-154 and compare unit 14 is carried out during the third to sixth stages. Flag output signal PASS-OUT is provided from compare unit 14 at the same time externally applied Z data ZDQ0-ZDQ31 passes through and output from ROP/blend units 151-154.

As described above, ROP/blend units 151-154 and compare unit 14 are both formed of four pipeline stages. Therefore, while color data CDQ0-CDQ31 applied to frame buffer memory 10 are subjected to the process of the sixth stage in ROP/blend units 151-154, Z data ZDQ0-ZDQ31 applied to frame buffer memory 70 are compared with Z data applied from cache memory 12 in compare unit 14, whereby a flag output signal PASS-OUT indicating the comparison result thereof is output.

This flag output signal PASS-OUT is applied to frame buffer memory 10 via a PASS-IN terminal of frame buffer memory 10, whereby a write permit signal with respect to a cache memory is generated. This generation of a write permit signal is carried out at the seventh stage. When flag output signal PASS-OUT is 1, the resultant data output from ROP/blend units 151-154 of frame buffer memory 10 is written into cache memory 12. At the same time, Z data ZDQ0-ZDQ31 output from ROP/blend units 151-154 of frame buffer memory 70 are written into a corresponding cache memory 12.

When flag output signal PASS-OUT is 0, resultant data output from ROP/blend units 151-154 is not written into cache memory 12 in frame buffer memory 10 nor 70.

As described above, when the next screen to be displayed has a closer placement on the display than the currently displayed screen, color data and Z data will be both rewritten. However, when the currently displayed screen has a closer placement on the display than the next screen to be displayed, neither color data nor Z data will be rewritten.

According to Embodiment 7, a process can be carried out at the same level of performance regardless of whether (R, G, B, α) data and Z value are applied to separate chips when the amount of data per frame is so great that they cannot be stored in one frame buffer or when all data are stored on the same chip. The result of Z compare can be transmitted by connecting a signal PASS-OUT to a signal PASS-IN even when the embodiment is implemented in plural chips. Thus, a plural chip structure can easily be implemented with a low number of load circuits.

Figure 35:
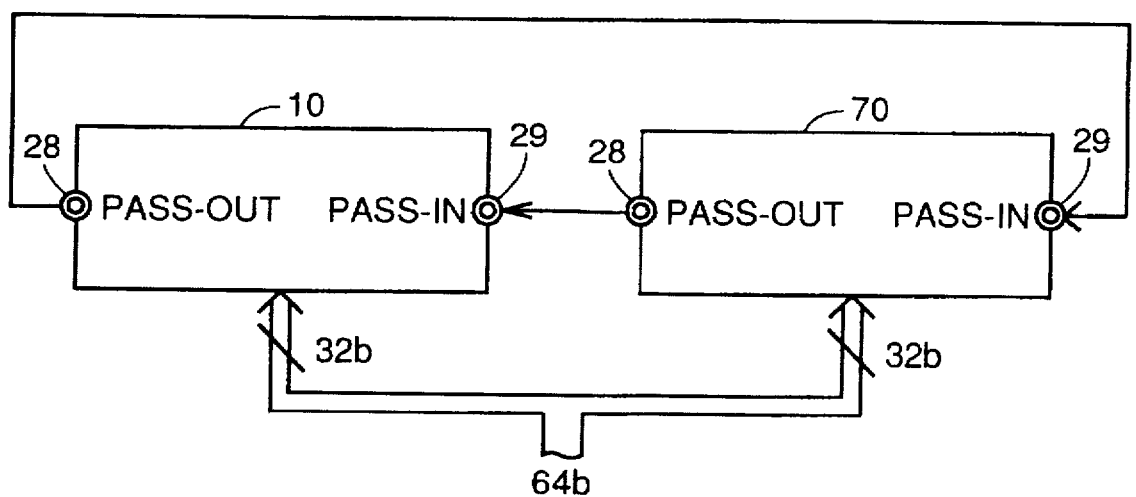
FIG. 35 is a block diagram showing an interconnection method different from that shown in FIG. 31.

In the image storage processing system shown in FIG. 31, there is no connection to control signal output terminal 28 of frame buffer memory 10, and power supply potential is applied to control signal input terminal 29 of frame buffer memory 70. However, control signal output terminal 28 of frame buffer memory 10 may be connected to control signal input terminal 29 of frame buffer 70 as shown in FIG. 35. In this case, flag output signal PASS-OUT of 1 generated by compare unit 14 of frame buffer memory 10 is applied to AND gate 26 of frame buffer memory 70.

Alternatively, flag input signal PASS-IN and flag output signal PASS-OUT may take a differential structure to speed up the operation and to avoid noise.

Embodiment 8

Figure 36:
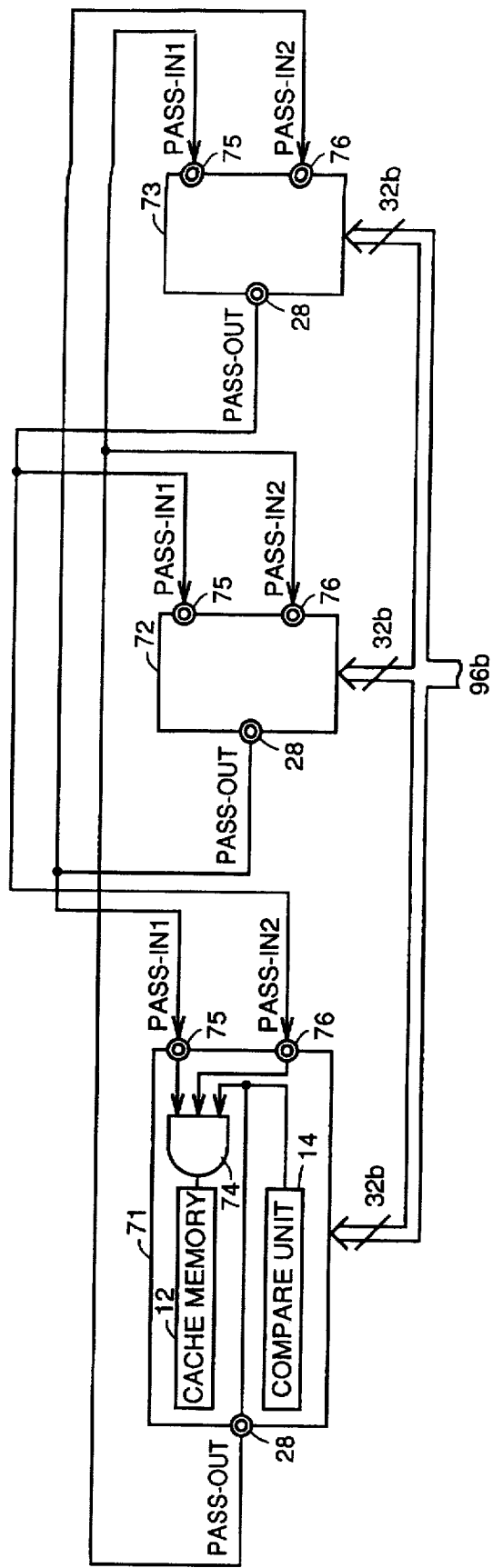
FIG. 36 is a block diagram showing the entire structure of an image storage processing system according to Embodiment 8 of the present invention.

FIG. 36 is a diagram showing the entire structure of an image storage processing system according to Embodiment 8 of the present invention. Referring to FIG. 36, the present image storage processing system includes three frame buffer memories 71-73. Image data of 96 bits is applied to the entire system, wherein image data of 32 bits is applied to each frame buffer memory.

Frame buffer memory 71 includes two control signal input terminals 75, 76, and a 3-input AND gate 74 receiving flag output signal PASS-OUT from compare unit 14, flag input signal PASS-IN1 provided to control signal input terminal 75 and flag input signal PASS-IN2 provided to control signal input terminal 76.

The following Table 8 is a truth table of flag input signals PASS-IN1, PASS-IN2, and flag output signal PASS-OUT.

TABLE 8

| PASS-IN1 | PASS-IN2 | PASS-OUT | Cache Memory Writing Operation |
|---|---|---|---|
| 0 | 0 | 0 | Disable |
| 0 | 0 | 1 | Disable |
| 0 | 1 | 0 | Disable |
| 0 | 1 | 1 | Disable |
| 1 | 0 | 0 | Disable |
| 1 | 0 | 1 | Disable |
| 1 | 1 | 0 | Disable |
| 1 | 1 | 1 | Enable |

Although not shown in frame buffer memory 71 of FIG. 36, main memory 11, ROP/blend units 151–154, serial access memory 15, etc. are provided as in buffer memory 10 of Embodiment 1.

A plurality of control input terminals may be provided in one frame buffer memory as in Embodiment 8. It is appreciated from FIG. 36 that when two control signal input terminals 75 and 76 are provided, flag output signals PASS-IN1 and PASS-IN2 of the other two frame buffer memories 72 and 73 are to be applied to control signal input terminals 75 and 76 thereof as shown in FIG. 36. PASS-OUT signal of one frame buffer memory is applied to the PASS-IN terminal of any of the remaining two frame buffer memories. Therefore, a plurality of signals will not be provided to one PASS-IN terminal.

In Embodiment 8, each flag output signal PASS-OUT controls the writing of the cache memory in the other two frame buffer memories.

Similar to Embodiment 7, control signal input terminals 75 and 76 may be pulled up or pulled down according to each requirement.

Embodiment 9

Figure 37:
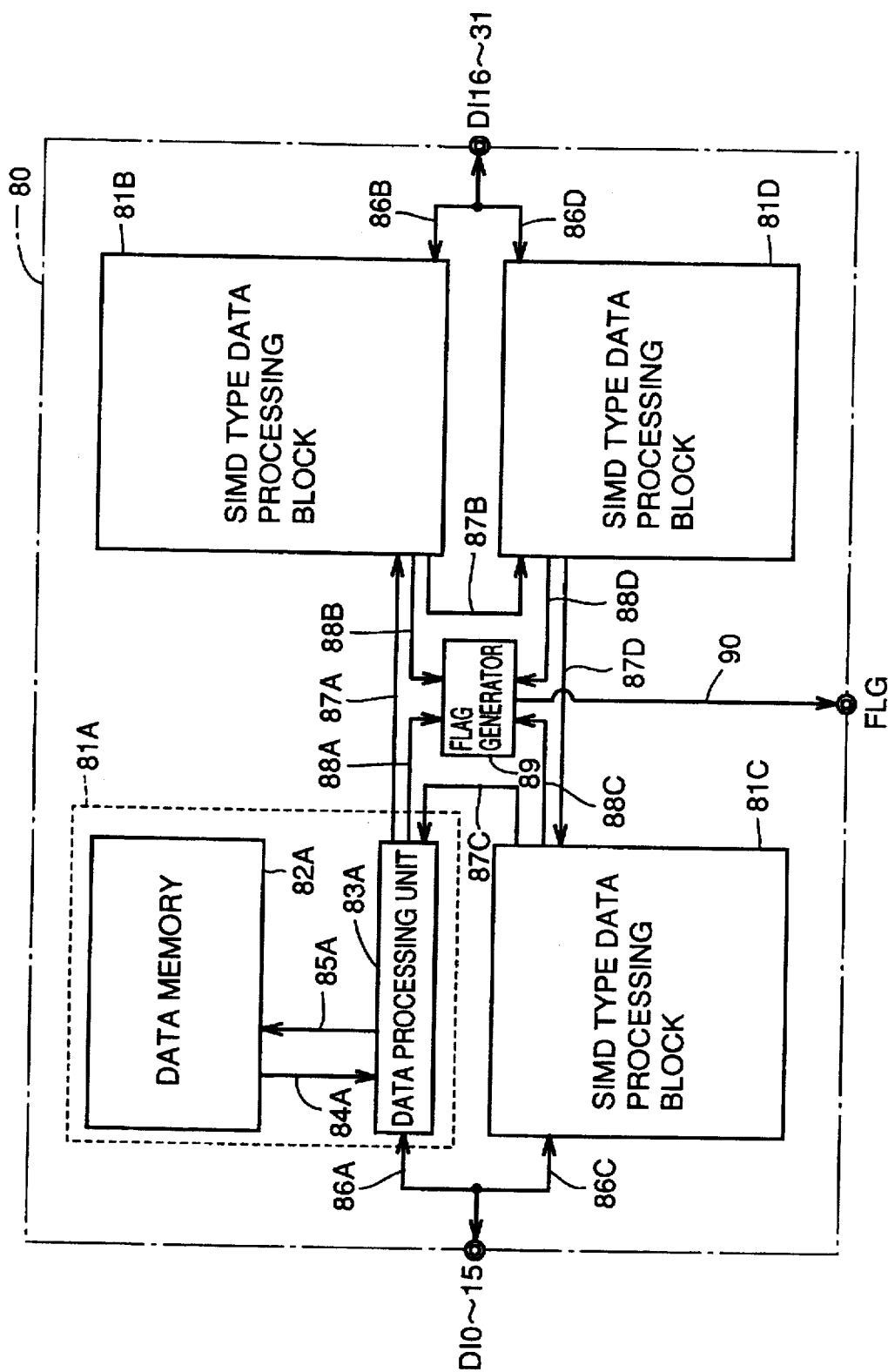
FIG. 37 is a block diagram showing an entire structure of a semiconductor integrated circuit device according to Embodiment 9 of the present invention.

FIG. 37 is a block diagram showing the entire structure of a frame buffer memory according to Embodiment 9 of the present invention. According to the present frame buffer memory 80, a testing method of the present invention can be carried out. The present invention is not limited to Embodiment 9 where a frame buffer memory is described. The same effect can be achieved when the present invention is applied to a general SIMD/MIMD type architecture or a structure that carries out a SIMD type process.

Referring to FIG. 37, frame buffer memory 80 is an LSI that employs a SIMD architecture designed to readily carry out testing. Frame buffer memory 80 includes four SIMD type data processing blocks 81A–81D, and a flag generator 89.

SIMD type data processing block 81A, for example, includes a data memory 82A, and a data processing unit 83A. The data in data memory 82A is transferred to data processing unit 83A via data bus 84A, and the data in data processing unit 83A is transferred to data memory 82A via data bus 85A. Also, data in data processing unit 83A is provided to the outside world via data bus 86A. Externally applied data DI0–DI15 are provided to data processing unit 83A via a data bus 86A. Each of the remaining data processing blocks 81B–81D has a structure similar to that of data processing block 81A.

The processed result of data processing unit 83A is provided to a data processing unit (not shown) in data processing block 81B via data bus 87A. Similarly, the processed results of the data processing units in data processing blocks 81B and 81D are provided to the data processing unit (not shown) in data processing blocks 81D and 81C, respectively, via data buses 87B and 87D, respectively. Furthermore, the processed result of the data processing unit in data processing block 81C is provided to data processing unit 83A in data processing block 81A via data bus 87C.

External data DI0–DI15 are provided to the data processing unit in data processing block 81C via data bus 86C. The data in the data processing unit thereof is output to the outside world via data bus 86C.

Externally applied data DI16–DI31 are provided to the data processing unit in data processing block 81B via data bus 86B as well as to the data processing unit of data processing block 81D via data bus 86D. The data in the data processing unit of data processing block 81B is provided to the outside world via data bus 86B. Also, the data of the data processing unit of data processing block 81D is provided to the outside world via data bus 86D.

Data processing unit 83A includes a test circuit (not shown). The resultant data from the test circuit is provided to flag generator 89 via data bus 88A. Similarly, in the other data processing blocks 81B–81D, the resultant data from the test circuit in each data processing unit is provided to flag generator 89 via data buses 88B–88C, respectively. Flag generator 89 responds to the resultant data to generate a flag signal FLG.

Figure 38:
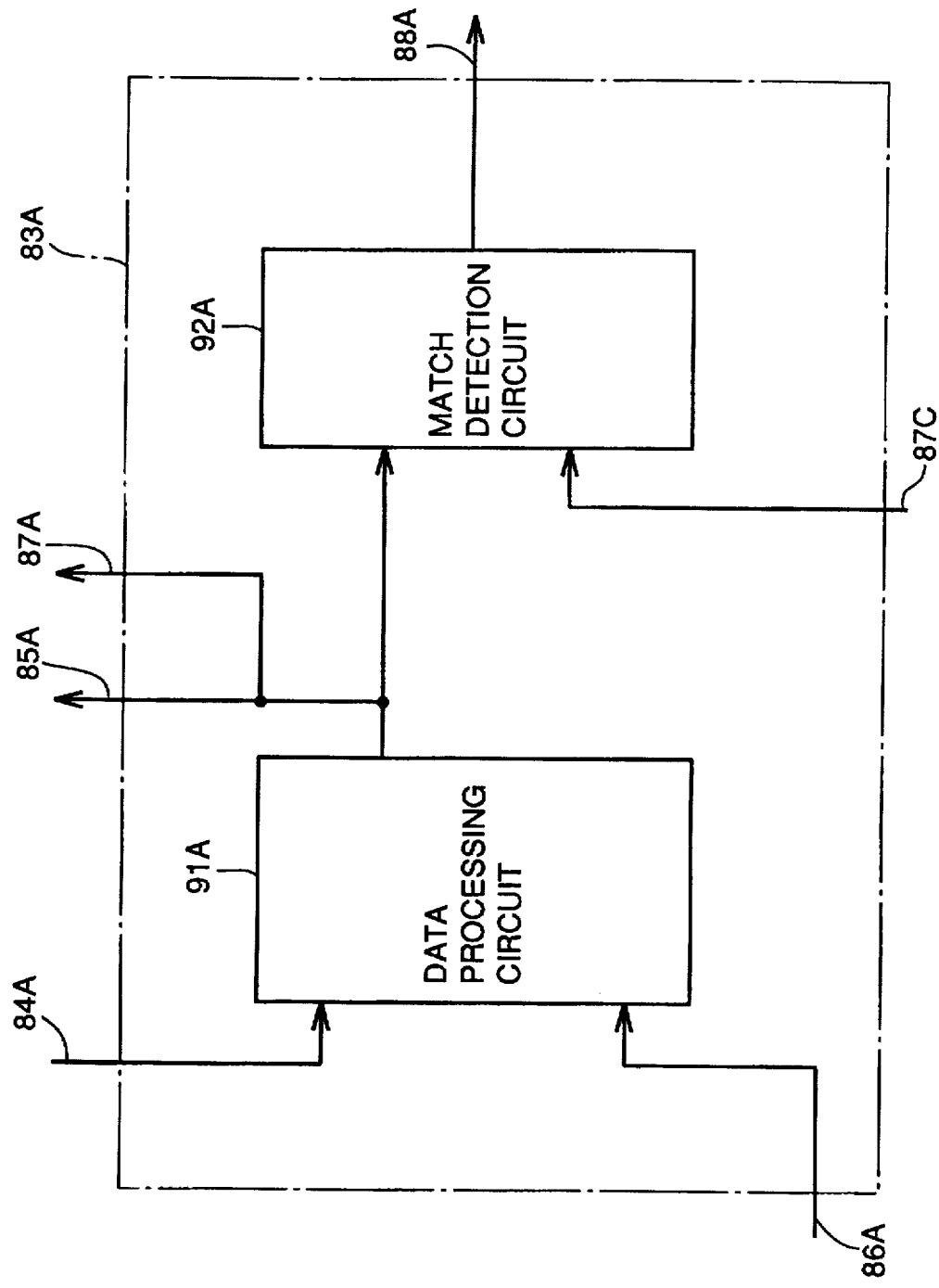
FIG. 38 is a block diagram showing a structure of a data processing unit in the semiconductor integrated circuit device shown in FIG. 37.

FIG. 38 is a block diagram showing a structure of data processing unit 83A of FIG. 37.

Referring to FIG. 38, data processing unit 83A includes a data processing circuit 91A and a match detection circuit 92A. Data processing circuit 91A includes ROP/blend unit 151, for example, of FIG. 4.

A method of testing frame buffer memory 80 will be described hereinafter.

Before testing, test data is written into data memory 82A in advance. The test data is read out from data memory 82A to be provided to data processing circuit 91A via data bus 84A.

Also, external data DI0–DI15 are applied to data processing circuit 91A via data bus 86A. Data processing circuit 91A processes these two data. The process result is transferred to data memory 82A via data bus 85A. The process result is also provided to match detection circuit 92A as well as to a match detection circuit (not shown) of the data processing unit in data processing block 81B via data bus 87A. The same data to frame buffer memory 80 and data processing circuit 91A is applied in the other data processing blocks 81B–81D. Therefore, the processed result in the data processing circuits of data processing blocks 81A–81D should match each other.

In data processing block 83A, the processed result of data processing circuit 91A and the processed result in the data processing circuit in the adjacent data processing block 81C are applied to match detection circuit 92A. Similarly, in the other data processing blocks 81B–81D, the processed result of its own data processing circuit and the processed result of the data processing circuit in an adjacent data processing block are applied to its own match detection circuit. Each match detection circuit in data processing blocks 81A–81D makes the determination whether the processed results match between adjacent data processing blocks. If the processed results do not match, a determination result of 1 is applied to flag generator 89. When at least one of the determination results is 1, flag generator 89 provides a flag signal FLG of 1 via data bus 90. Thus, a fault in frame buffer memory 80 can be identified.

Because flag generator 89 includes a latch function, flag signal FLG set to 1 is maintained until all the testing is completed.

Frame buffer memory 80 having a simple circuit structure according to Embodiment 9 can be easily and rapidly tested of a fault in the circuitry. Because a plurality of data processing blocks 81A–81D can be tested at the same time, the time required for testing can be reduced significantly. Furthermore, since test data is written in advance in data memory 82A, testing of an LSI under a packaged state can be carried out easily. Although the number of bits of data is specified in Embodiment 9, the effect of the present invention is not dependent upon the number of bits. The present invention is not limited to the above-described embodiment where the number of data processing units to be tested is 4, and a similar effect can be achieved when the number of the units is not 4 (for example more than 2).

Embodiment 10

Figure 39:
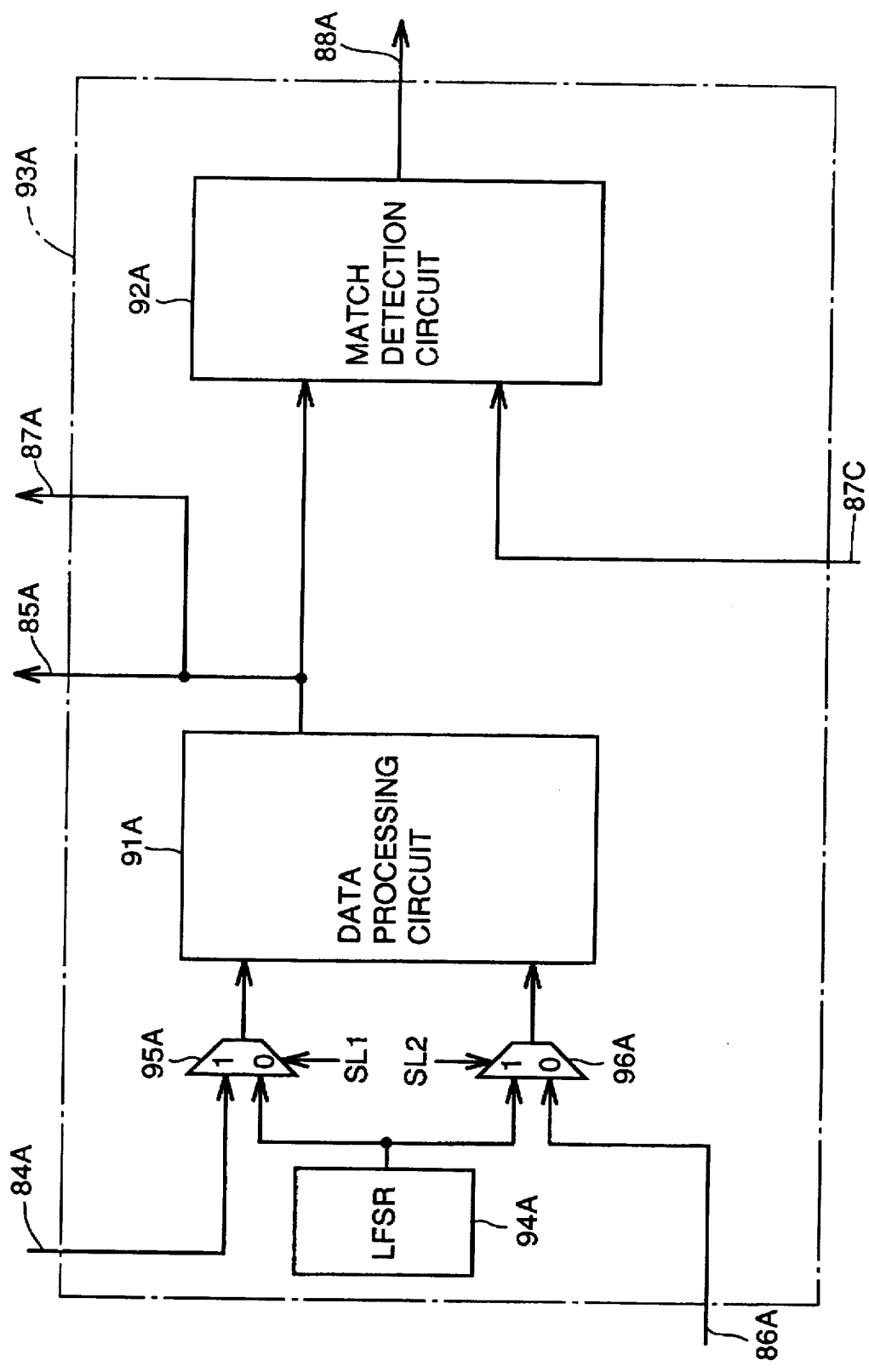
FIG. 39 is a block diagram showing a structure of a data processing unit in a semiconductor integrated circuit device according to Embodiment 10 of the present invention.
Figure 40:
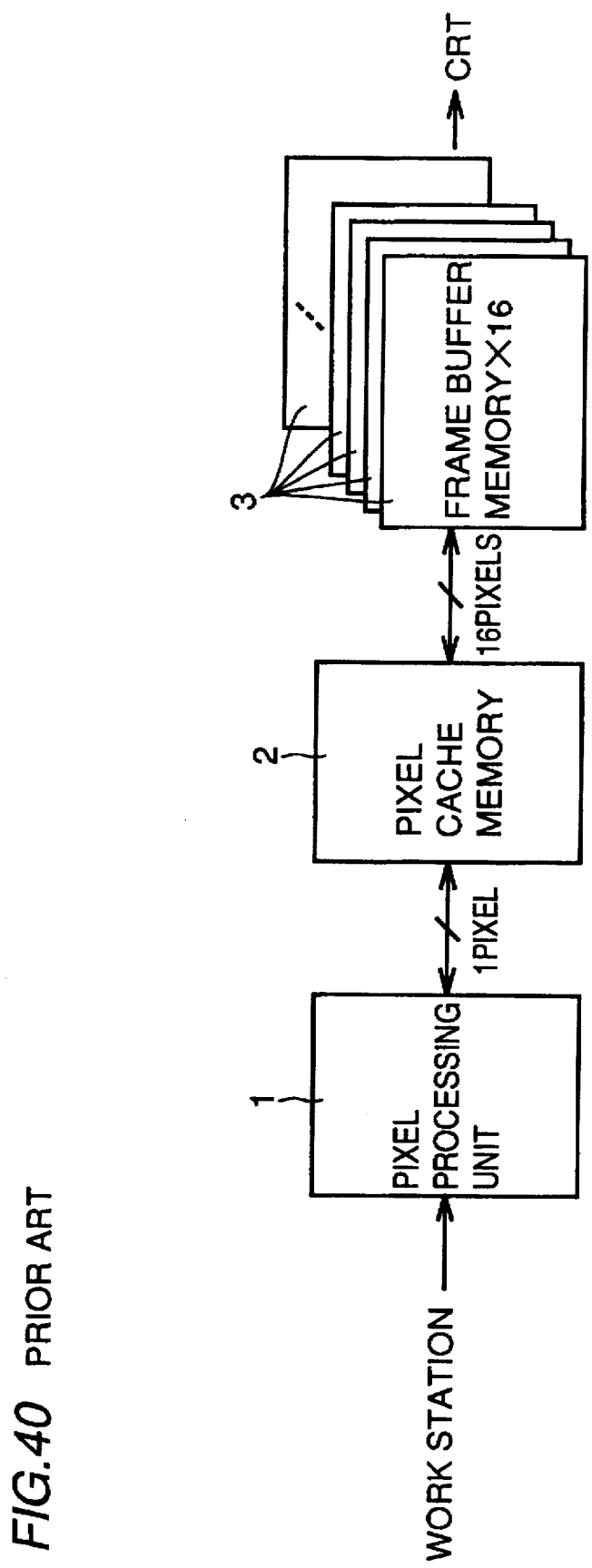
FIG. 40 is a block diagram showing a structure of a conventional graphics processing system.
Figure 41:
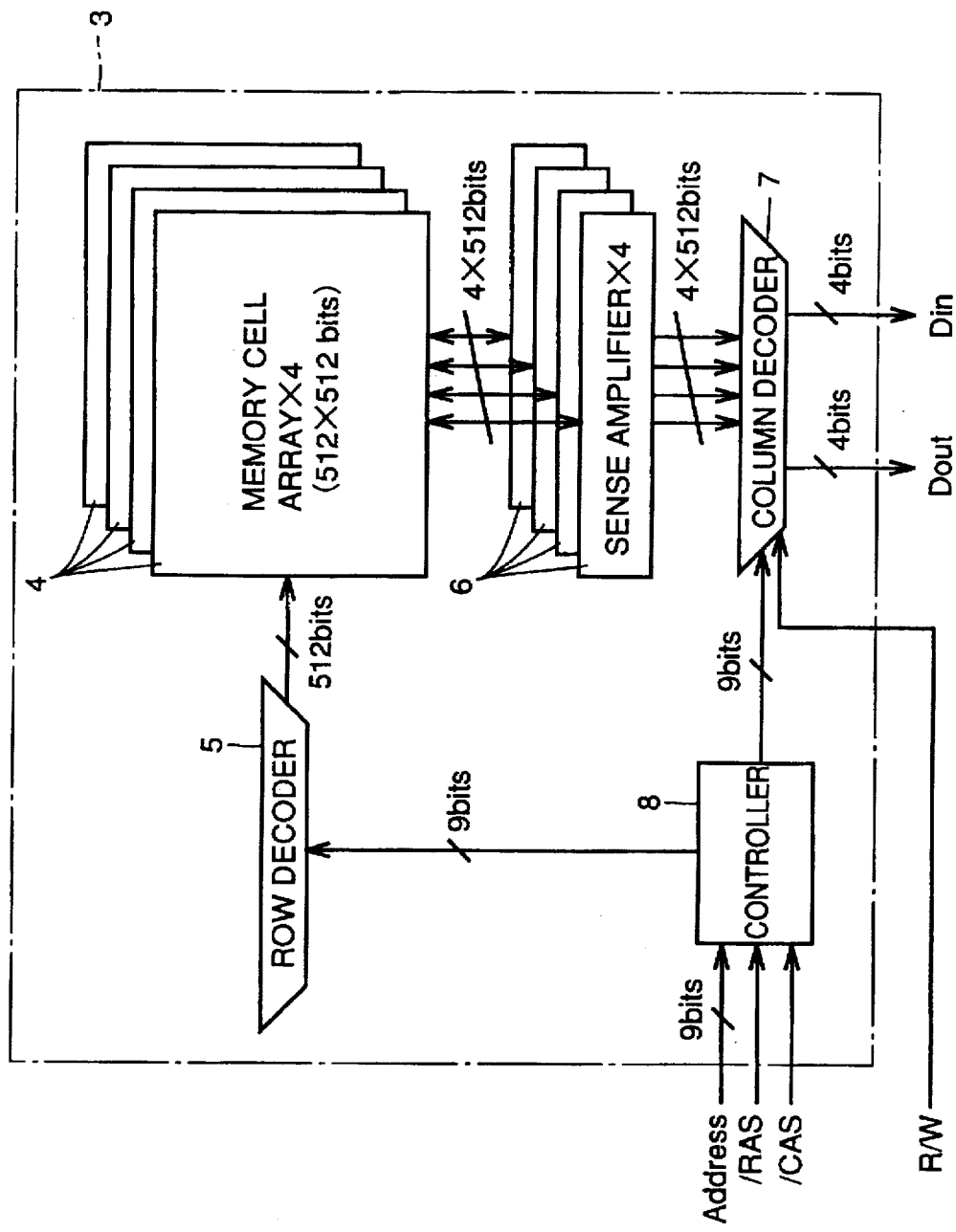
FIG. 41 is a block diagram showing a structure of a main memory which is the frame buffer memory in the graphic processing system of FIG. 40.
Figure 42:
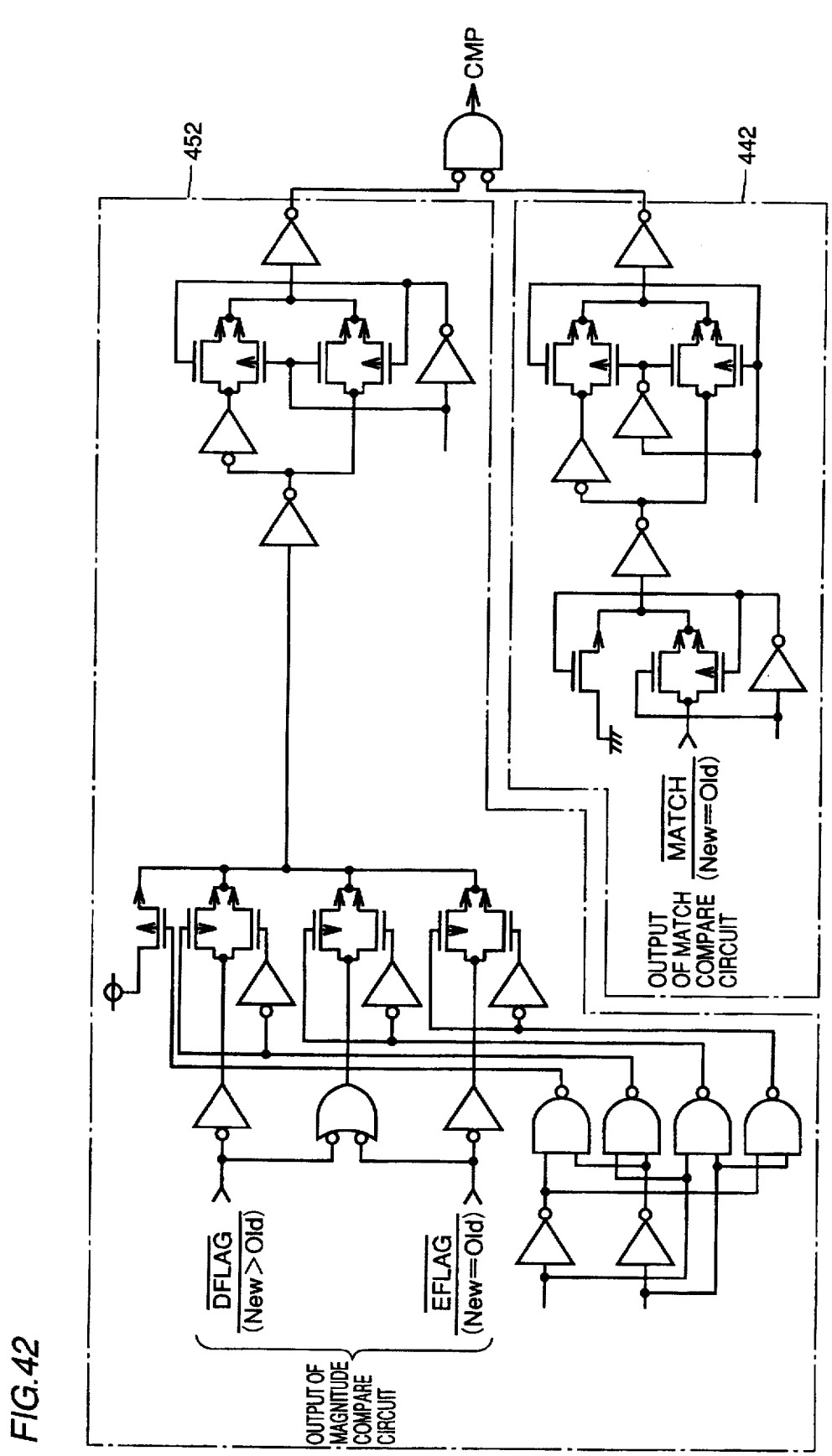
FIG. 42 is a circuit diagram showing a structure of a flag generator in the semiconductor integrated circuit device according to claim 22.

FIG. 39 is a block diagram showing a structure of a data processing unit in a frame buffer memory according to Embodiment 10 of the present invention. The present data processing unit 93A is substituted for data processing unit 83A of the above Embodiment 9.

Referring to FIG. 39, data processing unit 93A includes data processing circuit 91A and match detection circuit 92A, similar to the above Embodiment 9. Additionally, data processing unit 93A includes a LFSR (Linear Feedback Shift Register) 94A for generating pseudo-random number data, and two multiplexers 95A and 96A.

Multiplexer 95A selects data read out from data memory 82A via data bus 84A or random data from LFSR 94A to provide the selected data to data processing circuit 91A. Multiplexer 95A selects data read out from data memory 82A and random data from LFSR 94A when a test mode signal SL1 is 1 and 0, respectively.

Multiplexer 96A selects externally input data DI0–DI15 via data bus 86A or random data from LFSR 94A to provide the selected data to data processing circuit 91A. Multiplexer 96A selects random data from LSFR 94A and external data DI0–DI15 when a test mode signal SL2 is 1 and 0, respectively.

In Embodiment 10, there are four combinations of the two data applied to data processing circuit 91A in a testing operation.

More specifically, (1) the case where data read out from data memory 82A and externally applied data DI0–DI15 are provided to data processing circuit 91A; (2) the case where data read out from data memory 82A and random data from LFSR 94A are provided to data processing circuit 91A; (3) the case where random data from LFSR 94A and externally input data DI0–DI15 are provided to data processing circuit 91A; and (4) the case where random data from LFSR 94A and random data from LFSR 94R are applied to data processing circuit 91A.

The combination of the two data applied to data processing circuit 91A can be set by test mode signals SL1 and SL2 provided to multiplexers 95A and 96A.

Similar to the above-described Embodiment 9, match detection circuit 92A compares the processed result of data processing circuit 91A with the processed result of the data processing circuit in an adjacent data processing block. When the processed results do not match, a flag signal FLG is set to 1.

The frame buffer memory of Embodiment 10 includes LFSR 94A to generate random data. Therefore, a fault in data processing circuit 91A can be detected accurately even when the possibility of a fault generation in data memory 82A is high due to the large storage capacity of data memory 82A. When there is a fault in data memory 82A, it cannot be identified whether the fault is generated in data memory 82A or in data processing circuit 91A in the above-described Embodiment 9. In the present Embodiment 10, testing is carried out without using data memory 82A, so that generation of a fault in data processing circuit 91A can reliably be detected.

Although one data processing unit includes one of LFSR in Embodiment 10, the entire frame buffer memory 80 may include one LFSR. In this case, random data from the LFSR is provided to the data processing circuit of each of data processing blocks 81A–82D.

Furthermore, the LFSR may be used as a data register when testing is not carried out. More specifically, a LFSR and another data register may be used in common. The match detection circuit 92A in Embodiments 8 and 9 may be formed by an EXOR gate. Furthermore, the match detection circuit 92A in Embodiments 9 and 10 may be formed by a compare circuit having a match detection function. Similar to Embodiment 9, the present embodiment can provide a similar effect even when the present invention is applied to a general SIMD/MIMD type architecture or a structure that carries out a SIMD type process. A similar effect can be obtained as long as the number of data processing units is at least 2 in the present embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing circuit comprising:

match compare means for comparing current depth data of a currently displayed screen with next depth data of a next screen to be displayed to make determination whether said current depth data matches said next depth data, magnitude compare means for comparing said current depth data with said next depth data to make determination of the magnitude of said current depth data and said next depth data, means for generating a control signal in response to results of said match compare means and said magnitude compare means, match control means for controlling said match compare means so as to determine whether a predetermined bit in said current depth data matches a corresponding bit in said next depth data, and magnitude control means for controlling said magnitude compare means so as to determined the magnitude between a bit in said current depth data other than said predetermined bit and a corresponding bit in said next depth data.

2. A semiconductor integrated circuit device comprising:

a semiconductor substrate, a data input/output terminal for receiving externally applied image data, first memory means formed at said semiconductor substrate for storing a plurality of image data, second memory means formed at said semiconductor substrate for storing a plurality of image data, said second memory means having at least three ports for receiving and/or transferring image data, first transfer means formed at said semiconductor substrate for transferring image data from/to said first memory means to/from a first port of said second memory means, image processing means formed at said semiconductor substrate for carrying out a predetermined process according to first and second image data, second transfer means formed at said semiconductor substrate for transferring said first image data from a second port of said second memory means to said image processing means, third transfer means formed at said semiconductor substrate for transferring said second image data from said data input/output terminal to said image processing means, and fourth transfer means formed at said semiconductor substrate for transferring resultant data from said image processing means to a third port of said second memory means, wherein a larger amount of image data is transferable via said first transfer means than via said second and fourth transfer means.

3. The semiconductor integrated circuit device according to claim 2, wherein said image processing means comprises a first input node to which blending ratio data is applied indicating the ratio of blending current image data of a currently displayed screen with next image data of a screen next to be displayed, a second input node to which said first image data is applied as said current image data, a third input node to which said second image data is applied as said next image data, multiplier means for multiplying the current image data from said second input node by the blending ratio data from said first input node, and adder means for adding resultant data from said multiplier means with next image from said third input node.

4. The semiconductor integrated circuit device according to claim 3, wherein said image processing means further comprises match compare means for comparing current depth data of said first image data with next depth data of said second image data to make determination whether said current depth data matches said next depth data, magnitude compare means for comparing said current depth data with said next depth data to make determination of the magnitude of said current depth data and said next depth data, and means for generating a control signal in response to results of said match compare means and said magnitude compare means.

5. The semiconductor integrated circuit device according to claim 3, further comprising:

raster operation means for carrying out a predetermined raster operation according to the current image data from said second input node and the next image data from said third input node, and select means responsive to a predetermined select signal for selecting one of resultant data from said adder means and from said raster operation means.

6. The semiconductor integrated circuit device according to claim 3, further comprising:

clamp means for setting resultant data from said adder means to zero when said resultant data is smaller than zero, and setting resultant data from said adder means to the maximum value thereof when overflow occurs in said adder means.

7. The semiconductor integrated circuit device according to claim 2, wherein said first memory means has a memory capacity greater than that of said second memory means, and said second memory means has an access speed faster than that of said first memory means.

8. The semiconductor integrated circuit device according to claim 2, wherein said first memory means comprises a dynamic random access memory, and said second memory means comprises a static random access memory.

9. The semiconductor integrated circuit device according to claim 8, wherein said first transfer means comprises a first bus of a plurality of bits, and said third transfer means comprises a second bus of a plurality of bits smaller in number than that of said first bus.

10. The semiconductor integrated circuit device according to claim 2, further comprising:

a video output terminal and a serial access memory formed at said semiconductor substrate for storing image data read out from said first memory means and providing said stored image data to said video output terminal serially.

11. The semiconductor integrated circuit device according to claim 10, further comprising:

a control signal input terminal for receiving an externally applied predetermined first control signal, wherein said second memory means has writing of resultant data transferred by said fourth transfer means enabled in response to said first control signal from said control signal input terminal.

12. The semiconductor integrated circuit device according to claim 2, wherein said image processing means comprises compare means for comparing first depth data provided as said first image data with second depth data provided as said second image data, and passing means for passing said second depth data therethrough, wherein said fourth transfer means transfers said passed second depth data to said second memory means as said resultant data, wherein said second memory means has writing of said second depth transferred by said fourth transfer means in response to a resultant signal from said compare means, said semiconductor integrated circuit device further comprising a control signal output terminal for providing the resultant signal from said compare means.

13. The semiconductor integrated circuit device according to claim 2, wherein said image processing means comprises a first input node to which blending ratio data is applied indicating the ratio of blending current image data of a currently displayed screen with next image data of a next screen to be displayed, a second input node to which said second image data is applied as said current image data, a third input node to which said second image data is applied as said next image data, operation means for subtracting the next image data from said third input node from the current image data from said second input node, multiplier means for multiplying resultant data from said operation means by the blending ratio data from said first input node, and adder means for adding the next image data from said third input node with resultant data from said multiplier means.

14. The semiconductor integrated circuit device according to claim 13, wherein said operation means carries out a predetermined raster operation according to the current image data from said second input node and the next image data from said third input node, said image processing circuit further comprising:

select means for selecting resultant data from said adder means when said operation means carries out subtraction, and selecting resultant data from said operation means when said operation means carries out raster operation.

15. The semiconductor integrated circuit device according to claim 13, further comprising:

clamp means for setting resultant data from said adder means to zero when that resultant data is smaller than zero, and setting resultant data from said adder means to the maximum value thereof when overflow occurs in said adder means.

16. The semiconductor integrated circuit device according to claim 2, wherein said image processing means comprises a first input node to which blending ratio data is applied indicating the ratio of blending current image data of a currently displayed screen with next image data of a next screen to be displayed, a second input node to which said current image data is applied as said first image data, a third input node to which said next image data is applied as said second image data, a fourth input node to which a maintain signal is applied indicating whether said blending ratio data is 1 or not, multiplier means for multiplying the current image data from said second input node by the blending ratio data from said first input node, first select means for selecting the current image data from said second input node when the maintain signal from said fourth input node indicates that the blending ratio data is 1, and selecting resultant data from said multiplier means when the maintain signal from said fourth input node indicates that the blending ratio data is not 1, and adder means for adding data selected by said first select means with the next image data from said third input node.

17. The semiconductor integrated circuit device according to claim 16, further comprising:

raster operation means for carrying out a predetermined raster operation according to the current image data from said second input node and the next image data from said third input node, and second select means responsive to a predetermined select signal for selecting one of resultant data from said adder means and from said raster operation means.

18. The semiconductor integrated circuit device according to claim 16, further comprising:

clamp means for setting resultant data from said adder means to zero when that resultant data is smaller than zero, and setting resultant data from said adder means to the maximum value thereof when overflow occurs in said adder means.

19. The semiconductor integrated circuit device according to claim 2, wherein said image processing means comprises a first input node to which blending ratio data is applied indicating the ratio of blending current image data of a currently displayed screen with next image data of a next screen to be displayed, a second input node to which said current image is applied as said first image data, a third input node to which said next image data is applied as said second image data, a fourth input node to which a maintain signal is applied indicating whether said blending ratio data is 1 or not, operation means for subtracting the next image data from said third input node from the current image data from said second input node, multiplier means for multiplying the resultant data from said operation means by the blending ratio data from said first input node, first select means for selecting resultant data from said operation means when said maintain signal from said fourth input node indicates that the blending ratio data is 1, and selecting resultant data from said multiplier means when said maintain signal from said fourth input node indicates that the blending ratio data is not 1, and adder means for adding resultant data selected by said first select means with the next image data from said third input node.

20. The semiconductor integrated circuit device according to claim 19, wherein said operation means carries out a predetermined raster operation according to the current image data from said second input node and the next image data from said third input node, said image processing circuit further comprising:

second select means for selecting resultant data from said adder means when said operation means carries out subtraction, and selecting resultant data from said operation means when said operation means carries out raster operation.

21. The semiconductor integrated circuit device according to claim 19, further comprising:

clamp means for setting resultant data from said adder means to zero when that resultant data is smaller than zero, and setting resultant data from said adder means to the maximum value thereof when overflow occurs in said adder means.

22. The semiconductor integrated circuit device according to claim 2, wherein said image processing means comprises match compare means for comparing current depth data of a currently displayed screen provided as said first image data with next depth data of a next screen to be displayed provided as said second image data to make determination whether said current depth data matches said next depth data, magnitude compare means for comparing said current depth data with said next depth data to make determination of the magnitude of said current depth data and said next depth data, and means for generating a control signal in response to results of said match compare means and said magnitude compare means.

23. The semiconductor integrated circuit device according to claim 22, wherein said image processing means further comprises match control means for controlling said match compare means so as to make determination whether a predetermined bit of said current depth data matches a corresponding bit in said next depth data, and magnitude control means for controlling said magnitude compare means so as to make determination of the magnitude of a bit in said current depth data other than said predetermined bit and a corresponding bit in said next depth data.

24. The semiconductor integrated circuit device according to claim 2, wherein said first memory means is divided into a plurality of first memory banks.

25. The semiconductor integrated circuit device according to claim 24, further comprising:

a video output terminal, and a serial access memory formed at said semiconductor substrate for storing image data read out from said first memory means and providing said stored image data to said video output terminal serially.

26. The semiconductor integrated circuit device according to claim 25, wherein said serial access memory is divided into a plurality of serial access memory banks, wherein each of said serial access memory banks corresponds to two of said first memory banks, and stores data read out from said two corresponding first memory banks.

27. The semiconductor integrated circuit device according to claim 26, wherein each of said first memory banks is further divided into a plurality of first memory bank units, wherein each of said serial access memory banks is further divided into a plurality of serial access memory bank units corresponding to said first memory bank units, wherein each of said serial access memory bank units is disposed adjacent to two corresponding first memory bank units.

28. A semiconductor integrated circuit device comprising:

a semiconductor substrate, first memory means formed at said semiconductor substrate for storing a plurality of data, second memory means formed at said semiconductor substrate for storing a plurality of first data, said second memory means having at least three ports for receiving and/or transferring image data, a data input/output terminal for receiving an externally applied second data, first transfer means formed at said semiconductor substrate for transferring data from/to said first memory means to/from a first port of said second memory means, operation means formed at said semiconductor substrate for carrying out a predetermined operation according to the first and second data, compare means formed at said semiconductor substrate for comparing said first data with said second data, second transfer means formed at said semiconductor substrate for transferring said first data from a second port of said second memory means to said operation means and said compare means, third transfer means formed at said semiconductor substrate for transferring said second data from said data input/output terminal to said operation means and said compare means, fourth transfer means formed at said semiconductor substrate for transferring resultant data from said operation means to a third port of said second memory means, a video output terminal, a serial access memory formed at said semiconductor substrate for storing data read out from said first memory means and providing said stored data to said video output terminal serially, a control signal input terminal for receiving an externally applied predetermined control signal, a logic circuit responsive to the control signal from said control signal input terminal and resultant signal from said compare means for providing a write enable signal to said second memory means, and a control signal output terminal for providing a resultant signal from said compare means, wherein a larger amount of image data is transferable via said first transfer means than via said second and fourth transfer means.

29. The semiconductor integrated circuit device according to claim 28, wherein a time period starting from the provision of said first and second data to said operation means up to generation of resultant data from said operation means is set equal to the time period starting from the provision of said first and second data to said compare means up to generation of a write enable signal from said logic circuit.

30. The semiconductor integrated circuit device according to claim 28, wherein said operation means is formed of a predetermined number of pipeline stages, and said compare means and said logic circuit are formed of a number of pipelines stages identical in number to said predetermined number.

31. The semiconductor integrated circuit device according to claim 28, further comprising:

a second control signal input terminal for receiving an externally applied predetermined second control signal, wherein said logic circuit responds to the second control signal from said second control signal input terminal.

32. The semiconductor integrated circuit device according to claim 28, wherein said first memory means is divided into a plurality of first memory banks.

33. The semiconductor integrated circuit device according to claim 32, wherein said serial access memory is divided into a plurality of serial access memory banks, wherein each of said serial access memory banks corresponds to two of said first memory banks, and stores data read out from said two corresponding first memory banks.

34. The semiconductor integrated circuit device according to claim 33, wherein each of said first memory banks is further divided into a plurality of first memory bank units, wherein each of said serial access memory banks is further divided into a plurality of serial access memory bank units corresponding to said first memory bank units, wherein each of said serial access memory bank units is disposed adjacent to two corresponding first memory bank units.

35. The semiconductor integrated circuit device according to claim 34, wherein said second memory means is divided into a plurality of second memory units corresponding to said plurality of first memory bank units, wherein each of said second memory units is disposed adjacent to corresponding plurality of first memory bank units.

36. The semiconductor integrated circuit device according to claim 35, wherein said operation means is divided into a plurality of operation units corresponding to said plurality of second memory units, wherein each of said operation units is disposed adjacent to one corresponding second memory unit.

37. The semiconductor integrated circuit device according to claim 35, wherein said compare means is divided into a plurality of compare units corresponding to said plurality of second memory units, wherein one of said plurality of compare units is disposed adjacent to another of said compare units.

38. A semiconductor integrated circuit device comprising:

a data input/output terminal for receiving externally applied second color data, first memory means formed at said semiconductor substrate for storing a plurality of color data, second memory means stored at said semiconductor substrate for storing a plurality of first color data, first transfer means formed at said semiconductor substrate for transferring color data between said first and second memory means, color data operation means formed at said semiconductor substrate for carrying out a predetermined operation according to the first and second color data, second transfer means formed at said semiconductor substrate for transferring said first color data from said second memory means to said color data operation means, third transfer means formed at said semiconductor substrate for transferring said second color data from said data input/output terminal to said color data operation means, fourth transfer means formed at said semiconductor substrate for transferring resultant data from said color data operation means to said second memory means, a video output terminal, a serial access memory formed at said semiconductor substrate for storing color data read out from said first memory means and providing said stored color data serially to said video output terminal, and a control signal input terminal for receiving an externally applied predetermined control signal, wherein said second memory means has writing of resultant data transferred by said fourth transfer means enabled in response to the control signal from said control signal input terminal.

39. A semiconductor integrated circuit device comprising:

a semiconductor substrate, a data input/output terminal for receiving an externally applied second depth data, first memory means formed at said semiconductor substrate for storing a plurality of depth data, second memory means formed at said semiconductor substrate for storing a plurality of first depth data, first transfer means formed at said semiconductor substrate for transferring depth data between said first and second memory means, depth data compare means formed at said semiconductor substrate for comparing the first depth data with the second depth data, second transfer means formed at said semiconductor substrate for transferring said first depth data from said second memory means to said depth data compare means, third transfer means formed at said semiconductor substrate for transferring said second depth data from said data input/output terminal to said depth data compare means, fourth transfer means formed at said semiconductor substrate for transferring said second depth data to said second memory means, and a control signal output terminal for providing a resultant signal from said depth data compare means, wherein said second memory means has writing of said second depth data transferred by said fourth transfer means enabled in response to the resultant signal from said depth data compare means.

40. An image storage processing system comprising:

a first semiconductor integrated circuit device including a first semiconductor substrate, a color data input/output terminal for receiving externally applied second color data, first memory means formed at said first semiconductor substrate for storing a plurality of color data, second memory means formed at said first semiconductor substrate for storing a plurality of first color data, first transfer means formed at said first semiconductor substrate for transferring color data between said first and second memory means, color data operation means formed at said first semiconductor substrate for carrying out a predetermined operation according to the first and second color data, second transfer means formed at said first semiconductor substrate for transferring said first color data from said second memory means to said color data operation means, third transfer means formed at said first semiconductor substrate for transferring said second color data from said color data input/output terminal to said color data operation means, fourth transfer means formed at said first semiconductor substrate for transferring resultant data from said color data operation means to said second memory means, a video output terminal, a serial access memory formed at said first semiconductor substrate for storing data read out from said first memory means and providing said stored data serially to said video output terminal, and a control signal input terminal for receiving an externally applied predetermined control signal, wherein said second memory means has writing of resultant data transferred by said fourth transfer means enabled in response to the control signal from said control signal input terminal, and a second semiconductor integrated circuit device including a second semiconductor substrate, a depth data input/output terminal for receiving externally applied depth data, third memory means formed at said second semiconductor substrate for storing a plurality of depth data, fourth memory means formed at said second semiconductor substrate for storing a plurality of depth data, fifth transfer means formed at said second semiconductor substrate for transferring depth data between said third and fourth memory means, depth data compare means formed at said second semiconductor substrate for comparing first depth data with second depth data, sixth transfer means formed at said second semiconductor substrate for transferring said first depth data from said fourth memory means to said depth data compare means, seventh transfer means formed at said second semiconductor substrate for transferring said second depth data from said depth data input/output terminal to said depth data compare means, eighth transfer means formed at said second semiconductor substrate for transferring said second depth data to said fourth memory means, and a control signal output terminal connected to said control signal input terminal of said first semiconductor integrated circuit device, and providing resultant data from said depth data compare means, wherein said fourth memory means has writing of second depth data transferred by said eighth transfer means enabled in response to the resultant signal from said depth data compare means.

* * * * *